(12) United States Patent
Tholl et al.

(10) Patent No.: US 10,192,260 B2
(45) Date of Patent: Jan. 29, 2019

(54) TOOL FOR GENERATING CONTAINERIZED PROCESSING LOGIC FOR USE IN INSURANCE CLAIM PROCESSING

(75) Inventors: Rob Tholl, Calgary (CA); Raymond Leung, Calgary (CA); Clayton Russell, Calgary (CA)

(73) Assignee: TELUS Health Solutions Inc., Vancouver (CA)

(*) Notice: Subject to any disclaimer, the term of this patent is extended or adjusted under 35 U.S.C. 154(b) by 0 days.

(21) Appl. No.: 12/388,294

(22) Filed: Feb. 18, 2009

(65) Prior Publication Data

US 2010/0211414 A1   Aug. 19, 2010

(51) Int. Cl.
*G06Q 40/00* (2012.01)
*G06Q 40/08* (2012.01)

(52) U.S. Cl.
CPC .......... *G06Q 40/00* (2013.01); *G06Q 40/08* (2013.01)

(58) Field of Classification Search
USPC .......................................................... 705/35
See application file for complete search history.

(56) References Cited

U.S. PATENT DOCUMENTS

| 6,879,959 | B1* | 4/2005 | Chapman | G06Q 10/10 705/2 |
| 7,356,460 | B1 | 4/2008 | Kennedy et al. | |
| 7,827,201 | B1 | 11/2010 | Gordon et al. | |
| 2004/0064386 | A1* | 4/2004 | Goguen et al. | 705/34 |
| 2006/0149784 | A1 | 7/2006 | Tholl et al. | |
| 2007/0233526 | A1* | 10/2007 | Hoffman et al. | 705/4 |
| 2009/0216803 | A1* | 8/2009 | Goldfarb | G06Q 40/08 |

FOREIGN PATENT DOCUMENTS

WO    2005116880    12/2005

OTHER PUBLICATIONS

Business process outsourcing: an approach to gain access to world-class capabilities Author: Bhimrao Ghodeswar; Vaidyanathan, Janardan Publication info: Business Process Management Journal 14.1: 23-38. Emerald Group Publishing Limited. (2008) (Year: 2008).*

* cited by examiner

*Primary Examiner* — Muriel S Tinkler
*Assistant Examiner* — John A Anderson

(57) ABSTRACT

A system and method for configuring a set of adjudication rules for use in processing an insurance claim. The method and system comprise defining an adjudication rule and defining a secondary rule container and coupling the adjudication rule to the secondary rule container by a rule reference associated with the content of the secondary rule container. Also implemented is defining a primary rule container and coupling the secondary rule container to the primary rule container by a container reference associated with the content of the primary rule container, the adjudication rule, the containers, and the rule and container reference defining a rule hierarchy for representing the set of adjudication rules.

16 Claims, 18 Drawing Sheets

TOOL FOR GENERATING CONTAINERIZED PROCESSING LOGIC FOR USE IN INSURANCE CLAIM PROCESSING

FIELD OF THE INVENTION

This invention relates to configuration of an adjudication rule set used in insurance claim processing.

BACKGROUND OF THE INVENTION

It is recognised in the health care industry that in order to service patient population, health care providers, by necessity, have become participants in many networks. This requires the complex management of many fee schedules, rule sets, and service code definitions, a process that is commonly outside of the capabilities of most practice management systems. The process is then left up to the carrier adjudicating the insurance claims, creating further inefficiencies and added costs to health plans. Further, it is recognised that there are many industry efforts in place to reduce cost, as well as constant Federal and State legislative changes, electronic transaction code sets, and privacy and security requirements. Therefore, health claims processing has become a costly and time consuming endeavour in the current health care industry.

For example, the current healthcare claims system is the source where inefficiencies contribute in administrative overhead and delays. Furthermore, providers are suffering from bad debt expenses on patient payment amounts. In addition the current medical claims system is fraught with the high potential for errors and omissions resulting in more cost to process claims. Providers realise that the reduction of their Account Receivables balance and reconciliation time is desirable. This reduction can happen through more direct eligibility verification, streamlined management of many network relationships, and faster payment. For payers, a key to more efficient plan management is increasing their membership. This membership increase can happen through a value proposition which includes increasing auto-adjudication rates by reducing rejected claims and eliminating many of the steps required in order to accomplish today's claims administration. There is a need for the implementation of a tool for generating an adjudication rule set that can be used by an adjudication engine, such that the tool is configured as flexible enough to implement new plans/benefits and associated adjudication rules more rapidly and at lower costs than current adjudication rule set generation systems.

SUMMARY OF THE INVENTION

It is an object of the present invention to provide an adjudication rule set configuration environment to obviate or mitigate at least some of the above-presented disadvantages.

There is a need for the implementation of a tool for generating or otherwise configuring an adjudication rule set that can be used by an adjudication engine, such that the tool is configured as flexible enough to implement new plans/benefits and associated adjudication rules more rapidly and at lower costs than current adjudication rule set generation systems. Contrary to current adjudication rule set generation systems, there is provided a system and method for configuring a set of adjudication rules for use in processing an insurance claim. The method and system comprise defining an adjudication rule and defining a secondary rule container and coupling the adjudication rule to the secondary rule container by a rule reference associated with the content of the secondary rule container. Also implemented is defining a primary rule container and coupling the secondary rule container to the primary rule container by a container reference associated with the content of the primary rule container, the adjudication rule, the containers, and the rule and container reference defining a rule hierarchy for representing the set of adjudication rules. The set of adjudication rules is stored in a memory; wherein the set of adjudication rules is configured to facilitate the processing of content of the insurance claim with the adjudication rule by an execution order defined by the ordering of the container reference in the primary rule container.

One aspect provided is a method for configuring a set of adjudication rules for use in processing an insurance claim, the method comprising the steps of: defining an adjudication rule; defining a secondary rule container and coupling the adjudication rule to the secondary rule container by a rule reference associated with the content of the secondary rule container; defining a primary rule container and coupling the secondary rule container to the primary rule container by a container reference associated with the content of the primary rule container, the adjudication rule, the containers, and the rule and container reference defining a rule hierarchy for representing the set of adjudication rules; and storing the set of adjudication rules in a memory; wherein the set of adjudication rules is configured to facilitate the processing of content of the insurance claim with the adjudication rule by an execution order defined by the ordering of the container reference in the primary rule container.

A further aspect provided is the set of adjudication rules is further structured in a plurality of containers including the primary rule container and a plurality of the secondary rule containers, each of the plurality of secondary rule containers being coupled to the primary rule container by at least one respective the container reference, each of the plurality of secondary rule containers containing one or more of the adjudication rules adapted for processing the claim content of the insurance claim, each of the one or more of the adjudication rules being coupled to their respective secondary container by at least one the respective rule reference, such that the processing of the content of the insurance claim with the one or more of the adjudication rules is facilitated by the execution order defined by the ordering of the container references of the plurality of the secondary containers in the primary rule container.

A further aspect provided is defining a benefit code; defining a secondary benefit container and coupling the benefit code to the secondary benefit container by a benefit reference associated with the content of the secondary benefit container; defining a primary benefit container and coupling the secondary benefit container to the primary benefit container by a benefit container reference associated with the content of the primary benefit container, such that the benefit code, the benefit containers, and the benefit and container references defining a benefit hierarchy for representing the benefit code in the set of adjudication rules; and storing the benefit code and benefit containers in the memory.

A further aspect provided is where the exclusion or inclusion of the adjudication rules and the secondary containers is configured to occur through comparison of a claim date of the insurance claim to each of said at least one of an effective date or a expiry date of the container references in order to determine if the respective secondary rule container is part of the set of adjudication rules for use in processing the insurance claim, such that the non-matching dates exclude the respective secondary rule container from being included in the execution order.

A further aspect provided is a system for configuring a set of adjudication rules for use in processing an insurance claim, the system comprising: a composer module adapted for defining an adjudication rule, a secondary rule container and a primary rule container; a dependency module adapted for coupling the adjudication rule to the secondary rule container by a rule reference associated with the content of the secondary rule container and adapted for coupling the secondary rule container to the primary rule container by a container reference associated with the content of the primary rule container, such that the adjudication rule, the containers, and the rule and container reference define a rule hierarchy for representing the set of adjudication rules; and storing the set of adjudication rules in a memory; wherein the set of adjudication rules is configured to facilitate the processing of content of the insurance claim with the adjudication rule by an execution order defined by the ordering of the container reference in the primary rule container.

A further aspect provided is a memory for storing data for access by an application program being executed on a data processing system, comprising: a data structure stored in said memory, said data structure including information resident in a database used by said adjudication engine program and including: a set of adjudication rules stored in said memory appropriate to processing a received claim of an adjudication engine, the set of adjudication rules structured in a plurality of containers including a primary rule container and a plurality of secondary rule containers, each of the plurality of secondary rule containers being coupled to the primary rule container by a respective container reference, each of the plurality of secondary rule containers containing one or more adjudication rules adapted for processing the claim content of the received claim, each of the one or more adjudication rules being coupled to their respective secondary container by a respective rule reference, the set of adjudication rules defining a rule hierarchy; wherein processing the content of the received claim with the one or more adjudication rules is facilitated by an execution order defined by the ordering of the container references in the primary rule container.

A further aspect provided of the data structure is a set of benefit codes stored in said memory appropriate to the received claim, the set of benefit codes structured in a plurality of benefit containers including a primary benefit container and a plurality of secondary benefit containers, each of the plurality of secondary benefit containers being coupled to the primary benefit container by a respective benefit container reference, each of the plurality of secondary benefit containers containing one or more benefit codes adapted for processing the claim content of the received claim, each of the one or more benefit codes being coupled to their respective secondary benefit container by a respective benefit reference, the set of benefit codes defining a benefit hierarchy.

BRIEF DESCRIPTION OF THE DRAWINGS

Exemplary embodiments of the invention will now be described in conjunction with the following drawings, by way of example only, in which.

DETAILED DESCRIPTION OF THE EMBODIMENT(S)

System 10

Figure 1:
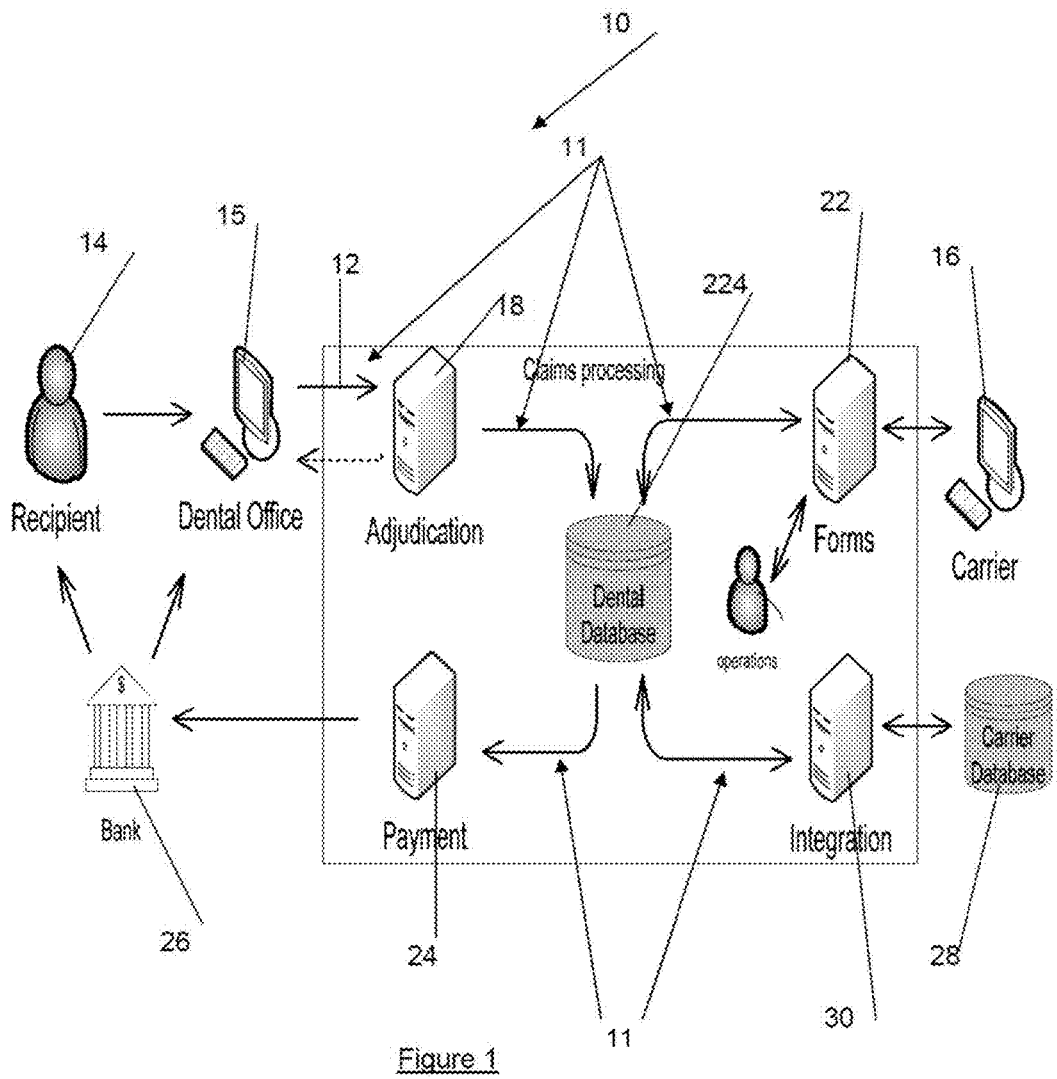
FIG. 1 is a schematic of a claim processing environment.

Referring to FIG. 1, shown is the basic workflows involved with an insurance claim 12 (e.g. dental, vision, drug, etc, or a combination thereof). The process starts with a person 14 going to a medical office 15 to get insured services performed (e.g. dental) and/or for the purchase of insured products (e.g. drugs). The office 15 submits the electronic claim 12 over a communications network 11 to the recipient's insurance carrier 16. The carrier 16 adjudicates the claim 12 via an adjudication system 18 and returns to the dental office 15 the amount that it will cover the performed services/purchased products. The Recipient 14 then has to pay the office 15 the difference if there is any. The adjudicated claim 12 is stored in a database 224 and later read into a payment processing system 24. Payment processing 24 can either EFT or generate a cheque to the payee 26 indicated on the claim 12. the carrier 16 also has a carrier database 28 coupled to the database 224, for supplying updates to any carrier/recipient specific information used during the adjudication 18 and/or payment 24 processes. Further, the carrier 16 can also provide a forms interface 22 for use by the recipient 14 and/or the dental office 15, as desired, in completing the electronic forms of the claim 12 for submission over the network 11 (e.g. intra and/or extranet). The carrier 16 may also share/integrate certain data with the database 224 through an integration server 30.

Figure 2:
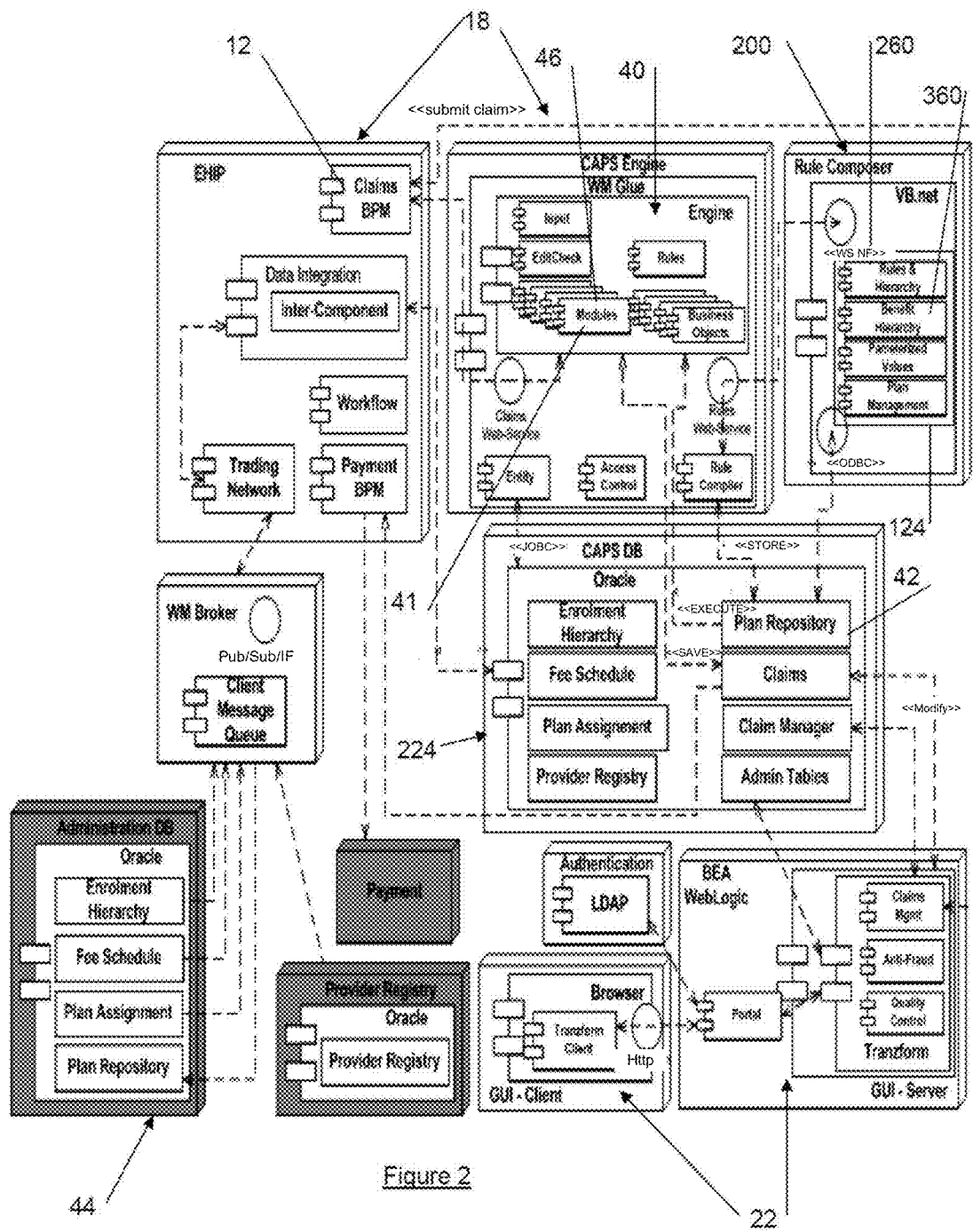
FIG. 2 is a block diagram of an exemplary embodiment of the environment of FIG. 1.

Referring to FIG. 2, shown is a block diagram of main components of the system 10 of FIG. 1. The system 10 has an adjudication engine 40 of the adjudication system 18 that obtains rules 100 and benefits 103*a* s defined in a deployed plan 42, from the data base 224, for use in adjudication of received claims 12 that reference the plan 42. A plan manager 44 is used to deploy the plan 42, taking into account customized rules 100 and benefits 103 (see FIG. 3) as supplied from a rule engine 200 used to compose and/or otherwise organize the rules 100 into a rule hierarchy 260 and the benefits 103 into a benefit hierarchy 360, further described below. The Plan Manager 44 application lets users create and manage plan 42 coverage templates that are used as the basis of plan administration. Plans 42 are built by combining benefit blocks 326,328 with rules 100 (organized in blocks 226,228) (see FIG. 3) and business-specific parameter-value groupings to create a unique coverage specification (e.g. the deployed plan 42 resident in the memory 224). Once a valid plan 42 reaches its Active Date, the plan can be promoted to a production server for access by the plan manager 44.

A module interface 46 is used by the adjudication engine 40 to load and execute adjudication rules 100 and associated benefits 103, as defined in the deployed plan 42. Through this design, all adjudication rules 100 and associated benefits 103 will fire their respective points in the order of execution (e.g. sequential as listed), as defined in the blocks 226, 228, 326, 328 and/or their relationship models 260,360. The adjudication rules 100 discussed here are the ones attached to the plan 42. For example, the deployed plan 42 consists of elements such as but not limited to: adjudication rules 100 (and their associated block 226,228 configuration via references 227,229); a list of service codes 103 (and their associated block 326,328 configuration via references 327, 329); a fee guide for defining the fees payable for services/products accepted in the claim 12 as processed via the adjudication 18 and payment 24 processing (see FIG. 1); and a set of fiscal parameters (e.g. co-insurance, maximum and COB) that are used to customize the rules 100 and/or service codes 103 in the deployed plan 42 that is used in claim 12 processing by the adjudication engine 40. Accordingly, it is recognised that the rules 100 and their associated service codes 103 (via the configuration defined in the hierarchies 260,360) provide for the implementation of the deployed plan 42 used in processing the claims 12. For example, the rules 100 are used to determine whether a given service code 103 can be paid by the plan 42, upon review and processing of the claim 12 information by the adjudication engine 40.

Figure 3:
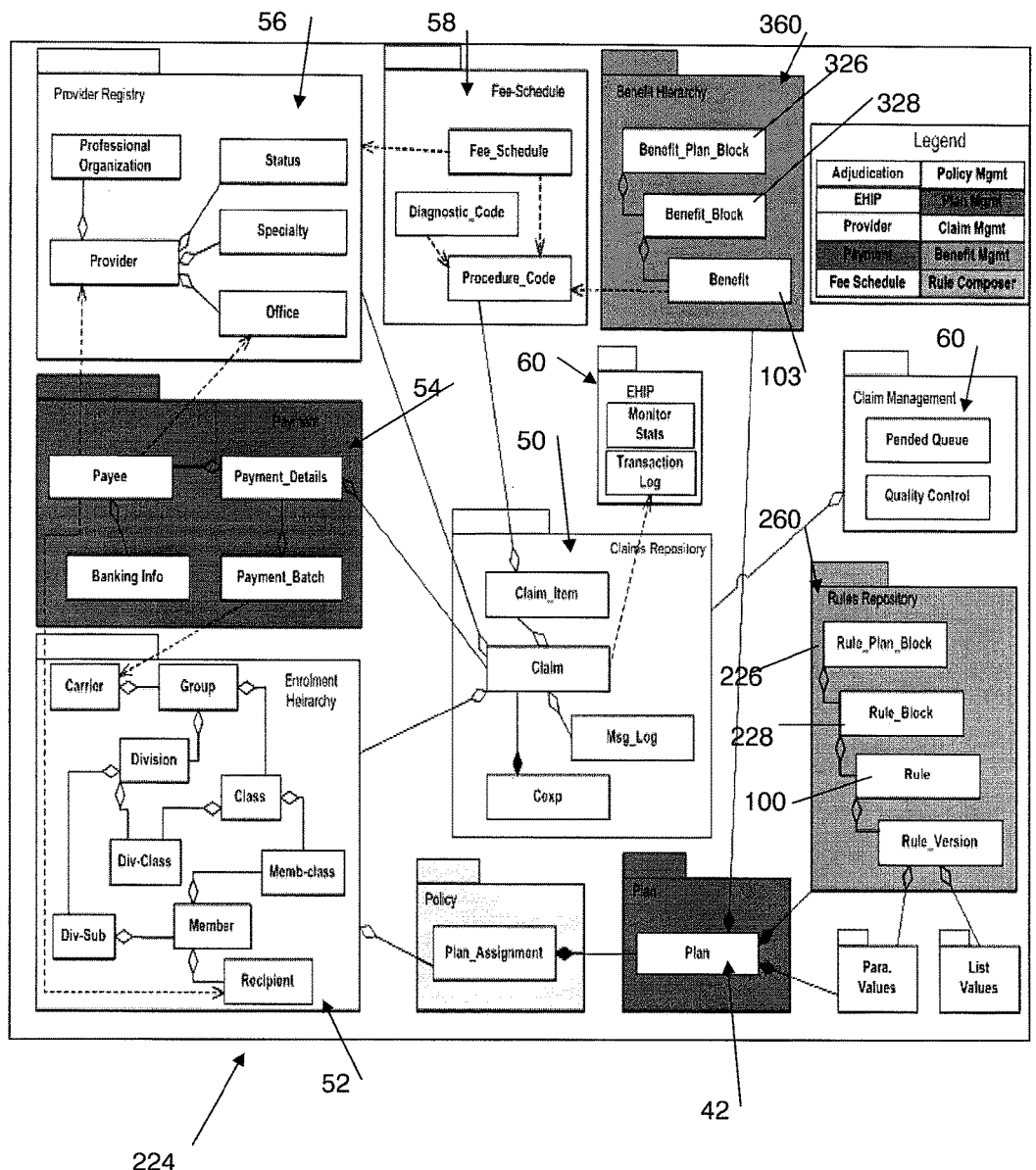
FIG. 3 is a block diagram of a structured memory of the environment of FIG. 1.

Referring to FIG. 3, shown is a further embodiment of the memory 224, including the benefit hierarchy 360 and the rule hierarchy 260, as well as their respective data structures consisting of patient/child (e.g. independent/dependent) blocks 326,328, benefits 103 and blocks 226,228 and rules 100, as further described below. It is recognised that the memory 224 can also include claims information 50, carrier/member/recipient information 52, payment information 54, provider information 56, fee schedules 58, and pended/quality control information 60, as desired.

Claim 12 Concept Overview

Figure 4:
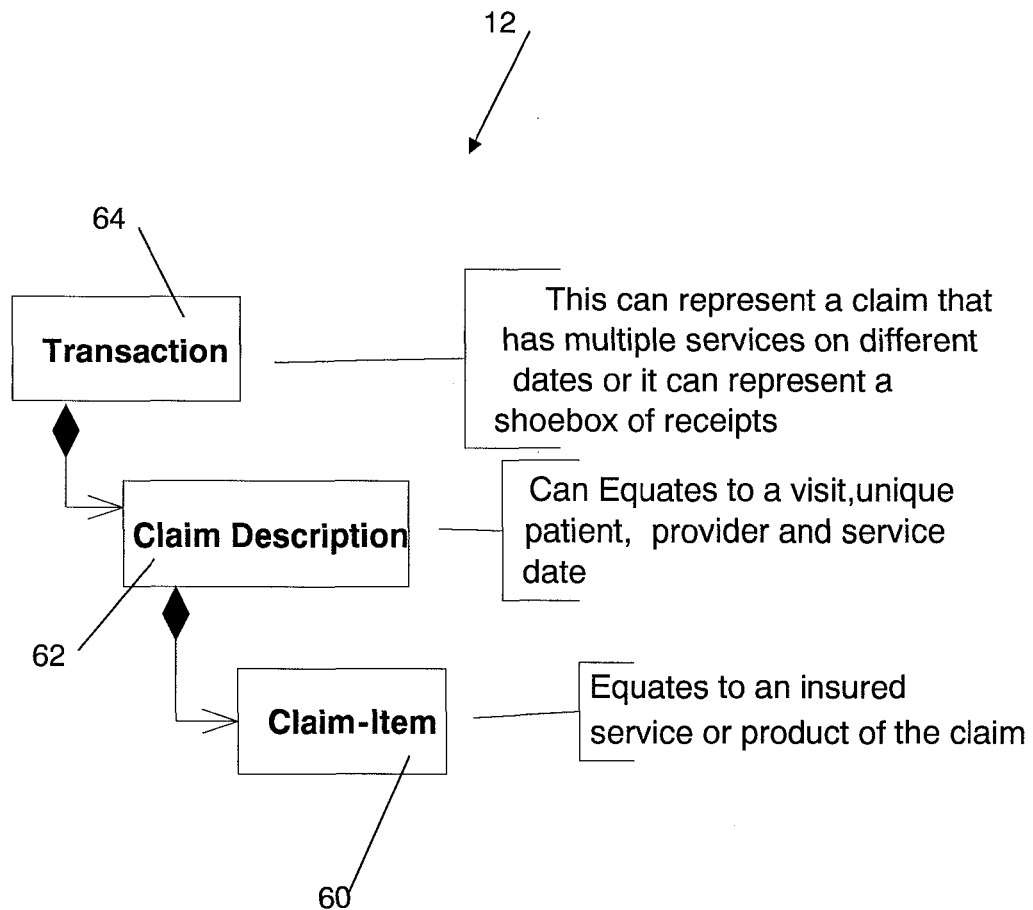
FIG. 4 shows an example claim of the environment of FIG. 1.

Referring to FIGS. 1, 2, and 4, there are many different definitions of a claim 12 based on the perspective of the viewer. The following example definition and design of the claim 12 is from the perspective of the adjudication engine 40 for use in adjudication processing 18 using the configured rules 100 and/or benefit codes 103 of the plan 42 associated with the claim 12. A claim-item 60 can a procedure or product code (e.g. dental teeth cleaning). There can be multiple procedure codes on a single claim 12. Multiple procedure codes can sometimes be packaged together under 1 procedure code, as desired. The claim description 62 can be a unique combination of: Patient (registered with a specific carrier 231 and associated plan 42); Provider (of the insured service(s)/product(s) of the plan 42; and Service date (a measure of when the insured service(s)/product(s) took place). For example, the claim description 62 can describe a visit and resultant outcome of the patient to the provider. Note that multiple claims in a day (e.g. service date) are possible. A transaction 64 can be made up of one or more individual claim descriptions and can, for example: be a box of receipts all submitted at once; extend across multiples patients and providers; possibly represent a single EDI (CDA) claim with multiple service dates; and/or can represent a claim submitted on a periodic frequency (e.g. Labour Force Reentry (LMR) type claims pertaining to retraining/rehabilitation of the patient over an extended period of time).

Adjudication Engine 40

The adjudication engine 40 of the adjudication system 18 is configured to access or otherwise obtain rules 100 and benefits 103 as defined in a deployed plan 42, from the database 224, for use in adjudication of received claims 12 that reference the plan 42. As further described below, the rules 100 and benefits 103 are configured as rule and benefit objects in respective hierarchies 260, 360.

The adjudication engine 40 can have a comparison module 41 configured for comparing the claim date to each of the an effective date and an expiry date of the container references 229, in order to determine if the respective secondary rule container 228 is part of the set of adjudication rules for use in processing the received claim 12, such that the non-matching dates exclude the respective secondary rule container 228 from being included in an execution order as listed in the corresponding primary rule container 226. Further, the adjudication engine 40 can have the comparison module 41 configured for comparing the claim date to the effective date and/or a expiry date of the rule references 227, in order to determine if the respective adjudication rules 100 associated with the rule references 227 is/are part of the set of adjudication rules 100 for use in processing the received claim 12, such that the non-matching dates exclude the respective adjudication rule 100 from being included in the execution order of their respective secondary rule container 228.

Further, the adjudication engine 40 can have the comparison module 41 configured for comparing the claim date to each of the an effective date and an expiry date of the benefit container references 329, in order to determine if the respective secondary benefit container 328 is part of the set of benefit codes 103 for use in processing the received claim 12, such that the non-matching dates exclude the respective secondary benefit container 328 from being included in an execution order as listed in the corresponding primary benefit container 326. Further, the adjudication engine 40 can have the comparison module 41 configured for comparing the claim date to the effective date and/or a expiry date of the benefit references 327, in order to determine if the respective benefit codes 103 associated with the benefit references 327 is/are part of the set of benefit codes 103 for use in processing the received claim 12, such that the non-matching dates exclude the respective benefit codes 103 from being included in the execution order of their respective secondary benefit container 328.

Accordingly, as further described below, the adjudication engine 40 uses date matching of the references 227,229,327, 329 with the claim date, in order to assemble the set of adjudication rules appropriate to the content of the received claim 12. The comparison module 41 may be part of the adjudication engine 41, as shown, and/or may be part of the database 224 or other third party (not shown).

Adjudication Rules 100

Figure 6A:
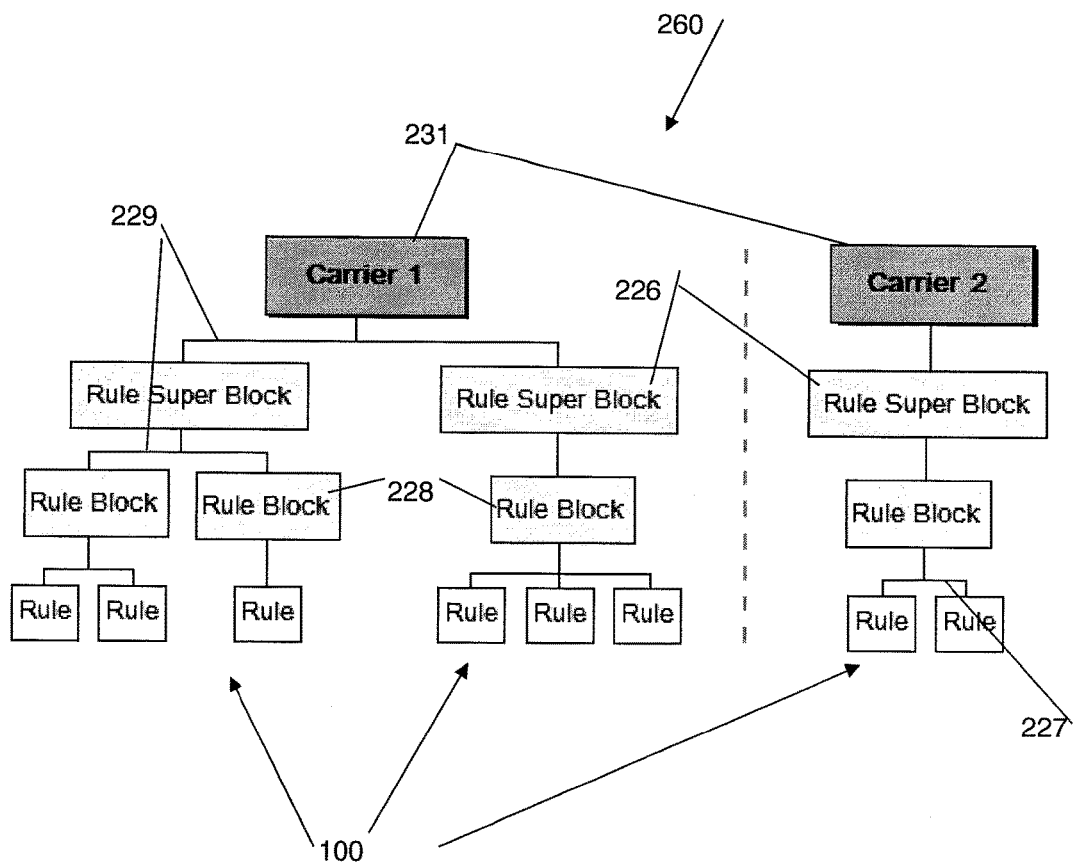
FIG. 6*a* shows an example embodiment of a rule data structure of FIG. 3.

The Rules 100 can be used by the adjudication engine 40 to determine whether a given service code 103 is authorized to be paid by a plan 42 deployed on behalf of the carrier 231 (see FIG. 6a).

Rule Grammar

Figure 11:
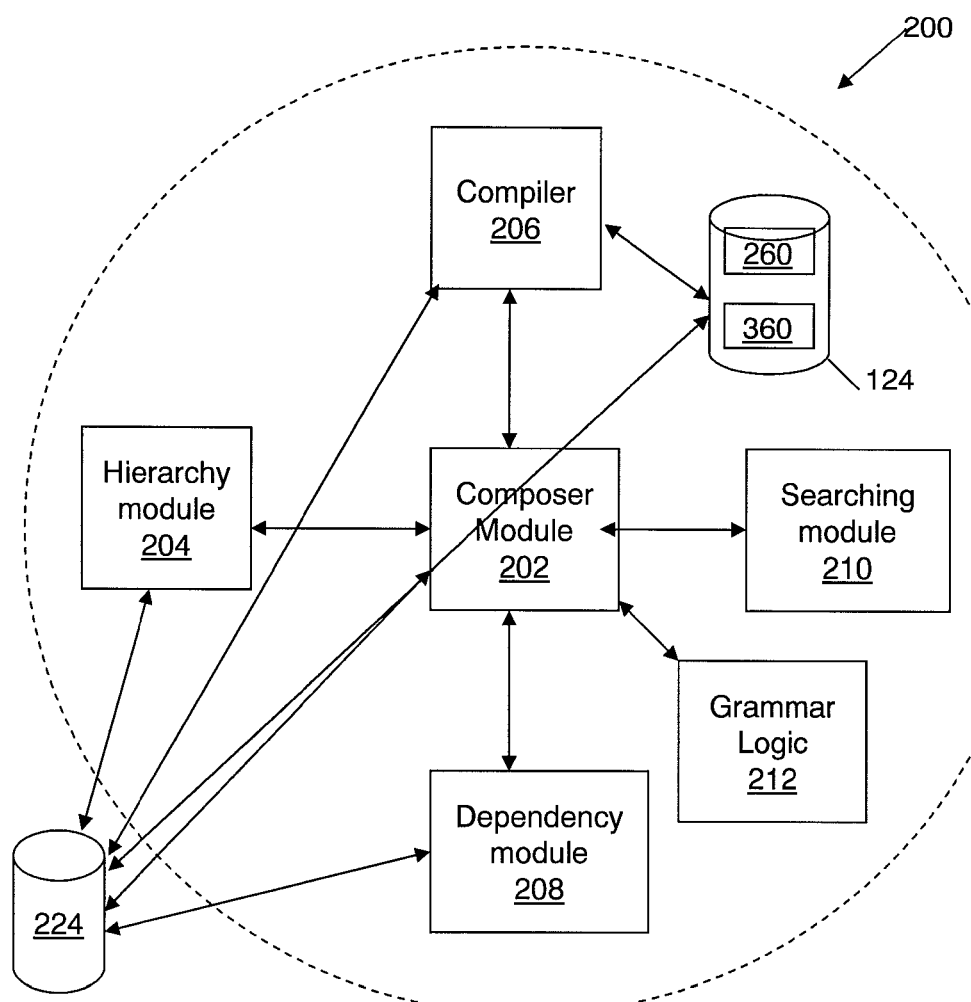
FIG. 11 is an example configuration of the rule engine of FIG. 2.

Reference is next made to FIGS. 4 and 11, which illustrates the generalized structure of a Rule 100. Each rule 100 is a discrete logical expression that, when evaluated, returns a condition of either "TRUE" or "FALSE". One example of the rule 100 is a logical structure of IF {condition(s)} THEN {action(s)} statement. The defined grammar logic 212 is available to a composer module 202 of the rule engine 200 for use in creating/amending the rules 100 for a new plan 42 and/or for facilitating editing of rules 100 in an existing plan 42 obtained from the memory 224 (see FIG. 3). Rules 100 are evaluated by the adjudication engine 40 when claims 12 are submitted by an insured person as will be described below and are used to process claims 12. The complete set of rules 100 in the rules database 224 is the complete set of business logic that will be analysed by the adjudication engine 40 in processing a claim 12. An action or method 104 of the grammar logic 212 can be performed by the adjudication engine 40 if the condition 102 of the rule 100 is "TRUE". The action 104 is not performed if the condition 102 of the rule 100 is "FALSE".

Conditions 102 of the grammar logic 212 are expressions that result in a true or false answer. The expressions 102 can be comprised of the rule elements described in a Business Object Model (BOM) file. Conditions 102 can be as simple as (OBJ.A=1). A rule 100 can also have multiple conditions 102 joined together by logical operators and each condition can be nested with other conditions. An exemplary more complicated rule 100 with several logical operators and nested conditions is the following:
((OBJ1.A+OBJ1.B=2) OR ((OBJ1.D=10) AND (OBJ2.E=OBJ2.F)) OR (OBJ.FUNCTION(A,B)=25

The elements of the grammar logic 212 that comprise conditions and actions can be specific to the implementation and are described in a Business Object Model (BOM) file. The BOM file is an XML file that provides the rule engine 200 with information on rule elements of the grammar logic 212 available for use creating/editing/deleting the rules 100, such as but not limited to:

Business objects such as a claim
Attributes associated with business object such as a recipient
Methods associated with each business object such as calculations based on the recipient's claim history
Data types associated with each rule element
Global functions such as those used to manipulate or compare data
Actions such as pay or refuse the claim (or line item of the claim)
Operators for comparisons and arithmetic The rules 100 in the BOM have customizable labels and descriptions that the user will see when interacting with the tool. Changes to the BOM are easily implemented by interacting with a rule composer interface (e.g. interface 102 coupled to the composer module 202) and may not require an application code update. The rule composer interface 102 (see FIG. 13) is in communication with thr rule engine 200 which performs the functionality upon instruction by the user. The BOM is a system file that may not be normally modified directly by the user without using the rule composer interface 102.

Figure 5A:
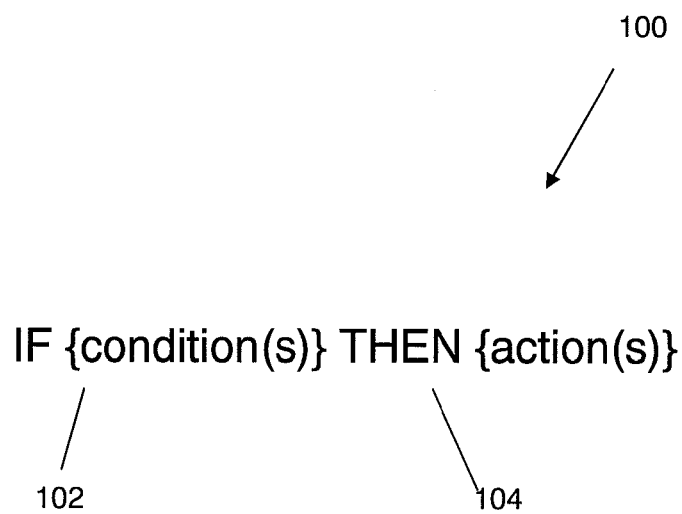
FIG. 5*a* is example grammar logic of the rule engine of FIG. 2.
Figure 5B:
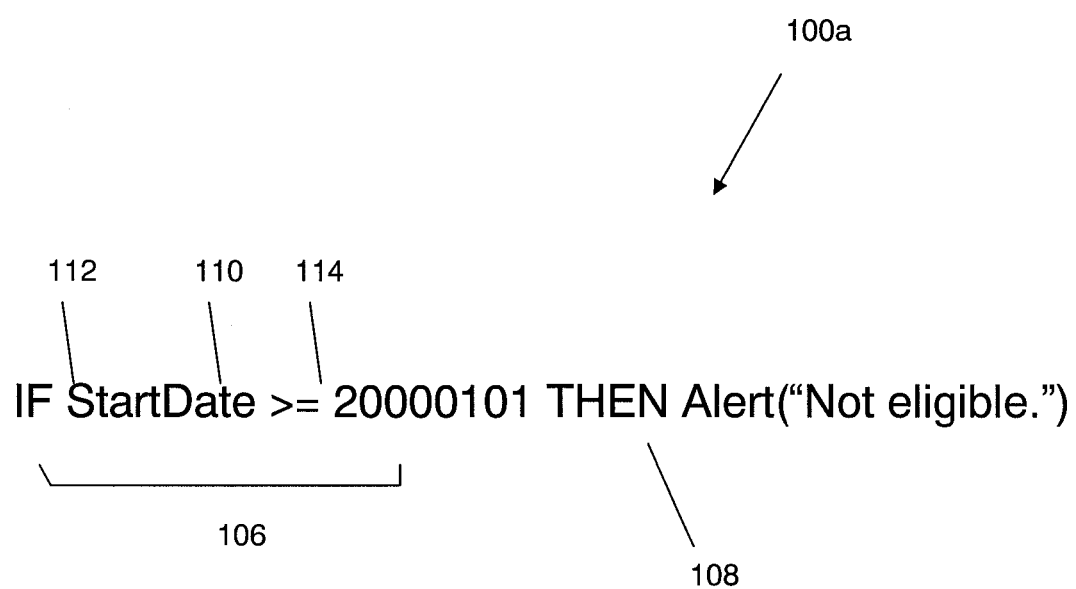
FIG. 5*b* is an example parameterized rule using the logic of FIG. 5*a*.

An example rule 100a is shown in FIGS. 5a,b. The rule 100a includes an expression 106 and an action 108. When the rule 100a is evaluated by the adjudication engine 40, the adjudication engine 40 will determine whether the expression 106 is in a FALSE condition or a TRUE condition. If the expression is in the TRUE condition, then the adjudication engine 40 will execute the action 104 specified in the rule 100. If the expression is in the FALSE condition, then the adjudication engine 40 will take no action.

In rule 100a, the expression 106 includes a literal value 112, an operator 110 and a parameter value 114. The literal value 112 represents the "StartDate" of the employee submitting the claim 12. It will be appreciated that the literal value 112 of a rule 100 may be any literal value 112 that is available in the database 224. Other literal values 112, for example, may correspond to an employment start date, an employment end date, employment status (e.g. full-time, part-time, contract) or other literal values 112 as will be understood in the art. The literal values 112 may be set to a default value in the rule 100 creation process (via the rules engine 200) and be edited when a rule 100 is attached to the plan 42, as further described below.

It is recognised that business objects are objects to which information is attached, as utilized by the rule engine 200. A claim 12 (see FIG. 1) is an example of a business object. Attached to the claim 12, as received by the adjudication engine 40 (see FIG. 2), is information such as the identity of the claim's recipient and the service for which the claim 12 is being made, as well as the carrier 231 that is responsible (i.e. for providing the configuration of the rules 100 and/or for payment of the claim 12, once adjudicated) for the claim 12. Business objects provide the context in which the rules 100 would be evaluated during adjudication of the claim 12 by the adjudication engine 40. It is recognised that methods can also be attached to the business objects, in order to perform calculations in the context of the business object or retrieves information about the business object that is not available as an attribute. It is recognised that the attributes and methods attached to the business object are referenced in the rule(s) 100 using a syntax of the rule grammar of the grammar logic 212, such as object.attribute and object.method syntax respectively.

Attributes are the pieces of information attached to a business object. The attributes can have values that can be used for comparisons or calculations, depending on the data type, in order to assist in execution of the rules 100 when processing of the received business object (e.g. claim 12) by the adjudication engine 40.

Figure 9:
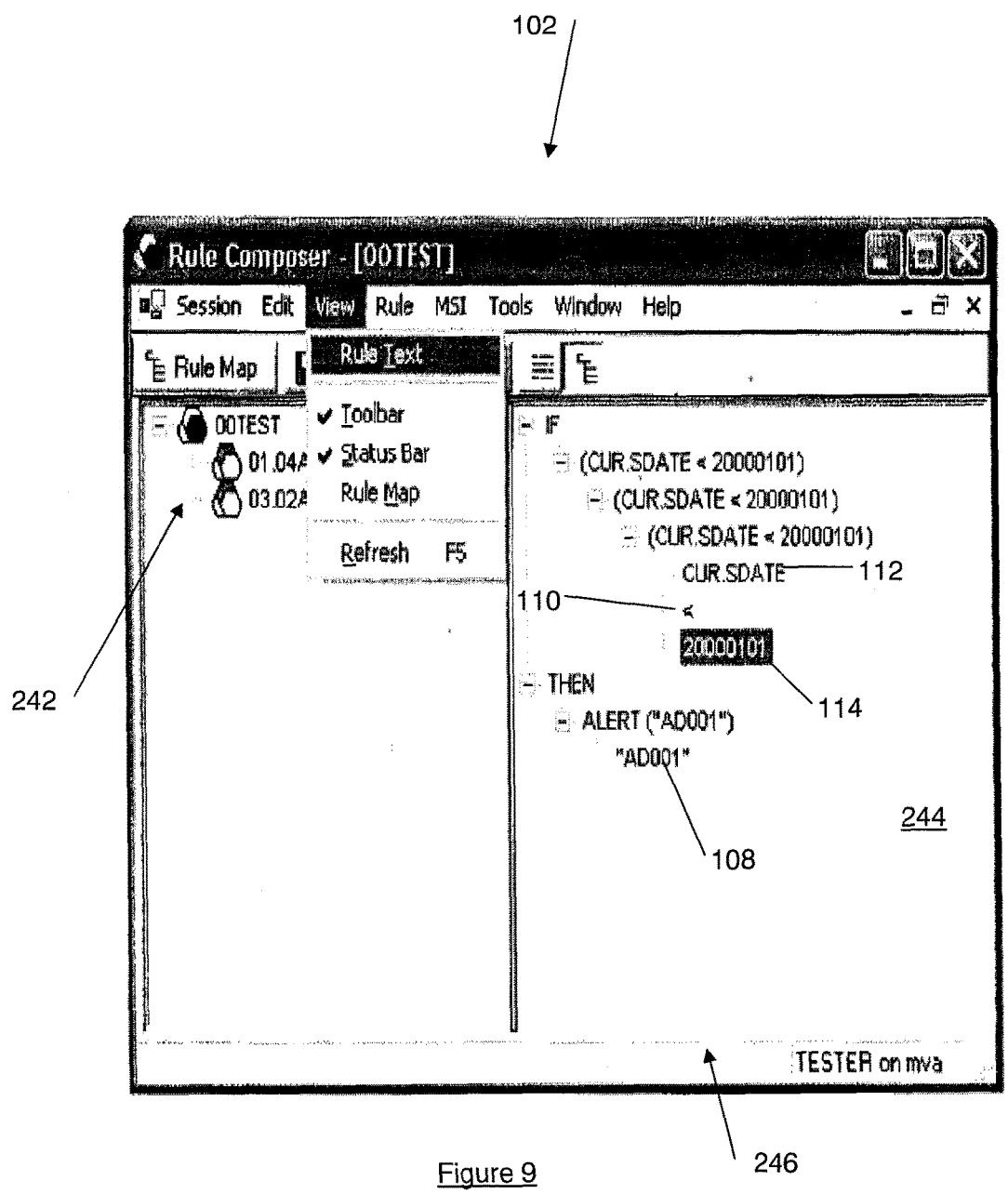
FIG. 9 is another example interface of the rule engine 20 of FIG. 2.

The methods and functions associated with the business object (e.g. via the rules 100) are used to return a calculated value and/or a true/false logic decision, return a state, and/or perform action(s). Operators are uses when comparing two or more values and/or in joining two or more conditions. The logical operators AND, OR, AND NOT, OR NOT, and NOT of the grammar logic 212 are used in the rules 100, as input through the user via the rules manager 202. Other operators of the grammar logic 212 can be such as but not limited to: EQUALS; NOT EQUALS; etc. An example of a rule 100 in the rule hierarchy 260 is shown in FIG. 9.

Rule Blocks 228 and Superblocks 226

Referring to FIGS. 2,3, the blocks 226, 228 and rules 100 are used as rule objects in the hierarchy 260, thus providing for multiple instances of the same rule object in any particular rule hierarchy 260 (i.e. specific instances of coupled blocks 226,228 and rules 100) configuration.

A Rule Block 228 is a logical grouping of Rules 100, such that specific instances of the Rule Blocks 228 have a name and description but may not have any inherent processing logic. A Rule Super Block 226 is a logical grouping of Rule Blocks 228. Rule Super Blocks 226, such that specific instances of the Rule Blocks 226 have a name and description but may not have any inherent processing logic. A name and description in a second language can be supported. The Rule Super Block 226 can be used to define the execution order of the blocks 228 listed/referenced 229 therein (e.g. each referenced block 228 in the list of blocks 228 in the super block 226 is processed in sequential order).

The organization of adjudication rules 100 is represented by Rule Containers 226, 228 (e.g. Super Blocks and Blocks) and the Rules 100 within them. The adjudication rules 100 and their organization in the hierarchy 260 are stored as data organised via the blocks 226,228 within the database 224. The rule data is then used by the adjudication engine 40 to process claims 12 received. Referring to FIG. 6a, the rule hierarchy 260 consists of Carriers 231, Rule Containers 226, 228, and Rules 100. Carrier 231 is the root container for the Rule Hierarchy 260. Rule Objects refer to both Rules 100 and Rule Containers 226,228, such that Rule Super Blocks 226 contain Rule Blocks 228 and Rule Blocks 228 contain Rules 100, for example, as a container relationship structure used to organize and define the rule hierarchy 260.

The term Rule 100 refers to a specific implementation of the processing logic of a business policy. A Rule Block 226,228 is a logical grouping of Rules 100. Rules 100 belong to a Rule Block 226,228 by way of a reference 227,229 (also referred to as Rule Inclusions). Rule Objects exist at the specified level in the hierarchy 260 (specific configuration of the blocks 226, 228 and rules 100 through the references 227,229. The Rule Hierarchy 260 is built on references 227 to Rule Objects rather than containing the Rule Objects; where Rule Objects only exist once in the database, regardless of how many times they appear in the Rule Hierarchy 260. For example, a named rule 100 (e.g. an instance of the rule 100) is an example of a rule object that is then referenced 227 in the containers 226,228 of the hierarchy 260. Also, it is recognised that named containers 226,228 (e.g. an instance of the container 226,228) is an example of a rule object that is then referenced 229 in the containers 226,228 of the hierarchy 260. The use of references 227,229 provides for efficient reuse of common Rules 100 and Rule Containers 226,228 in a large Rule Hierarchy 260. When changes are required on a Rule Object, the changes need only be applied to the single instance rather than in multiple copies.

Referring to FIG. 6a, the rules 100 are organized into a collection of primary 226 and secondary 228 containers, also referred to as superblocks 226 and blocks 228. It is recognised that a particular rule 100 may exist only once in the database 224 but can be found in multiple containers 226,228 by one or more references 227,229, such that the reference 227 is a link between a rule 100 and a secondary container 228 and a reference 229 is a link between a secondary container 228 and a primary container 226. Accordingly, rule objects can exist only once in the database 224, regardless of how many times the appear in the rule hierarchy 260, since the rule hierarchy 260 can be built on references to the rule objects rather than containing the rules objects themselves. One advantage in using references 227, 229 is that it can allow for reuse of common rules 100 and rule containers 226,228 in a complex rule hierarchy 260, such that when changes/modifications are done on a rule object, the changes/modifications are only applied to the single instance of the rule object rather than to multiple copies of the rule objects.

It is recognised that the rules 100 linked via references 227 to the secondary containers 228 are also included in the primary containers 226 via the references 229, e.g. a primary container 226 contains all contents of the linked 229 secondary containers 228 (e.g. as a child of the primary container 226) and the contents of the secondary containers 228 are the linked 227 rules 100 (e.g. the rules 100 are children of the secondary containers 228). Hence, the described relationship between the containers 226, 228 and the rules 100 can be such that each rule is a dependent/child of the associated secondary container 228 and each secondary container in turn is a dependent/child of the primary container 226. As well, each primary container 226 is a dependent/child of one or more carriers 231, as shown by example in FIG. 6a.

References 227,229,327,329

Figure 12A:
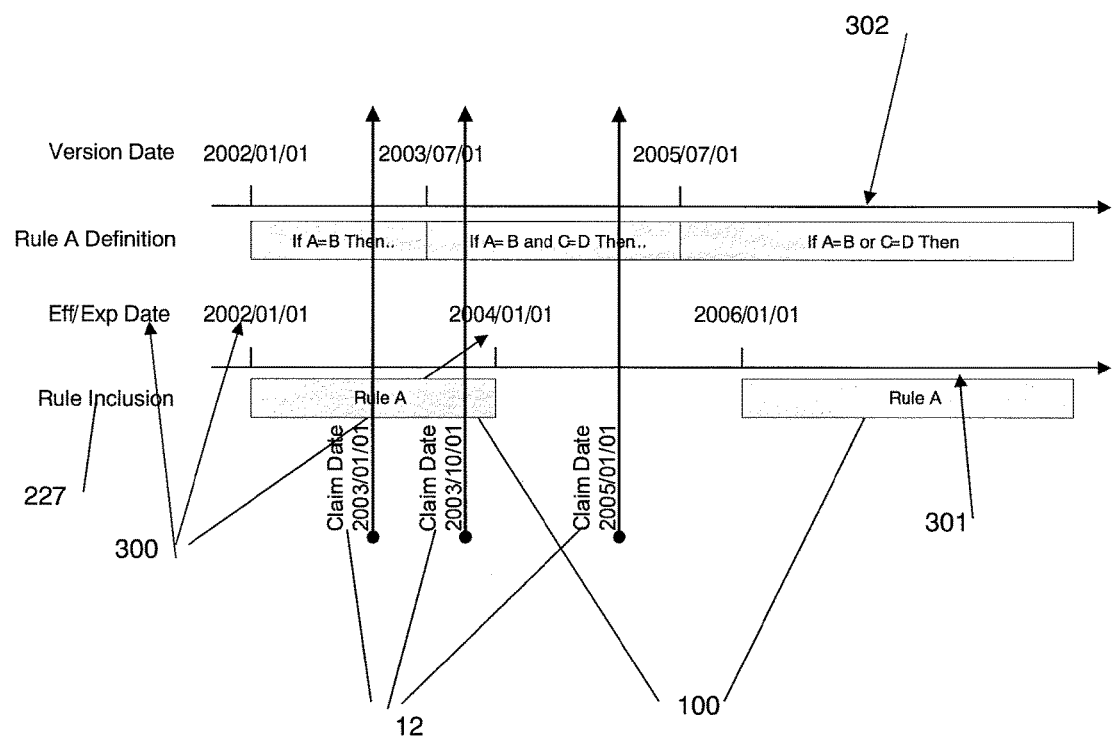
FIG. 12*a* is an example configuration of the rules of FIG. 3.

Referring to FIG. 12a,b, a Rule Version is a specific implementation of a Rule 100 using the rule grammar. Different implementations may be valid at different points in time in time span 301 ordering of the rules 100 and corresponding blocks 228. A version date 300 of a rule version determines which implementation is applicable over the history of the Rule 100. A Rule 100 is a member of a Rule Block 228 by way of the reference 227 and those references can be called Rule Inclusions. The order of Rule Inclusions 227 within a Rule Block 228 determines the order of processing by the adjudication engine 40 of the rules associated via the hierarchy 260 for the particular plan 42 associated (e.g. via a plan ID associated with the patient name of the claim 12) with the received claim 12 for processing (see FIG. 3). The chronological dependency of Rule Inclusions 227 for a Rule 100 within a Rule Block 228 is called a Rule Timeline 302.

A Rule Block 228 is a member of a Rule Super Block 226 by way of the reference 229 and those references can be called Rule Block Inclusions 229. The order of Rule Block Inclusions 229 within a Rule Super Block 226 can determine the order of processing by the adjudication engine 40. It is recognised that Rule Block Inclusions 229 may or may not have a time dependency.

Accordingly, rule processing order by the adjudication engine 40 is configured in the hierarchy via the references 227,229. For example, Rule Inclusions 227 can have an effective date and expiry date (e.g. on the timeline 302). These dates specify the start and end of when the Rule 100 is considered to belong to the Rule Block 228. The Rule Inclusions 227 that a claim 12 will encounter during processing depends on a service date of the claim 12, as well as the plan ID for associating the claims 12 with the rules 100 and benefits 103 related to the claims via the corresponding deployed plan 42. Each Rule 100 referenced by the Rule Inclusions 227 may have multiple versions of the logic implementation. The rule version 300 used for a claim 12 can be the most recent one relative to the claim 12 service date. Each version 300 can have a distinct Version Date that specifies the start date of the version 300. The end date of a Rule Version 300 is implied by the start date of the next version, for example or can be independently specified, as desired. Rule Inclusions 227 may or may not point to a specific Rule Version 300, where the version 300 used during claim 12 processing can be determined by the claim 12 date.

Figure 10:
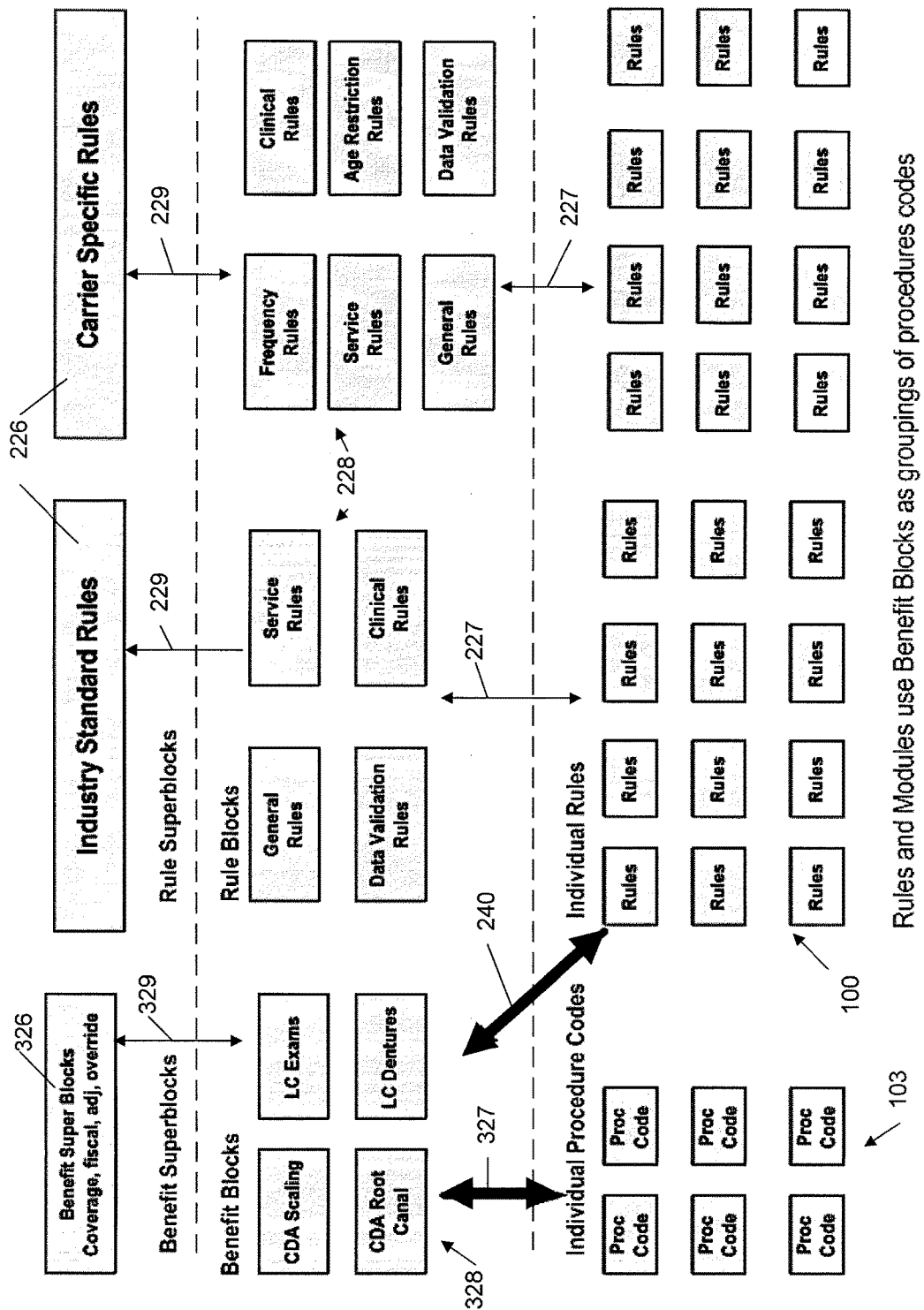
FIG. 10 is an embodiment of the rule and service code data structure of FIG. 3.

Further, a benefit Version is a specific implementation of a benefit 103. Different implementations may be valid at different points in time in time span 301 ordering of the benefit 103 and corresponding blocks 328. A version date 300 of a benefit version determines which implementation is applicable over the history of the benefit 103. A benefit 103 is a member of a benefit Block 328 by way of the reference 327 and those references can be called benefit Inclusions. The order of benefit Inclusions 327 within the Block 328 can determines the order of processing by the adjudication engine 40 of the benefits associated via the hierarchy 360 (as well as linked to specific rules via links 240—see FIG. 10) for the particular plan 42 associated (e.g. via a plan ID associated with the patient name of the claim 12) with the received claim 12 for processing (see FIG. 3). The chronological dependency of benefit Inclusions 327 for a benefit 103 within a Block 328 is called a Timeline 302.

A Block 328 is a member of a Super Block 326 by way of the reference 329 and those references can be called Block Inclusions 329. The order of benefit Block Inclusions 329 within a benefit Super Block 326 can determine the order of processing by the adjudication engine 40. It is recognised that Block Inclusions 229 may or may not have a time dependency.

Accordingly, benefit processing by the adjudication engine 40 is configured in the hierarchy via the references 327,329. For example, Inclusions 327 can have an effective date and expiry date (e.g. on the timeline 302). These dates specify the start and end of when the benefit 103 is considered to belong to the Block 328. The Inclusions 327 that a claim 12 will encounter during processing depends on a service date of the claim 12, as well as the plan ID for associating the claims 12 with the rules 100 and benefits 103 related to the claims 12 via the corresponding deployed plan 42. Each benefit 103 referenced by the Inclusions 327 may have multiple versions of the logic implementation. The benefit version 300 used for a claim 12 can be the most recent one relative to the claim 12 service date. Each benefit version 300 can have a distinct benefit Version Date that specifies the start date of the benefit version 300. The end date of a benefit Version 300 is implied by the start date of the next benefit version, for example or can be independently specified, as desired. Inclusions 327 may or may not point to a specific benefit Version 300, where the benefit version 300 used during claim 12 processing can be determined by the claim 12 date.

FIG. 12a illustrates the Timeline 302 and Version 300 concepts with example rules 100. The definition of Rule A has three versions 300 with Version Dates of 2002/01/01, 2003/07/01 and 2005/01/01. Rule A is included in the example Rule Block 228 from 2002/01/01 to 2004/01/01 and again from 2006/01/01 with no expiry date. Between 2004/01/01 and 2006/01/01 Rule A is not included in the Rule Block 228. The first claim 12 with a date of 2003/01/01 will see the first version 300 of Rule A. The second claim 12 with a date of 2003/10/01 will see the second version 300 of Rule A. The third claim 12 will not see any version 300 of Rule A because the Rule Inclusion 227 is not in effect at that time. Accordingly, the rule inclusion 227 can be used to coordinate which rule 100 at which time is relevant for use in adjudication processing 18 (see FIG. 1) based matching the date of the rule inclusion 227 with the claim date.

When multiple Rule Versions 300 exist for a given Rule Inclusion 227, the appropriate version date can be shown as child nodes under the Rule Inclusion 227. The version 300 dates shown can fall between the start and end of the respective time span 302 dates. For example, a Rule 100 can have multiple versions 300 grouped under different version dates (e.g. 2000/03/22 and 2007/04/08). For each time span 302 the appropriate version dates can be displayed as child nodes of the Rule 100 rule inclusion 227 node of the hierarchy 260 (see FIG. 6a).

Figure 12B:
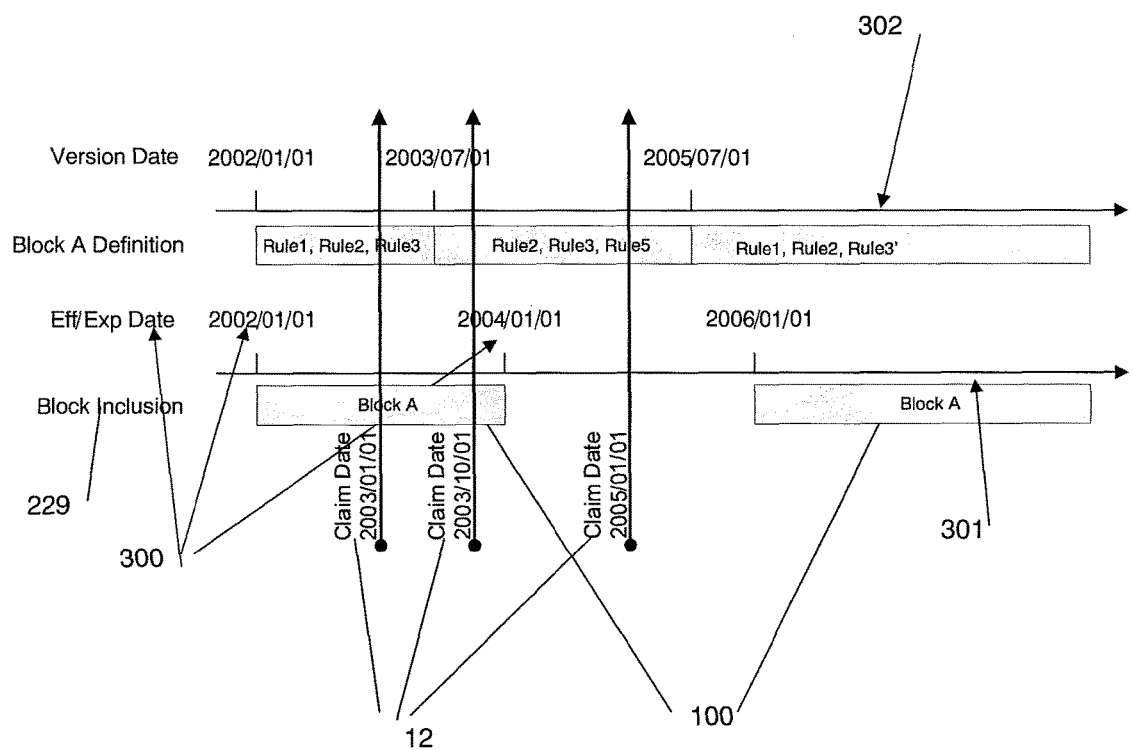
FIG. 12*b* is an example configuration of the rule blocks of FIG. 3.

FIG. 12b illustrates the Timeline 302 and Version 300 concepts with example blocks 228. The definition of block A has three versions 300 with Version Dates of 2002/01/01, 2003/07/01 and 2005/01/01. Block A is included in the example super Block 226 from 2002/01/01 to 2004/01/01 and again from 2006/01/01 with no expiry date. Between 2004/01/01 and 2006/01/01 block A is not included in the super Rule Block 226. The first claim 12 with a date of 2003/01/01 will see the first version 300 of block A. The second claim 12 with a date of 2003/10/01 will see the second version 300 of block A. The third claim 12 will not see any version 300 of block A because the Inclusion 229 is not in effect at that time. Accordingly, the inclusion 229 can be used to coordinate which block 228 at which time is relevant for use in adjudication processing 18 (see FIG. 1) in the corresponding superblock 226, based matching the date of the inclusion 229 with the claim 12 date.

When multiple Rule Versions 300 exist for a given Inclusion 229, the appropriate version date can be shown as child nodes under the Inclusion 229. The version 300 dates shown can fall between the start and end of the respective time span 302 dates. For example, a block 228 can have multiple versions 300 grouped under different version dates (e.g. 2000/03/22 and 2007/04/08). For each time span 302 the appropriate version dates can be displayed as child nodes of the inclusion 229 node of the hierarchy 260 (see FIG. 6a).

It is recognised that similar use of references 327, 329 for the benefits 103 can be said for FIGS. 12a,b, whereby the benefit inclusion 327 can be used to coordinate which benefit 103 at which time is relevant for use in adjudication processing 18 (see FIG. 1) based matching the date of the benefit inclusion 227 with the claim 12 date. Further, it is recognised that, the inclusion 329 can be used to coordinate which block 328 at which time is relevant for use in adjudication processing 18 (see FIG. 1) in the corresponding superblock 326, based matching the date of the inclusion 329 with the claim 12 date.

Benefit Blocks 328 and Superblocks 326

As mentioned above, the plans 42 are built by combining, via links 240 between rules 100 and benefits 103 (see FIG. 10), benefit blocks 326,328 with rules 100 and associated rule blocks 226,228 and business-specific parameter-value groupings to create a unique coverage specifications, which are applied to the received claims 12 as processed by the adjudication engine 40, see FIG. 3. Once a valid plan 42 reaches its Active Date, the plan 42 can be promoted to a production server (e.g. storage 224) for eventual access by the adjudication engine 40, once deployed in the storage 224 (see FIG. 3). Accordingly, the Plan 42 is a grouping of various attributes (e.g. of the hierarchies 260, 360) to assist in determining whether a dental service (or other insured products/services) of the claim 12 is covered and any restrictions on the reimbursement, a result of the adjudication processing 18.

Figure 6B:
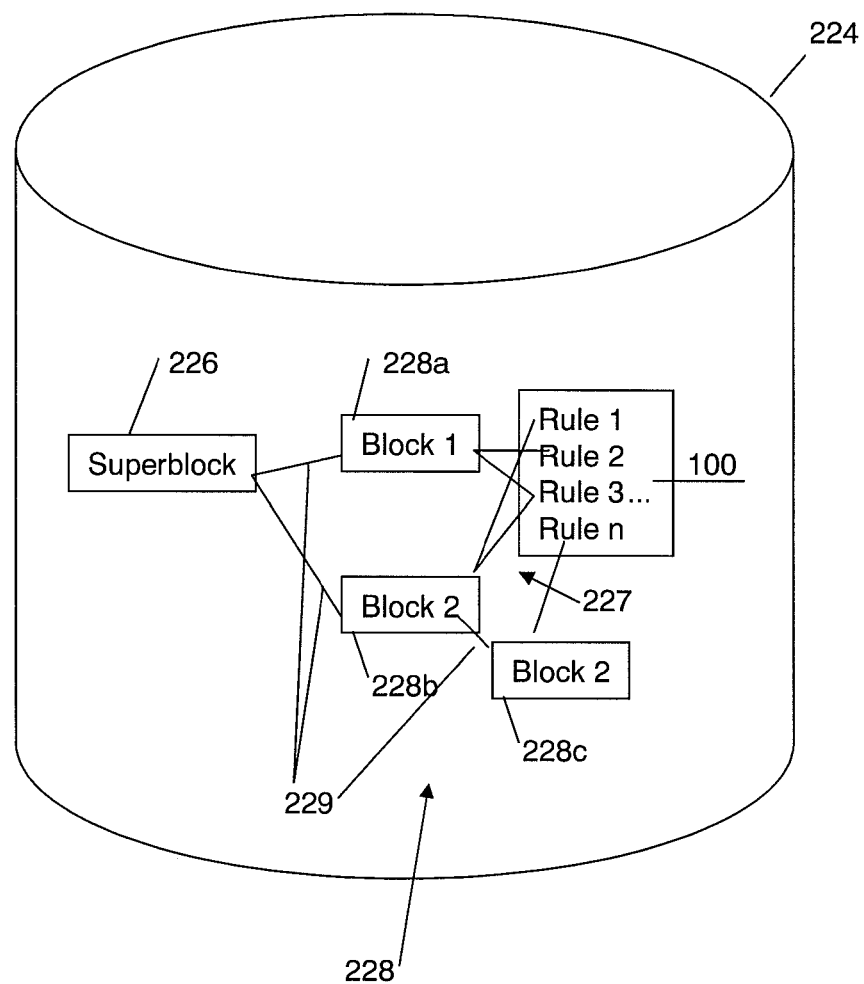
FIG. 6*b* shows a further embodiment of the rule data structure of FIG. 6*a*.
Figure 6C:
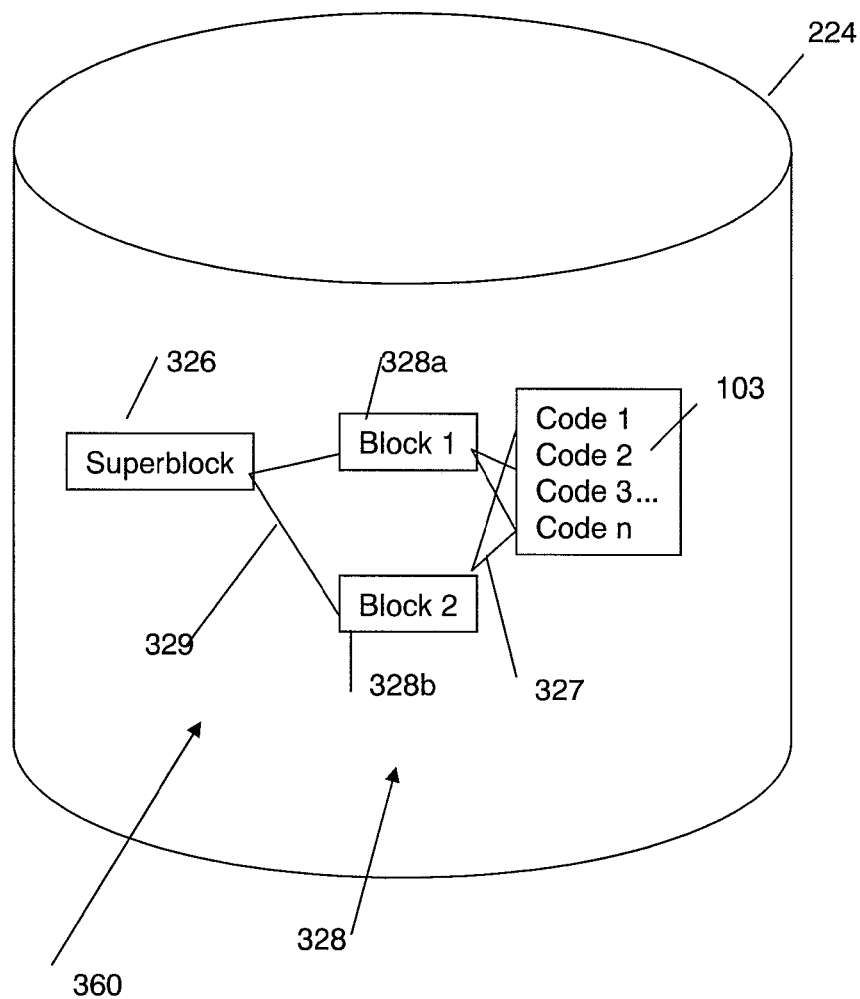
FIG. 6*c* shows an example embodiment of a service code data structure of FIG. 3.

Referring to FIG. 6c, a benefit hierarchy 360 allows users to create unique plan 42 configurations from a shared set of plan and benefit data, as well as to provide for instruction to the adjudication engine 40 in adjudication of the claims 12 that are associated with the respective deployed plan 42. The benefit hierarchy 360 can crosses multiple lines of business such as dental, drug, medical, and vision. Generally, each benefit super-block 326 can contain only blocks 328 of benefits 103 of the same business. However, for reporting purposes users can define super-blocks 326 that cross multiple lines of business. There can be basic elements in the benefit hierarchy 360, such as but not limited to: Benefit-Super-Blocks 326, Benefit-Blocks 328, and Benefits 103, which are linked to one another similarly to the arrangement of the rule blocks 226,228 and rules 100 (see FIGS. 6*a,b*), using references 327,329, as further described below.

Benefit Super-blocks 326 represents a grouping of benefit blocks 328 used to create an overall coverage list for the plan 42, such that the benefit super blocks 326 can be used to define the execution order of the blocks 328 listed/referenced 329 therein (e.g. each referenced block 328 in the list of blocks 328 in the super block 326 is processed (e.g. in sequential order as listed in the blocks 326). The Super Benefit Block 326 can be identified as an Inclusive or Exclusive grouping, for example. A Super Benefit Block 326 can include an Identifier, a Label Name, a Type and a Description. The Benefit Super-blocks 326 can be the highest object in the hierarchy 360, and are assigned to a plan 42, or as an override to an enrolment hierarchy (not shown). Super-blocks 326 can be assigned to the plan 42 and/or become a plan component. A super-block 326 can contain any number of benefit blocks 328, via references 329. Benefit blocks 328 can be included or excluded, and are time-lined via the references 329, allowing them to change over time if required. Benefit Super-Blocks 326 can be created in a number of different types, such as but not limited to: Coverage—include or exclude specific benefit blocks 328; Override—include or exclude benefits 103 and override plan coverage; Fiscal—assign specific Coinsurance, Deductible, and Maximum methods/functions; and Adjudication—assign specific rules 100 (for example, Pricing, COB, etc.) depending on business requirements.

A Benefit block 328 represents a grouping of other benefit blocks 328 or a logical grouping of benefit/service codes 103. A Benefit Block 326 can include an Identifier, a Label Name, a Type and a Description. These blocks 328 can represent industry-level categorization or carrier-specific groupings. Benefit blocks 328 can be created once and may be referenced by multiple plans 42. Benefit blocks 328 can be time-lined, meaning that a benefit block 328 can contain a different number of benefits 103 over time, as referenced by the references 327, providing for a benefit 103 that is no longer covered to remove itself from the block 328 (and in turn any associated plans 42 will no longer cover the benefit 103).

Benefits 103 generically refer to a claimable item such as a dental procedure or a pharmacy prescription, for example. A benefit code 103 is a re-usable component. Each benefit 103 can be defined only once, and can have a relationship 327 with multiple blocks 328. Each benefit 103 is defined with attributes such as benefit code, label, and line of business (dental/medical etc.). Most benefit codes 103 can be derived from the CDA industry standards, for example. Accordingly, benefit objects can exist only once in the database 224, regardless of how many times the appear in the rule hierarchy 360, since the benefit hierarchy 360 can be built on references to the benefit objects rather than containing the benefit objects themselves. One advantage in using references 327,329 is that it can allow for reuse of common benefits 103 and benefit containers 326,328 in a complex benefit hierarchy 360, such that when changes/modifications are done on a benefit object, the changes/modifications are only applied to the single instance of the benefit object rather than to multiple copies of the benefit objects.

A Benefit Block 326,328 is identified as a Type to indicate what the grouping is supporting. The following are valid types of benefit blocks 326,328, for example but not limited to: Coverage List—groupings to create the coverage list of service codes 103, such that these groupings can be made in benefit blocks 328 that will support the coinsurance structure of a policy; Plan—groupings created to support the fiscal restrictions within a plan 42, for example: if frequency is to be attached to 'exams', the Plan Specialist will group benefit blocks 326,328 and/or service codes 103 together an create a benefit block label 'exams', which can then allow the Plan Specialist to create a rule 100 using this label to set up parameterized values and structure the frequency as required by the policy of the plan 42; and Adj Logic—groupings created to support the dental (or other insurance types) interaction rules 100 required by the insurance industry (e.g. can be carrier specific, for example).

Parameterized Values of the benefit codes 103 can be attributes within a plan 42 or Rule 100 (e.g. via link 240—see FIG. 10) where the user can enter in a specific value. Benefit Inclusion is a term used to identify that a particular service code 103 or grouping of service codes 103 are additionally being covered outside of the defined plan 42—coverage list. Benefit Exclusion is a term used to identify that a particular service code 103 or grouping of service codes 103 are additionally being excluded from coverage outside of the defined plan 42—coverage list. Plan Components references functionality that is coded in the adjudication engine 42 to perform various functions related to the service codes 103 and rules 100 associated with the plan 42 used to assist in adjudication of the received claim(s) 12.

The contents of benefit blocks 328 are used to define a list of service codes 103 that are consider as eligible dental (or other insurance types) services for reimbursement. Benefit Block 326,328 labels are concise and make business sense. Benefit blocks 326,328 are intended to be re-used in the benefit hierarchy 360, and can also identify the coinsurance groupings of the covered insured services. Benefit block labels, when re-used for the fiscal coinsurance groupings, can be returned in a claims experience log(not shown).

As discussed above for use of references 227,229 with rules 100 and rule blocks 226,228, the benefit blocks 326, 328 and benefit codes 103 can also use similar references 327,329 to Set Expiry Dates for Benefit(s) 103 in a Block 328, and Set Effective Dates for Benefits 103 in a Block 328. As well, the references 329 can be used to set the respective linked block(s) 328 with the super-block(s) 326, thereby facilitating the time dependent and/or version 300 dependent inclusion of the codes 103 in the blocks 328 and/or time dependent and/or version 300 dependent inclusion of the blocks 328 in the superblocks 326, as desired, see FIG. 12*b*.

Accordingly, it is recognised that a super-block 326 may contain any number of benefit blocks 328. Benefit blocks 328 can be included or excluded and are time-lined 302 using the references 329, thus providing for the contents of the blocks 326 to change over time, if desired. For example, selecting a new expiry date for all selected blocks 328 will provide for the specified blocks 328 (via the reference(s) 329) will no longer be functional in this super block 326 after the expiry date has lapsed. Also, for example, selecting a new effective date for all selected blocks 328 will provide for the specified blocks will not be functional in this super block 326 until the effective date has been reached. Further, benefit super blocks 326 can be interpreted (e.g. sequentially) in the specified order in the hierarchy 360, in ascending order; benefits 103 that are part of an excluded block 328 are ignored if they are part of a later included block 328, for example.

It is recognised that the above described benefit hierarchy 360 is used by a plan manager 44 to assemble the rules 100 and benefit codes 103 (as ordered by the blocks 226,228, 326,328 and associated references 227,229,327,329 to create a specific plan version 42 that is then stored for use by the adjudication engine 40 in processing the received claims 12 that are associated with the specific plan version 42 as deployed in the memory 224.

Rule Hierarchy 260 and Benefit Hierarchy 360

As shown in FIG. 6a,b, rules 100 are grouped into blocks 228 and superblock 226 for processing by the engine 40 and for visualization by the user when using the rule/benefit composer engine 200. A superblock 226 can be the highest container in the hierarchy 260 (other than the specific carrier 231) such that each of the other blocks 226,228 and rules 100 related to the superblock 226. There may be no limit on the number of blocks 226,228 so a particular rule hierarchy 260 can theoretically have any number of tiers (e.g. having block 226 to block 226 links, block 226 to block 228 links, block 228 to block 228 links, and block 228 to rule 100 links, as well as block 226 to rule 100 links where appropriate). The grouping of rules 100 into blocks 228 and superblocks 226 is dependent on the wishes of the user. As an example, a user of the engine 200 may wish to configure the hierarchy 260 to have a superblock 226 for standards set by the Canadian Dental Association and a second superblock 226 for customized business logic for processing claims 12. As another example, a user may wish to have a superblock 226 for different insurance types such as dental, automobile, life insurance as will be appreciated. The superblock 226 node contains child nodes representing a first level of rule blocks 228. The first level of rule blocks 228 may contain additional rule blocks 228 or rules, depending on how many container levels the hierarchy 260 is configured for.

The rule hierarchy 260 can be both an interactive visual representation (e.g. with the user via the composer engine 200) of the relationship(s) between rule objects, and a data structure in the rules database 224 which describes the relationship between rule objects for use by the adjudication engine 40 in processing of the claims 12. It will be appreciated that each rule object (i.e. superblock 226, blocks 228 and rules 100) may exist only once in the database 224 but is referenced by each other rule objects that it is related to in a parent or child relationship of the hierarchy 260. For example, in a situation where there is only one superblock 226, each other rule object is referenced 229 in the database 224 by the superblock 226. The reference(s) 227, 229 may be implemented via generic fields in a data record that stores data (for e.g. attributes) of the blocks 226,228. In another embodiment, a data record of the blocks 226,228 may reference 227,229 a (e.g. dynamic) table that contains references 227, 229 to each of the other rule objects that are in a child relationship with the block. The references 227, 229 to rule objects may be in the form of a globally unique identifier or GUID, or other type of identifier, which is a type of identifier used in the engine 200,40 applications in order to provide a reference number which is unique in any context (hence, "globally"), for example, in defining the internal reference for a type of access point in a set of stored instructions for execution by the computer processor 150 in FIG. 13, or for creating unique keys in a database. The reference 227 to a rule 100 can also indicate whether a rule object is a child or parent of another rule object (e.g. rule block 228).

The benefit hierarchy 360 can be both an interactive visual representation (e.g. with the user via the composer engine 200) of the relationship(s) between benefit objects, and a data structure in the database 224 which describes the relationship between benefit objects for use by the adjudication engine 40 in processing of the claims 12. It will be appreciated that each benefit object (i.e. superblock 326, blocks 328 and benefit 103) may exist only once in the database 224 but is referenced by each other benefit objects that it is related to in a parent or child relationship of the hierarchy 360. For example, in a situation where there is only one superblock 326, each other benefit object is referenced 329 in the database 224 by the superblock 326. The reference(s) 327, 329 may be implemented via generic fields in a data record that stores data (for e.g. attributes) of the blocks 326,328. In another embodiment, a data record of the blocks 326,328 may reference 327,329 a (e.g. dynamic) table that contains references 327, 329 to each of the other benefit objects that are in a child relationship with the block. The references 327,329 to benefit objects may be in the form of a globally unique identifier or GUID, or other type of identifier, which is a type of identifier used in the engine 200,40 applications in order to provide a reference number which is unique in any context (hence, "globally"), for example, in defining the internal reference for a type of access point in a set of stored instructions for execution by the computer processor 150 in FIG. 13, or for creating unique keys in a database. The reference 327 to a benefit 103 can also indicate whether a benefit object is a child or parent of another benefit object (e.g. benefit block 328).

FIG. 6b illustrates the structural data relationship between rule objects. Rule objects refer collectively to superblocks 226, blocks 228 and rules 100. As shown, each rule object may exist once in the rules database 224. It is to be appreciated that the rule objects may exist in a single database 224 or in multiple databases that reference each other. As shown, superblock 226 references two blocks 228a and 228b. Block 228a references rule 2 and 3, and block 228b references rule 1 and rule 3. Superblock 226 also references rules 1, 2 and 3 by its own reference to blocks 228a, 228b. In another embodiment, superblock 226 may directly reference rules 100 in addition to blocks 228a, 228b. Further block 228b refers to block 228c which refers to rule "n".

When a user interacts with the tool 12 and changes the hierarchical relationship between rule objects, a rule engine 200 implements the change by changing the references in the rules database 224 as is described below. It will be appreciated that if any of the rule objects are moved and/or deleted, the structural relationship depicted in FIG. 3b will be altered by the rule engine 200, a new data structure (e.g. rule hierarchy 260) will exist in the rules database 224 or collection of rules databases 224.

Figure 7:
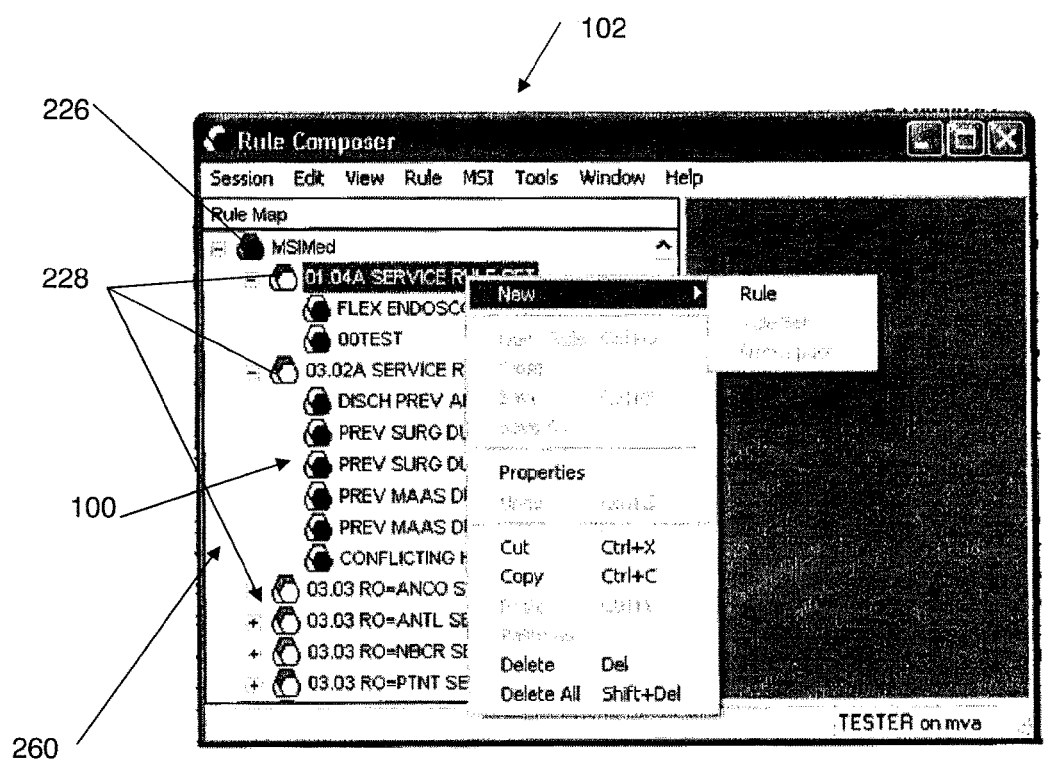
FIG. 7 is an example interface of the rule engine 20 of FIG. 2.

An exemplary rule hierarchy 260 is illustrated in FIG. 7. As shown, the rule hierarchy 260 has a superblock 226 entitled 'MSIMed', several blocks 228 and several rules 100. A user is able to expand the rule hierarchy 260 (e.g. using a hierarchy module 204 of the engine 2000—see FIG. 11) by clicking on the '+' buttons and is able to contract the hierarchy 260 by clicking on the '−' buttons via the interface 102 (see FIG. 13). In this way a user is able to precisely focus on a particular rule 100, a block 228 or a superblock 226 as desired. The rule hierarchy 260 can be a graphical tree view that is similar to a folder tree view of a file system as displayed on the display 152, for example. The nodes on the tree view represent the Rule Objects in the rule hierarchy 260 in a parent-child relationship.

The order in which rules 100 and rule block 228 are evaluated by the adjudication engine 40 can affect the adjudication result of the claims 12. New rules 100 and rule blocks 228 can be placed at the bottom of the hierarchy 260 by default, for example. To rearrange the order of the rules 100 in the hierarchy 260 using the engine 200, a user can drag and drop rule objects wherever desired so that the new rule object is in the target node. When a user moves a rule object, the rule engine 200 instructs component modules (e.g. module 202, 204, 206, 208, 210) of the engine 200 to modify the data relationship between the moved rule objects and to render a new visual rule hierarchy 260 to the screen as is described below.

One example implementation of the rule hierarchy 260 is where individual rules 100 can only exist at the bottom most rule container 228 level and that rule containers 226,228 that contain a rule object 100 (e.g. via references 227,229) cannot be moved to a different level of the hierarchy 260. These reference limitations, as managed by the Hierarchy manager 204, help to reduce the complexity of maintaining the hierarchy 260 of circular references 227, as desired. It is recognised that there can be a number of hierarchy levels containing secondary containers 228 (i.e. a secondary container references 227 another secondary container 228 which then references 227 the rules 100, e.g. Block 228*b* references Block 228*c* which references the rules 100).

Further, the benefit hierarchy 360 has a superblock 326, several blocks 328 and several benefits 103, for example. A user is able to expand the benefit hierarchy 360 (e.g. using a hierarchy module 204 of the engine 200—see FIG. 11) by clicking on the '+' buttons and is able to contract the hierarchy 360 by clicking on the '−' buttons via the interface 102 (see FIG. 13). In this way a user is able to precisely focus on a particular benefit 103, a block 328 or a superblock 326 as desired. The benefit hierarchy 360 can be a graphical tree view that is similar to a folder tree view of a file system as displayed on the display 152, for example. The nodes on the tree view represent the benefit Objects in the benefit hierarchy 260 in a parent-child relationship.

The order in which benefits 103 and benefit blocks 326,328 are evaluated by the adjudication engine 40 can affect the adjudication result of the claims 12. New benefits 103 and blocks 328 can be placed at the bottom of the hierarchy 360 by default, for example. To rearrange the order of the benefits 103 in the hierarchy 360 using the engine 200, a user can drag and drop benefit objects wherever desired so that the new benefit object is in the target node. When a user moves a benefit object, the engine 200 instructs component modules (e.g. module 202, 204, 206, 208, 210) of the engine 200 to modify the data relationship between the moved benefit objects and to render a new visual benefit hierarchy 360 to the screen 152 as is described below.

One example implementation of the benefit hierarchy 360 is where individual benefits 103 can only exist at the bottom most benefit container 328 level and that benefit containers 326,328 that contain a benefit object 103 (e.g. via references 327,329) cannot be moved to a different level of the hierarchy 360. These reference limitations, as managed by the Hierarchy manager 204, help to reduce the complexity of maintaining the hierarchy 360 of circular references 327, as desired. It is recognised that there can be a number of hierarchy levels containing secondary containers 328 (i.e. a secondary container references 327 another secondary container 328 which then references 327 the benefits 103, e.g. Block 328 references Block 328 which references the benefits 103).

Composer Rule/Benefit Engine 200

Reference is next made to FIG. 11, which illustrates the Engine 200 of the claims processing environment 10. The engine 200 is for, such as but not limited to, creating, editing, organizing and maintaining adjudication rules 100 in a hierarchical relationship 260 and/or creating, editing, organizing and maintaining adjudication benefit codes 103 in a hierarchical relationship 360, as well as links 240—see FIG. 10—between the rules 100 and benefit codes 103 (it is recognised that the links 240 can also be established between the rules 100 and the blocks 326,328 and/or between the benefits 103 and the blocks 226,228, as desired).

The engine 200 includes a composer module 202 for creating, editing, deleting and saving individual rules 100 and benefits 103, as well as other objects of the hierarchies 260,360. A user of the engine 2000 interacts with the interfaces 102,152 (see FIG. 13) to create, edit, delete and save adjudication rules 100 and benefits 103, as well as the relationships (e.g. parent/child) between blocks 226, blocks 228, and rules 100, as well as the relationships (e.g. parent/child) between blocks 326, blocks 328, and benefits 103, as well as their execution order as organized by the ordering of the references 227,229,327,329 within the respective blocks 226,228,326,328. The composer module 202 performs functions as dictated by the user via the interface 102 and the composer module 202 saves adjudication rules 100 into the local database 124 in the form of the rules hierarchy 260. The composer module 202 performs functions as dictated by the user via the interface 102 and the composer module 202 saves adjudication benefit codes 100 into the local database 124 in the form of the benefit hierarchy 360. The engine 200 can also use the composer module 202, for example, to transfer completed hierarchies 260,360 to the storage 224 for use in deployment of the plan 42.

The engine 200 can also includes a compiler 206 for converting rule and benefit statements into an extensible mark-up language such as XML or into machine readable code, for subsequent use in adjudication of the claims 12 by the adjudication engine 40, whereby the links 240 are used to couple the rules 100 with the benefits 103, for benefits 103 associated with specific rules 100 as is known in the art. In an embodiment of the tool, the compiler 206 converts a rule 100 into XML whenever the user interacts with a compile button (not shown) on the user interface 102. XML is a general-purpose specification for creating custom markup languages. It is classified as an extensible language, because it allows the user to define the mark-up elements. XML's purpose is to aid information systems in sharing structured data of the database 224, especially via the Internet, to encode documents, and to serialize data. In another embodiment, the engine 200 interprets a rule 100 statement in real time and renders an error message if the rule does not meet the syntax standards required and enforced by the engine 200.

It is also recognised that the engine 200 can also be used for, such as but not limited to, creating, editing, organizing and maintaining the benefit codes 103 in the hierarchical relationship 360. The engine 200 includes the composer module 202 for creating, editing, deleting and saving individual rules 100 and/or benefit codes 103. The composer module 202 performs functions as dictated by the user and the composer module 202 saves benefit codes 103, and their configuration, into the database 224. The engine 200 also includes a compiler 206 for converting benefit code 103 statements into an extensible mark-up language such as XML or into machine readable code. In an embodiment of the tool, the compiler 206 converts the codes 103 into XML whenever the user interacts with a compile button (not shown) on the user interface 102. In another embodiment, the engine 200 interprets code 103 statements in real time and renders an error message to the interface 102 if the code statement 103 does not meet the syntax standards required and enforced by the engine 200. The engine 200 can also use the composer module 202, for example, to transfer completed hierarchies 260,360 to the storage 224 for use in deployment of the plan 42.

The order in which codes 103 and blocks 328 are evaluated by the adjudication engine 40 can affect the adjudication result of the claims 12. New codes 103 and blocks 328 are placed at the bottom of the hierarchy 360 by default, for example. To rearrange the order, a user can drag and drop code objects (e.g. codes 103, blocks 326, blocks 328) wherever desired so that the new code object is in the target node. When a user moves a code object, the rule engine 200 instructs component modules of the engine 200 to modify the data relationship between the moved code objects and to render a new visual code hierarchy 360 to the screen (e.g. interface 102) as is described below.

One example implementation of the code hierarchy 360 is where individual codes 103 can only exist at the bottom most code container 328 level and that containers 326,328 that contain a code object 103 (e.g. via references 327,329) cannot be moved to a different level of the hierarchy 360. These reference limitations, as managed by the Hierarchy manager 204, help to reduce the complexity of maintaining the hierarchy 360 of circular references 327, as desired. It is recognised that there can be a number of hierarchy levels containing secondary containers 328 (i.e. a secondary container references 327 another secondary container 328 which then references 327 the codes 103.

Accordingly, the engine 200 can be considered a GUI application for defining plans 24, for eventual deployment in the database 224 for specified carrier/patient relationships. The engine 200 provides for grammar logic 212 to be based on operators, methods, business objects, and their attributes. Data types may be defined and enforced within the grammar logic 212 definitions, so that, for example, a date can only be compared to a date. The adjudication engine 40 can export its plan 42 configuration to the composer engine 200 (e.g. into the local memory 124) so that the exported plans 42 can be edited by the composer engine 200, for example. As well, the composer engine 200 is configured so that it can export any changed plan 42 definitions (e.g. content and/or configuration of the hierarchies 260,360) back to the database 224 and have those exported items (e.g. plan components, rule sets benefit sets, rule/benefit blocks, and individual rules 100/benefits 103, as well as links 240 therebetween) re-evaluated and compiled into code (e.g. Java byte code) for use by the engine 40 in adjudication of received claims 12 that pertain to the now redeployed plan 42. It is also recognised that the redeployed plan 42 could also be reconfigured by the plan manager 44 (e.g. for specified inclusion/exclusion of blocks 226,228,326,328, rules 100, benefits 103, links 240) by using the edited plan 42 returned/exported by the engine 200 back to the database 224.

Composer Module 202

The composer module 202 of the rule engine 200 can provide a graphical view of the rule database called a Rule Map of the rule hierarchy 260 (see FIG. 7), as well as a benefit map of the code hierarchy 360, not shown. The Rule Map shows the current Rule Organization and active Rules 100 based on the system date. The Rule Map provides access through the Rule Containers 226, 228 to individual Rules 100 for viewing and editing. Management of the Rule Container hierarchy 260 can be done through drag/drop and cut/paste features on Rule Map via the rule manager 202, and/or through the hierarchy manager 204, further described below.

The composer module 202 is used to manage the rule inclusions 227 within a Rule Block 228, for example. As described with reference to FIG. 12a, the Timeline 302 feature is applicable to the organization of Rules 100 within Rule Blocks 228. The Timeline 302 keeps track of where and when Rules 100 are included in the Rule Block 228. This means that a snapshot of the rule data that is in effect at any point in time is available. The point in time can be in the past or future. This feature is useful for processing claims 12 that have been back dated and for implementing changes that are future dated, as the rule hierarchy 260 provides guidance for instructing the engine 40 in processing claims 12 using appropriate rules 100 and/or benefits 103 where the claim service date matches the effective/expiry date(s) of the associated references 227,229,327,329.

It is recognised that timelines 302 are not the same as Rule Versions 300, where: Rule Versions 300 track the history of changes to the definition of a rule 100. Timelines 302 track when and where a Rule 100 is used and do not specify a particular Rule Version 300, for example. However, it is recognised that the timelines 302 can also be used to specify particular rule versions 300, when desired.

The Rule Map of the hierarchy 260 can show the Rule 100 organization that is in effect at the current time as determined by the clock (or other defined chronological time) of the user interface 102. The Rule Map displays Rule Inclusions 227 depending on their status, for example using color and font style differences/distinctions (e.g. Expired Rule Inclusions 227 can be displayed in grayed type, unreleased Rule Inclusions 227 can be displayed in normal type, and released Rule Inclusions 227 are displayed in bold type).

The composer module 202 can provide a detailed view and addition/modification of the Rule Inclusions 227 over time. This view can be logically segmented into Time Spans. Each Time Span can represent a period in which the Inclusions 227 are static. The boundary between Time Spans represent the point in time where at least one Inclusion 227 changes. Time spans can be calculated in memory by the application and may not necessarily map one for one with records in a Rule-Rule Block table of the hierarchy 260. For example, A Rule Dependency Map is displayed on each composer module 202 window (displayed in the interface 102) next to the a Text/Tree View of the rule 100. The Dependency Map can show the all Rule Blocks 228 that reference 227 that rule 100 and in turn the Rule Super Blocks 226 that reference 229 the Rule Blocks 228 (see FIG. 7 for example). It is recognised that composer module 202 can configure and display to the user (via the interface 102) current and historical views of the Rule Blocks 226,228.

It is to be appreciated that a rule statement may be referenced by any number of blocks 228 or superblocks 226; however, each rule 100 will only exist once in the rules database 224.

Dependency Manager 208

Figure 8:
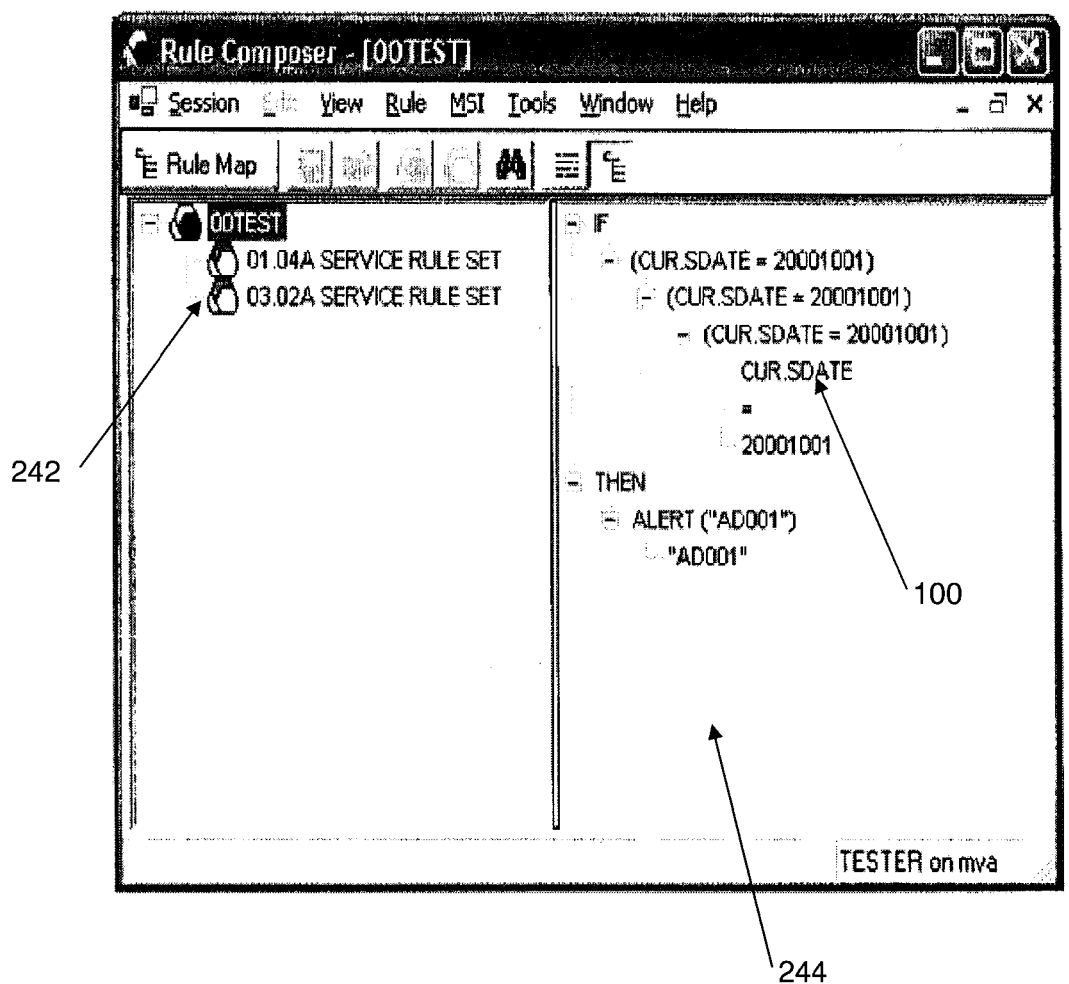
FIG. 8 is another example interface of the rule engine 20 of FIG. 2.

The engine 200 includes a Dependency Manager 208 for tracking the relationship between rules 100 and blocks 228 and superblocks 226. The advantage of using references to rules 100 rather than actual copies is the ability to share common rule objects. Changes made to a rules object are automatically picked up by all the references to the rule object. It is appreciated, however, that with the possibility of any number of references to a rule object it may be difficult to keep track of the dependencies. The dependency manager 208 is operable to manage the dependencies of each rule object and to visually display the dependency relationship as a dependency map for the convenience of the user. The dependency map 242 helps a user keep track of rule dependencies by mapping the rule hierarchy 260 from the bottom up. Each rule container (or rule block 226,228) is shown with its parent container and so on up the family tree. An exemplary dependency map 242 is illustrated in FIG. 8. As shown, rule 240 is named '00TEST' and is connected to two different rule blocks 228, namely '01.04A SERVICE RULE SET' and '03.02A SERVICE RULE SET'. As shown, the dependency map 242 is shown to the left of the rule editor window 244, although it is to be appreciated that the dependency map 242 may be located in any location on the visual interface. As the user edits the rule 246, the user is able to visualize that each reference to the rule 246 will also be modified.

The engine 200 includes a Dependency Manager 208 for tracking the relationship between benefits 103 and blocks 328 and superblocks 326. The advantage of using references to benefits 103 rather than actual copies is the ability to share common benefit objects. Changes made to a benefits 103 object are automatically picked up by all the references to the rule object. It is appreciated, however, that with the possibility of any number of references to a benefit object it may be difficult to keep track of the dependencies. The dependency manager 208 is operable to manage the dependencies of each benefit object and to visually display the dependency relationship as a dependency map for the convenience of the user. The benefit dependency map helps a user keep track of benefit dependencies by mapping the benefit hierarchy 360 from the bottom up. Each benefit container (block 326,328) is shown with its parent container and so on up the family tree.

Search Module 210

The rule engine 200 also includes a search module 210 for allowing a user to find a particular rule 100 (as well as blocks 226,228) in the rules database 224 for editing, deletion or for analysis. When the user interacts with a searching window on the user interface 102, the rule module 202 communicates with the searching module 210 and instructs the searching module to find rules 100/blocks 226,228 that correspond to the searching criteria pre-entered by the user. The searching module 210 queries with the rule database 224 with the searching criteria. If one or more rules 100/blocks 226,228 are returned from the database 224, the searching module renders the results as a list of rules 100/blocks 226,228 on the visual interface 102. If no rules 100/blocks 226,228 are returned from the database 224 that match the searching criteria, the searching module 210 notifies the user that no rules 100/blocks 226,228 were found.

The rule engine 200 also includes the search module 210 for allowing a user to find a particular benefit 103 (as well as blocks 326,328) in the rules database 224 for editing, deletion or for analysis. When the user interacts with a searching window on the user interface 102, the module 202 communicates with the searching module 210 and instructs the searching module to find benefits 103/blocks 326,328 that correspond to the searching criteria pre-entered by the user. The searching module 210 queries with the rule database 224 with the searching criteria. If one or more rules benefits 103/blocks 326,328 are returned from the database 224, the searching module renders the results as a list of benefits 103/blocks 326,328 on the visual interface 102. If no benefits 103/blocks 326,328 are returned from the database 224 that match the searching criteria, the searching module 210 notifies the user that no benefits 103/blocks 326,328 were found.

Hierarchy Module 204

The rule engine 200 also includes a hierarchy module 204 for managing the child-parent relationships in the rules database 224 and the visual representation of the hierarchy 260 on the interface 102. The rule engine 200 also includes the hierarchy module 204 for managing the child-parent relationships in the database 224 and the visual representation of the hierarchy 360 on the interface 102.

Users of the tool interact with rule/benefit objects via the interface 102, an example of which is shown in FIG. 9. As shown, a user is able to click on the components of a rule object with a mouse cursor. For example, if the user wishes to change parameter '20000101', the user is able to click on the parameter and directly change its value by typing on the keyboard. Once the user is satisfied with the new value, the user can choose to save the rule 100 in the memory 124 associated with the engine 200. The interaction is processed by the module 202 which is operable to save the new rule 100/benefit 103 object in the rules database 224. Likewise, when a user moves a rule 100/benefit 103 to another location in the hierarchy 260, 360, the module 202 instructs the hierarchy module 204 to change the references to the rule 100/benefits 103 in the rules database 224. The dependency module 208 also manages the dependency relationship and renders the new dependency relationship to the visual interface 102 as a dependency map 242 when the user wishes to view the dependency map 242 for a particular rule 100/benefit 103.

The dependency module is also adapted for coupling the adjudication rules 100 to the secondary rule container 228 by the rule reference 227 associated with the content of the secondary rule container 228 and is adapted for coupling the secondary rule container 228 to the primary rule container 226 by the container reference 229 associated with the content of the primary rule container 226, such that the adjudication rules 100, the containers 226,228, and the rule and container references 227,229 define the rule hierarchy 260 for representing the set of adjudication rules.

Electronic Device 101

Figure 13:
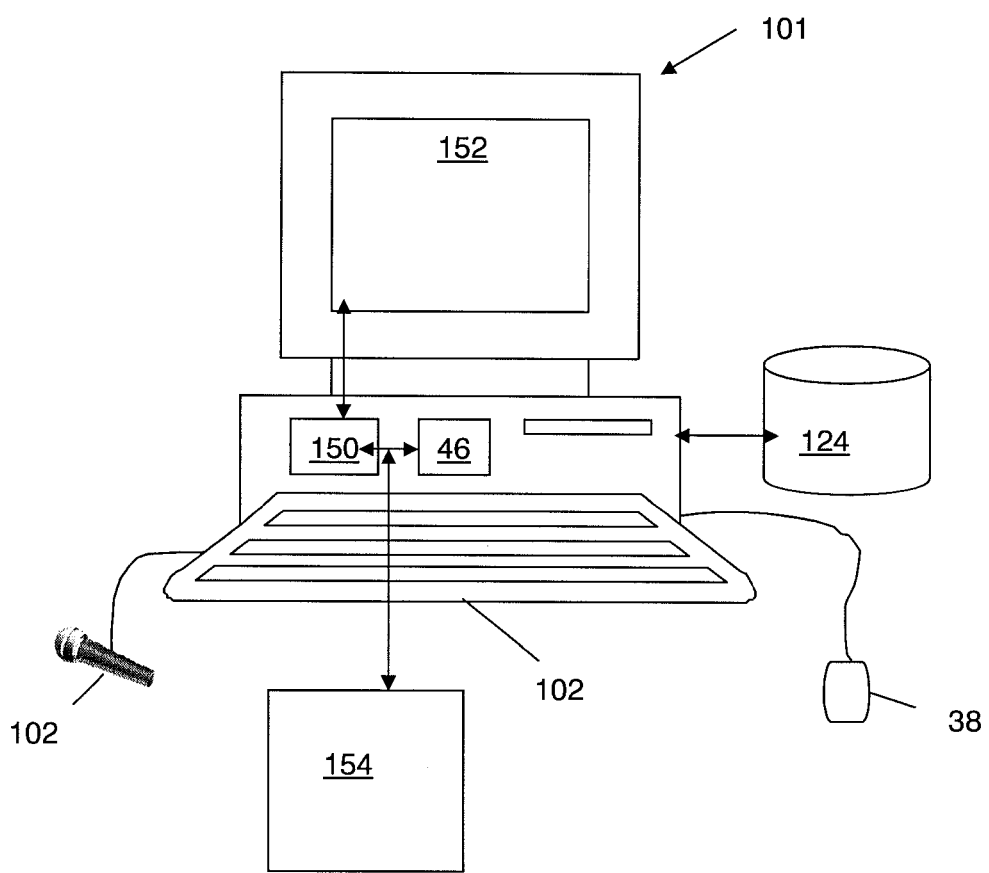
FIG. 13 shows a block diagram of a computer device for implementing the components of the environment of FIG. 1.

Referring to FIG. 13, a generic electronic device 101 can include input devices 102, such as a keyboard, microphone, mouse and/or touch screen by which the user interacts with the visual interface 102. It will also be appreciated that the engine 40, 200 resides on an electronic device 101, for example as separate devices 101 for the engine 40 and the engine 200, for example. A processor 150 can co-ordinate through applicable software the entry of data and requests into the memory 124,224 and then display the results on a screen 152. A storage medium 46 can also be connected to device 101, wherein software instructions and/or member data is stored for use by the engine 40, 200. As shown, the device 101 also includes a network connection interface 154 for communicating over the network 11 with other components of the environment 10 (see FIG. 1), e.g. the engine 200 can communicate to the database 224, the engine 40 can communicate with the database 224, and the engines 40,200 can communicate with one another.

The stored instructions on the memory 124 can comprise code and/or machine readable instructions for implementing predetermined functions/operations including those of an operating system, the engine 40, 200 configuration, or other information processing system, for example, in response to commands or inputs provided by a user of the engine 40, 200. The processor 150 (also referred to as module(s) for specific components of the engines 40, 200) as used herein is a configured device and/or set of machine-readable instructions for performing operations as described by example above.

As used herein, the processor/modules in general may comprise any one or combination of, hardware, firmware, and/or software. The processor/modules act upon information by manipulating, analyzing, modifying, converting or transmitting information for use by an executable procedure or an information device, and/or by routing the information with respect to an output device. The processor/modules may use or comprise the capabilities of a controller or microprocessor, for example. Accordingly, any of the functionality provided by the systems and processes of FIGS. 1-15 may be implemented in hardware, software or a combination of both. Accordingly, the use of a processor/modules as a device and/or as a set of machine readable instructions is hereafter referred to generically as a processor/module for sake of simplicity.

It will be understood by a person skilled in the art that the memory 124,224 storage described herein is the place where data is held in an electromagnetic or optical form for access by a computer processor. In one embodiment, storage 124, 224 means the devices and data connected to the computer through input/output operations such as hard disk and tape systems and other forms of storage not including computer memory and other in-computer storage. In a second embodiment, in a more formal usage, storage 124,224 is divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be much faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

Referring to FIG. 2, the engines 40,200 reside on and are implemented by one or more generic electronic devices 101. Generic device 101 may be a server that makes available the engine 40,200 to the user over the network 11. As known, device 101 may include input devices 102, such as a keyboard, microphone, mouse and/or touch screen by which the user of the engine 40,200 interacts with the engine 40,200 via the visual interface 102. A processor 152 can co-ordinate through applicable software the entry of data and requests into the memory 124,224 and then display/present the results on a screen as visual representation 102,152. Further, it is recognised that the visual representation 102,152 (e.g. the hierarchies 260,360) can be presented (as a result of operation of the engine 40,200) to the user on their client (e.g. of the engine 40,200 implemented on a networked server) electronic device 101 via the network 11. A storage medium 46 can also be connected to device 101, wherein software instructions, applications 14, member data, and other data is stored for use by the engine 40, 200, for execution by the respective processor(s) 150.

The software instructions may comprise code and/or machine readable instructions for implementing predetermined functions/operations including those of an operating system, the engine 40,200, or other information processing system, for example, in response to commands or inputs provided by a user and/or the provider of the engine 40,200. The processor 150 (also referred to as module(s) for specific components of the engine 40,200) as used herein is a configured device and/or set of machine-readable instructions for performing operations as described by example above. Some or all of the modules of the engine 40,200 may be distributed across a network as applications or reside on the electronic device 101. As is understood, some or all of the modules of the engine 40,200 may also be downloadable to the electronic device 101.

As used throughout, the processor/modules on the device 101 of the engine 40,200 in general may comprise any one or combination of, hardware, firmware, and/or software. The processor/modules act upon information by manipulating, analyzing, modifying, converting or transmitting information for use by an executable procedure or an information device, and/or by routing the information with respect to an output device. The processor/modules may use or comprise the capabilities of a controller or microprocessor, for example. Accordingly, any of the functionality provided by the systems and processes of FIGS. 1-15 may be implemented in hardware, software or a combination of both. Accordingly, the use of a processor/modules as a device and/or as a set of machine readable instructions is referred to generically as a processor/module for sake of simplicity.
Database 224

A database or tables 224 is a further embodiment of memory as a collection of information that is organized so that it can easily be accessed, managed, and updated. In one view, databases can be classified according to types of content: bibliographic, full-text, numeric, and images. In computing, databases are sometimes classified according to their organizational approach. As well, a relational database is a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Computer databases 224 typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory storage is the electronic holding place for instructions and data that the computer's microprocessor 150 can reach. When the computer 101 is in normal operation, its memory 124,224 usually contains the main parts of the operating system and some or all of the application programs and related data that are being used. Memory is often used as a shorter synonym for random access memory (RAM). This kind of memory is located on one or more microchips that are physically close to the microprocessor in the computer.
Example Operation of the Adjudication Engine 40

Figure 14:
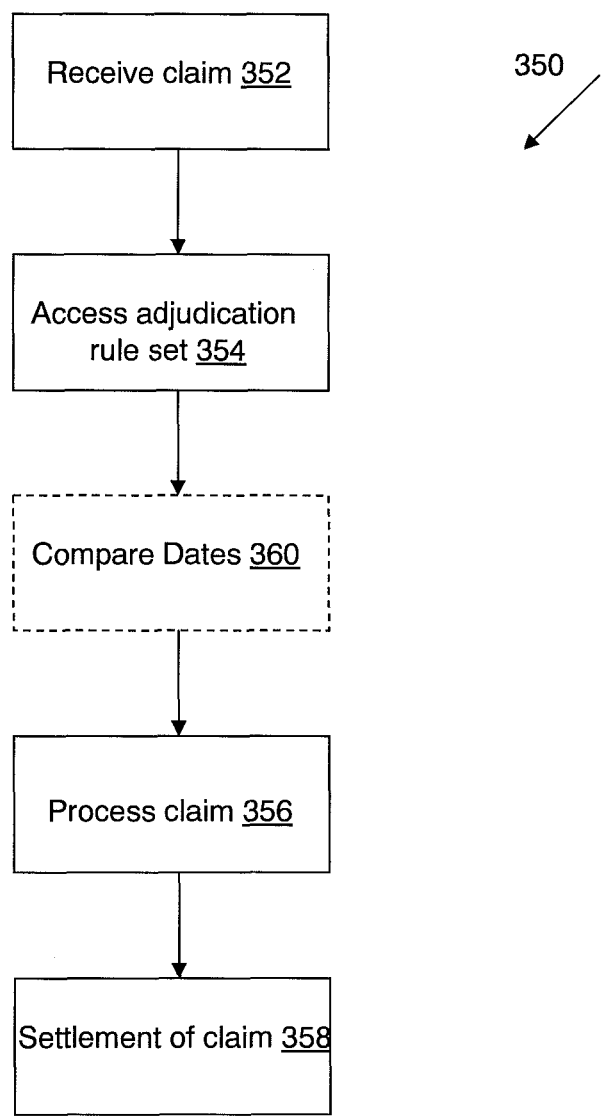
FIG. 14 is a flow-chart of the steps performed by the adjudication engine of the environment of FIG. 2.

Referring to FIG. 14, shown is an example operation 350 of the adjudication engine 40 for processing insurance claims 12 using a set of adjudication rules. At step 352, the adjudication engine 40 receives the claim 12 for processing, the received claim 12 having claim content including a claim date. At step 354, the adjudication engine accesses the set of adjudication rules in the database 224 appropriate to the content of the received claim 12. The set of adjudication rules is structured in a plurality of containers including a primary rule container 226 and a plurality of secondary rule containers 228, each of the plurality of secondary rule containers 228 being coupled to the primary rule container 226 by a respective container reference 229. Each of the plurality of secondary rule containers 228 contains one or more adjudication rules 100 adapted for processing the claim content of the received claim 12, such that each of the one or more adjudication rules 100 is coupled to their respective secondary container 228 by their respective rule reference 227, wherein the set of adjudication rules defines the rule hierarchy 260. At step 356, the adjudication engine 40 processes the content of the received claim 12 with the one or more adjudication rules 100 facilitated by an execution order defined by the ordering of the container references 229 in the primary rule container 226. At step 358, the result of the processed claim is used to determine subsequent settlement of the received claim 12.

It is recognised in step 356, the processing of the claim content can include accessing a set of benefit codes 103 appropriate to the received claim 12, such that the set of benefit codes 103 is structured in a plurality of benefit containers including a primary benefit container 326 and a plurality of secondary benefit containers 328. Each of the plurality of secondary benefit containers 328 is coupled to the primary benefit container 326 by their respective benefit container reference 329. Each of the plurality of secondary benefit containers 328 contains one or more benefit codes 103 adapted for processing the claim content of the received claim 12, such that each of the one or more benefit codes 103 is coupled to their respective secondary benefit container 328 by their respective benefit reference 327, wherein the set of benefit codes 103 defines the benefit hierarchy 360.

It is also recognised that an optional step is 360 is comparing the claim date to the effective date(s) and/or expiry date(s) of the container references 227,229,327,329, in order to determine if the respective secondary rule containers 228 are part of the set of adjudication rules for use in processing the received claim 12, such that the non-matching dates exclude the respective secondary rule container 228 from being included in the execution order. As well, part of the optional step can include comparing the claim date to the effective date(s) and/or expiry date(s) of the container references 227,229,327,329, in order to determine if the respective rules 100 are part of the set of adjudication rules for use in processing the received claim 12, such that the non-matching dates exclude the respective rules 228 from being included in the execution order of their secondary containers 228. It is recognised that similar comparisons can be done for the inclusion/exclusion decision making for the benefit codes 103 and the secondary benefit containers 328, as desired.

Example Operation of the Composer Engine 200

Figure 15:
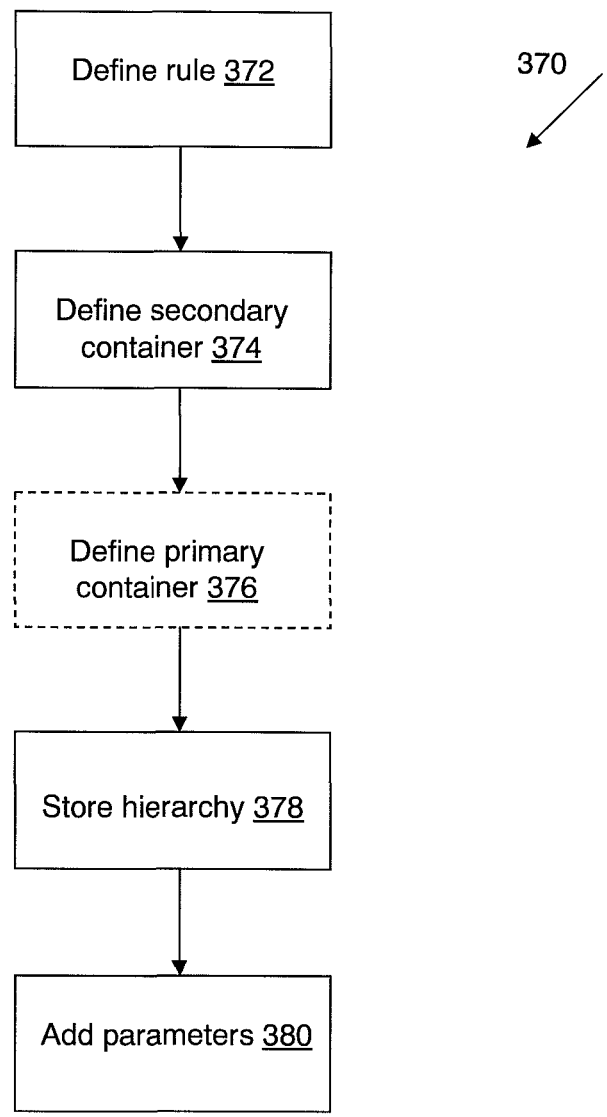
FIG. 15 is a flow-chart of the steps performed by the composer engine of the environment of FIG. 2.

Referring to FIG. 15, shown is an example operation 370 of the composer engine 200 for generating a set of adjudication rules for use in processing an insurance claim, the set of adjudication rules representing the hierarchy 260. At step 372, defining adjudication rule(s) 100. At step 374, defining a secondary rule container 228 and coupling the adjudication rule 100 to the secondary rule container 228 by a rule reference 227 associated with the content of the secondary rule container 228. At step 376, defining a primary rule container 226 and coupling the secondary rule container 228 to the primary rule container 226 by a container reference 229 associated with the content of the primary rule container 226, such that the adjudication rule 100, the containers 226,228, and the rule and container references 227,229 defining the rule hierarchy 260 for representing the set of adjudication rules. At step 378, storing the set of adjudication rules in the memory 124,224; wherein the set of adjudication rules is configured to facilitate the processing of content of the insurance claim 12 with the adjudication rule by an execution order defined by the ordering of the container reference 229 in the primary rule container 226. At step 380, adding parameter values to the adjudication rules. It is recognised that similar steps can be done to the above, in order to include benefit codes in a benefit hierarchy 360 linked 240 to the rules 100, as described by example above.

Example Implementation of the Composer Engine 200

Referring to the following pages, the composer engine 200 is referred to as a rule composer which is used as an application, i.e. a set of instructions stored on a computer readable medium that is executable by a computer processor (see FIG. 13). Further description and example display screens for the rule composer are provided below in the attached Appendix. It is also recognised that all the example display screens could be configured for display on the user interface 102 of the device(s) 101 associated with use of the composer engine 200 by the user. The rule composer is used to develop and maintain the adjudication rules 100 (and benefits 103 where applicable) and their configured hierarchy 260,360 for use by the adjudication engine 40, see FIG. 2. It is recognised that the following example is only meant as one embodiment of a number of possible embodiments of the contents and functionality of the rule engine 200 and it's modules.

Appendix

Rule composer Overview

Rule Composer is the application used to develop and maintain adjudication rules for the CAPS adjudication system. It is part of the suite of applications and modules that comprise the CAPS core system. The application enables non-technical users having the appropriate business domain knowledge to directly manage the set of adjudication rules used the CAPS.

Rule Composer will be used by a small number of adjudication policy experts. These users will likely not have a technical background but will have extensive knowledge of the adjudication policies

1.1 INSTALLING RULE COMPOSER

Rule Composer is a Microsoft .Net application and will run on any platform that supports the .Net Framework 1.1 or newer. Rule Composer can connect to any database that has a compliant ODBC driver or to an MS Access database.

Please refer to the Installation Guide for details on the system requirements, installation and configuration.

1.2 LOGGING IN TO RULE COMPOSER

When Rule Composer starts you are prompted to logon.

1. Enter your logon ID and password.
   It may be necessary to select a different Environment. Check with your system administrator to obtain access to a particular Environment. It may be necessary to modify the configuration file in order to have access to the Environment.
2. Click Ok.
3. If you have access to more than one Carrier then you will be prompted to select a Carrier for this session.

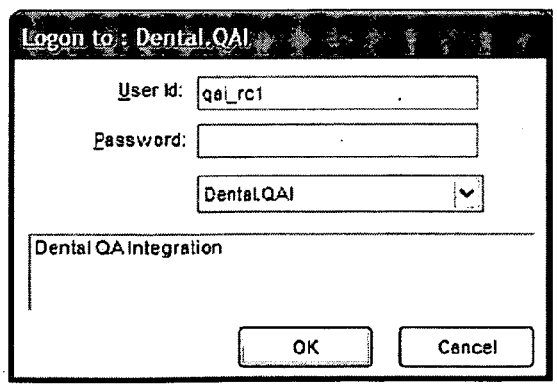

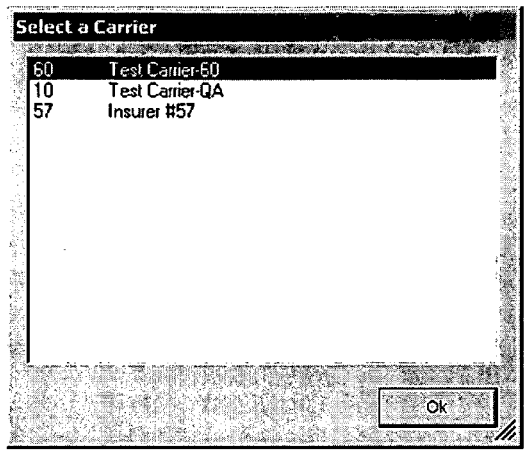

1.3 RULE COMPOSER ENVIRONMENT

Rule Composer is a two-tiered VB.Net application that connects to any ODBC database (typically Oracle). The application provides a graphical interface for the creation and management of adjudication rules used by CAPS.

The organization of adjudication rules is represented by Rule Containers (Super Blocks and Blocks) and the Rules within them. The adjudication rules and their organization in the system are stored as data within the database. The rule data is then used by the adjudication engine to process claims.

1.4 RULE HIERARCHY

The rule hierarchy consists of Carriers, Rule Containers, and Rules. Carrier is the root container for the Rule Hierarchy.

1.4.1 CARRIERS

Multiple Carriers are supported at the database level but a user can only work with one Carrier at a time for a given instance of the Rule Composer application.

If more than one Carrier is assigned to the user, the Carrier for the session is selected during login; otherwise the default Carrier is automatically selected.

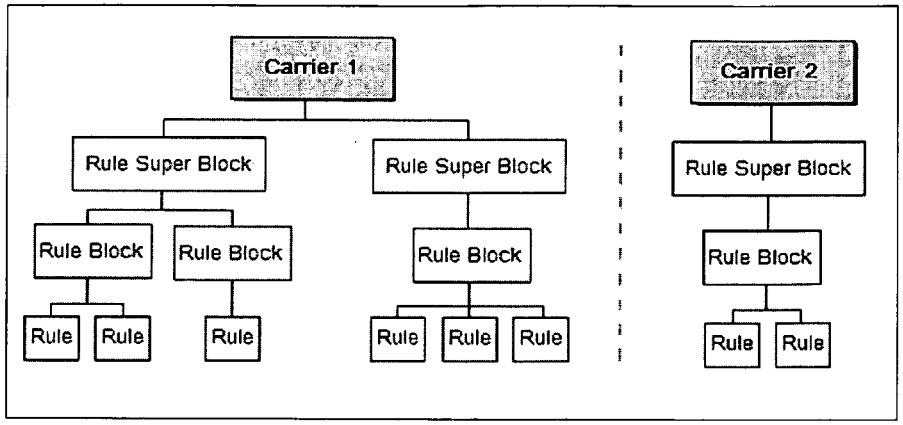

1.4.2 RULE CONTAINERS

Rule Objects refer to both Rules and Rule Containers.
- Rule Super Blocks contain Rule Blocks.
- Rule Blocks contain Rules.

1.4.3 RULES

The term Rule refers to a specific implementation of the processing logic of a business policy. A Rule Block is a logical grouping of Rules. Rules belong to a Rule Block by way of a reference (called Rule Inclusions).

1.5 RULE OBJECTS

Rule Objects can only exist at the specified level in the above hierarchy. The Rule Hierarchy is built on references to Rule Objects rather than containing the Rule Objects; Rule Objects only exist once in the database, regardless of how many times they appear in the Rule Hierarchy.

The use of references allows for efficient reuse of common Rules and Rule Containers in a large Rule Hierarchy. When changes are required on a Rule Object the changes need only be applied to the single instance rather than in multiple copies.

1.6 RULE ORGANIZATION

Rule Composer provides a graphical view of the rule database called a Rule Map.
- The Rule Map always shows the current Rule Organization and active Rules based on the system date.
- The Rule Map allows easy access through the Rule Containers to individual Rules for viewing and editing.
- Management of the Rule Container hierarchy is done through drag/drop and cut/paste features on Rule Map and through the Rule Block Editor.

- A Rule exists only once in the database but can be in multiple containers by reference.
- A Rule Dependency Map is displayed on each Rule Editor window next to the Text/Tree View of the rule. The Dependency Map shows the all Rule Blocks that reference that rule and in turn the Rule Super Blocks that reference the Rule Blocks.

1.7 RULE ENVIRONMENT

Rule Composer runs in a customizable *Rule Environment* that is specific to each installation. The *Rule Environment* is comprised of a *Business Object Model* and an *Application Configuration File*.

1.8 BUSINESS OBJECT MODEL

The *Business Object Model* (BOM) is described in an XML document and specifies the *Rule Elements* available for use in the Rules.

- Object Methods
- Object Methods
- Object Attributes
- Global Methods
- Data Types associated with each *Rule Element*
- Operators The *Rule Elements* in the BOM have customizable labels and descriptions that the user will see when working with the application. Changes to the BOM are implemented by updating the BOM file and do not require an application code update.

The BOM is retrieved from the server each time a user logs on.

1.9 APPLICATION CONFIGURATION FILE

Customizable features such as Table Name mapping, Plug-In configuration and Rule Container names are controlled through settings in the Application Configuration File.

Only system administrators should modify this file. See the Rule Composer Installation Guide for details.

1.10 SECURITY

Security for Rule Composer is enforced at the database level. The User ID and password are checked against the user table. When creating new users in Rule Composer, the User ID must match the database logon User ID.

Only Rule Composer users that are assigned the role of Admin have access to the Users menu item.

2 RULE OBJECTS

2.1 RULES

The term Rule refers to the processing logic of a business policy. That processing logic comprises one or more implementations using the rule grammar.

2.2 RULE VERSIONS

A Rule Version is a specific implementation of a Rule using the rule grammar. Different implementations may be valid at different points in time. The version date of a rule version determines which implementation is applicable over the history of the Rule.

2.3 RULE BLOCKS

A Rule Block is a logical grouping of Rules. Rule Blocks have a name and description but no inherent processing logic.

2.4 RULE INCLUSIONS

A Rule is a member of a Rule Block by way of a reference and those references are called Rule Inclusions. The order of Rule Inclusions within a Rule Block determines the order of processing by the Rule Engine. The chronological dependency of Rule Inclusions for a Rule within a Rule Block is called Rule Timeline.

2.5 RULE SUPER BLOCKS

A Rule Super Block is a logical grouping of Rule Blocks. Rule Super Blocks have a name and description but no inherent processing logic. A name and description in a second language is supported.

2.6 RULE BLOCK INCLUSIONS

A Rule Block is a member of a Rule Super Block by way of a reference and those references are called Rule Block Inclusions. The order of Rule Block Inclusions within a Rule Super Block determines the order of processing by the Rule Engine. Rule Block Inclusions do not have a time dependency.

2.7 RULE PROCESSING

Rule Inclusions have an effective and expiry date. These dates specify the start and end of when the Rule is considered to belong to the Rule Block. The Rule Inclusions that a claim will encounter during processing depends on the service date of the claim. Each Rule referenced by the Rule Inclusions may have multiple versions of the logic implementation. The rule version used for a claim is the most recent one relative to the claim service date.

Each version has a distinct Version Date that specifies the start date of the version. The end date of a Rule Version is implied by the start date of the next version. Rule Inclusions do not point to a specific Rule Version. The version used during processing is determined by the claim date.

The diagram below illustrates the Timeline and Version concepts with an example.

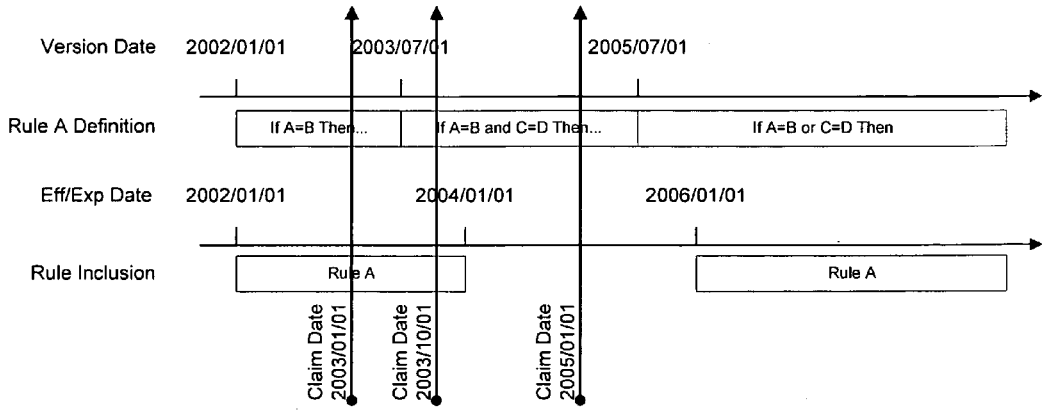

The definition of Rule A has three versions with Version Dates of 2002/01/01, 2003/07/01 and 2005/01/01. Rule A is included in the example Rule Block from 2002/01/01 to 2004/01/01 and again from 2006/01/01 with no expiry date. Between 2004/01/01 and 2006/01/01 Rule A is not included in the Rule Block. The first claim with a date of 2003/01/01 will see the first version of Rule A. The second claim with a date of 2003/10/01 will see the second version of Rule A. The third claim will not see any version of Rule A because the Rule Inclusion is not in effect at that time.

3 WORKING WITH RULE OBJECTS

3.1 RULE MAP

The Rule Map is located on the left pane of the main application window.

The nodes on the tree view represent the Rule Objects in the Rule Hierarchy in a parent-child relationship.

The order in which the Rule Super Blocks appear is not significant. These nodes appear in alphabetical order on the Rule Map. However, order is significant for the Rules and Rule Blocks below the Rule Super Blocks. These nodes appear in the order in which they will be processed by the CAPS adjudication engine.

3.1.1 DISPLAYING/HIDING THE RULE MAP

You cannot close the Rule Map, but you can resize it by dragging the right border with the mouse. You can also hide the Rule Map by toggling the View/Rule Map menu item or by toggling the Rule Map toolbar button.

To toggle the Rule Map view:

1. Click the View menu item to display view options.
2. Click Rule Map to remove/add the ✔ and hide or display the Rule Map window.

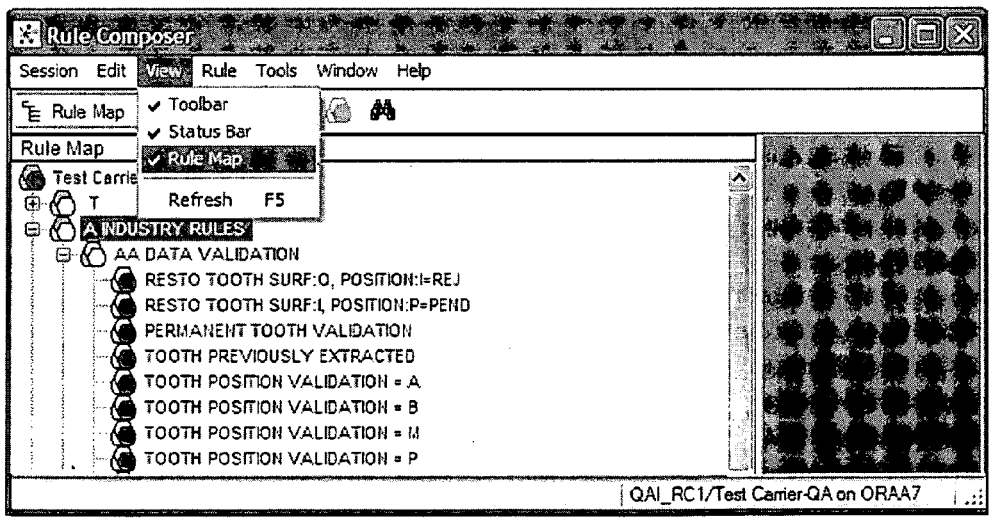

3.1.2 CARRIER NODE

At the top of the tree is the Carrier node, which is the root node. You cannot modify or delete the Carrier node. The Carrier node contains child nodes representing Rule Super Blocks.

3.1.3 CHILD NODES

Click the "+" or "-" symbols beside any node in the tree view to alternately hide/show the tree below it. Alternatively you can use the left and right arrow keys to accomplish the same result. Double clicking on a Rule node opens the Rule in a Rule Editor window.

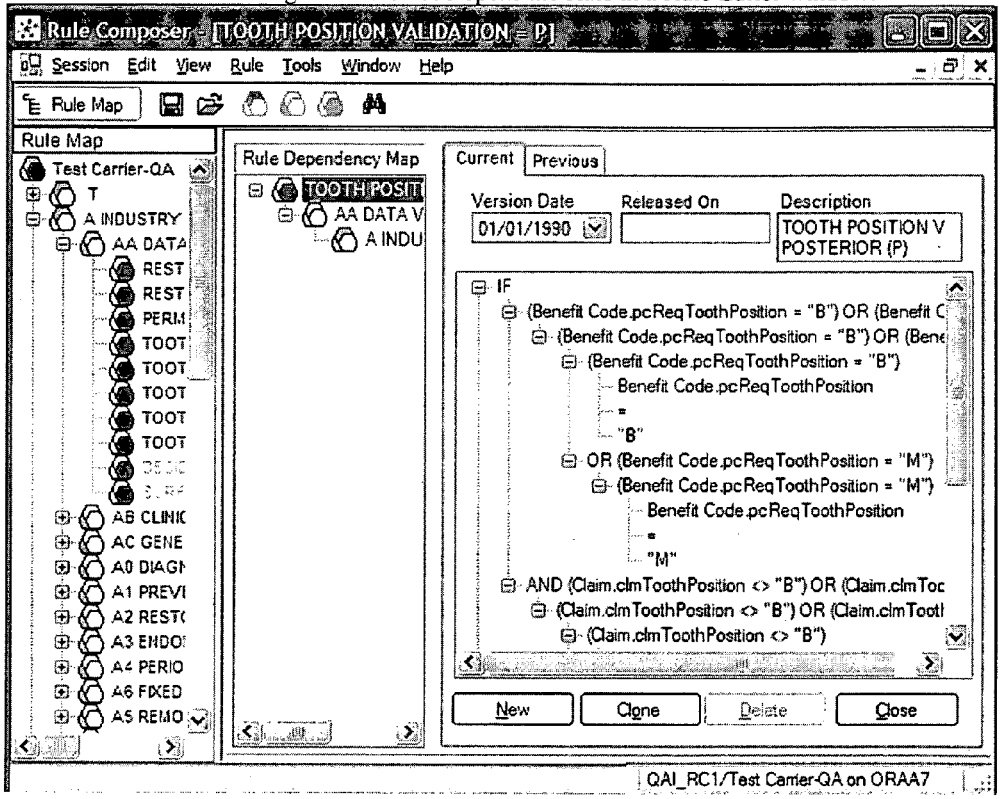

3.2 ADDING NEW RULE OBJECTS

To add new Rule Objects:

1. Click to select the parent node on the Rule Map that will contain (by reference) the new node.

From the Rule menu, select New. The available option depends on the parent node.

To add a new Rule you must select a Rule Block node. To add a Rule Block you must select a Rule Super Block Node. To add a Rule Super Block you must select the Carrier node.

2. Select the menu item Rule->New-> on the main menu or the pop-up menu. For example, to add a new Rule Super Block select the Carrier node, select Rule->New->Rule Super Block.

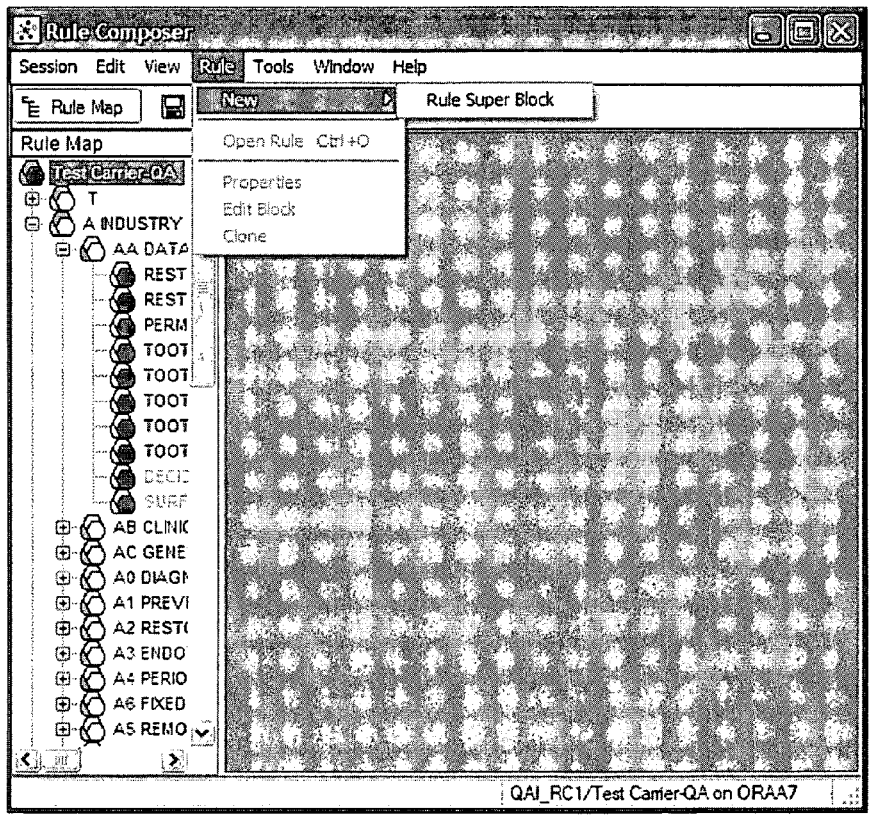

3. If you are creating a new Rule Super Block or new Rule Block the Properties dialog box appears allowing you to enter the name of the Rule Container and a description. If you are creating a new Rule the Rule Editor appears. Only after creating the rule and saving will the Properties dialog box appear for new Rules. Names assigned to Rule Objects must be unique within a given Carrier.

4. Enter a unique name and a description for the Rule Object.
    - A warning will appear if the specified name is already in use.

- All the Name and Description fields are mandatory. In the case of Rule Super Blocks the second language Name and Description fields are optional but must be entered as a pair.

3.3 RULE OBJECT PROPERTIES

To view or edit the properties of an existing Rule Object:

1. Click to select the node representing the Rule Object on the Rule Map.
2. From the Rule menu, select Properties. The Properties dialog box appears allowing you to view and modify the information. Naming constraints (e.g., uniqueness) are enforced.

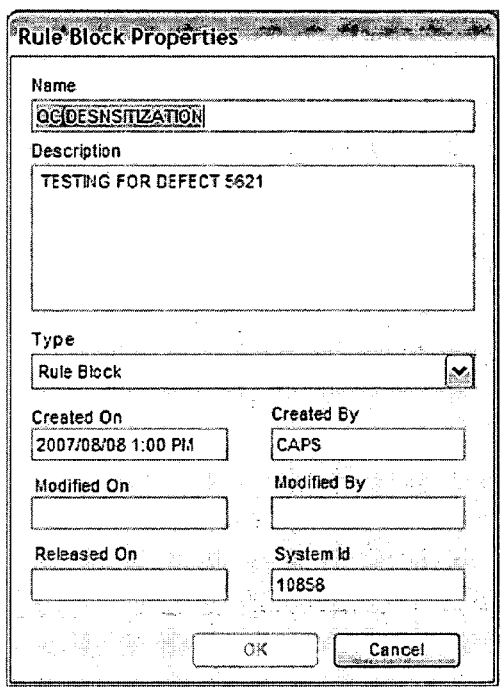

3.4 MOVING AND COPYING

Only Rule Blocks can be moved or copied using the Rule Map. Rule Super Blocks appear in alphabetical order so there is no reason to move them. There may only be one instance of a Rule Super Block so copying may not be allowed. Refer to the section on the Rule Block Editor for information on moving and copying Rule references.

The database has only one instance of a Rule Object. Copying or moving a Rule Object merely copies or moves its reference. When you modify the properties or contents of a Rule Object all locations where it is reference it will see the change.

3.4.1 DRAG AND DROP

The Rule Map supports drag and drop operations for moving and copying Rule Blocks.

- The default drag and drop operation is Move.
- To copy a Rule Block, hold down the Ctrl key during the drag and drop operation.
- To cancel a drag operation, just drop the node on any invalid target or any part of the tree view's background.

As you drag a node over other nodes, the valid drop targets are highlighted.

- If the drop target is a Rule Block, the node is inserted before the target.
- If the drop target is a Rule Super Block, the node is inserted as the last item inside the target.
- Multiple selections in the Rule Map are not supported.

3.4.2 FROM MENU

Alternatively, you can achieve the same result by using the Cut and Paste menu items to move a node or the Copy and Paste menu items to copy a node.

1. Select the node you wish to move or copy, and choose Edit->Cut or Edit->Copy.
2. Select the destination node (the node that will be the new parent node).
3. Choose the menu item Edit->Paste to complete the task.

3.5 CLONING

To clone an existing Rule Super Block or Rule Block:

1. Follow the procedure for copying (see 3.4 Moving and Copying) but use the Paste As command rather than Paste. The Paste As menu item will display the properties dialog box for the new instance.
2. Choose a unique name for new instance and change the other properties as needed before clicking on the Ok button.

Alternatively you can use the Clone menu item.

- Using the Clone menu item prompts you to select a parent container for the new Rule Object.
- Rules cannot be cloned using the Rule Map and must be cloned using the Rule Editor. Refer to the section on editing Rules.

3.6 DELETING RULE OBJECTS

Since the Rule Map consists of references to Rule Objects, deleting a node on the Rule Map merely deletes the reference rather than deleting the instance of the Rule Object itself. There are special situations where the instance of the Rule Object is also deleted:

- If the deleted node represents the last reference to the instance of a Rule Object then the Rule Object is also deleted.
- Choosing Delete All rather than Delete on the menu will delete the instance of the Rule Object as well as all the references to it.
- If either of the above is true, and the deleted Rule Object is a Rule Container holding the last reference to other Rule Objects, then those referenced Rule Objects are also deleted. For example, if Rule Container A contained the only reference to Rule 1, then deleting the instance of Rule Container A also deletes the instance of Rule 1.

3.7 FINDING RULE OBJECTS

To find Rules or Rule Containers:

1. From the Tools menu, select Find. Or click .
   The Search window is displayed.

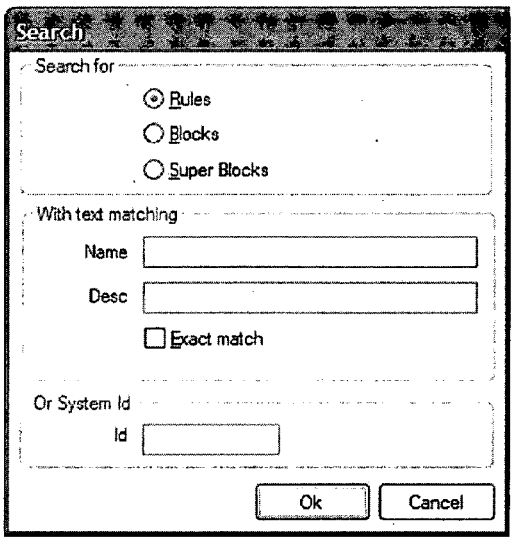

2. Select a type of rule Object (Rule, Rule Block, or Rule Super Block).
3. Enter the matching criteria for the Name and/or Description fields. The wildcard character is assumed so do not enter the asterisk or percent characters. Selecting the Exact Match checkbox will not match with wildcards. A system id can be entered instead of the text criterion if it is known.

4. Click Ok. If no matches are found you have the option of re-specifying the search criterion. If a single match to the search is found the information for the Rule Object is displayed. If multiple matches are found they are displayed in the Search Results window.
5. The Search Results window shows the Dependency Tree for each of the matching Rule Objects found.
6. Select a node on the Dependency Map to display the properties for that node.
7. Click OK to terminate the Find and open the Rule Object for the selected node.
8. Click Cancel to return to the Find dialog box where you can perform additional searches or cancel the Find operation.

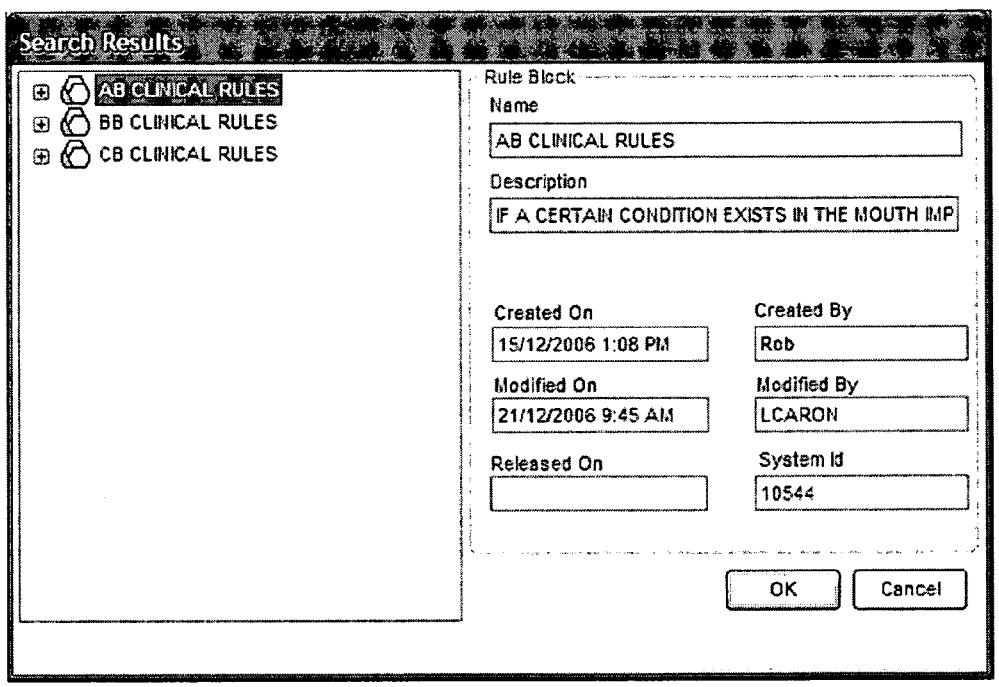

3.8 PROMOTION AND PATCHING

The Rule Promotion process provides stricter control over changes to Rule Objects and complements the Rule Inclusion Timelines.

- The Rule Promotion process occurs outside of the Rule Composer application and is neither initiated nor monitored using Rule Composer.

- In the promotion process Rule elements are assigned a Release Date when they have passed testing and are migrated to the production environment. The Release Date indicates a Rule Object has been promoted and controls whether the Rule Element can be modified or deleted.

- In order to modify or delete Rule Objects that have been promoted, use the Patching functionality. Patching is the process of unlocking a promoted rule object that requires the user enter a Patch Reason for the purpose of an audit trail. See 4 Rule Block Editor and 6 Rule Editor for further information.

4 RULE BLOCK EDITOR (ALSO REFERRED TO AS RULE MANAGER 202)

The Rule Block Editor is used to manage the rule inclusions within a Rule Block.

To open the Rule Block Editor:

1. Click to select a Rule Block in the Rule Map.
2. From the Rule menu, select Edit Block. The Edit Block function is also available by clicking the right mouse button on the Rule Block.

4.1 RULE INCLUSION TIMELINES

The Timeline feature is applicable to the organization of Rules within Rule Blocks. The Timeline keeps track of where and when Rules are included in a Rule Block. This means that a snapshot of the rule data that is in effect at any point in time is available. The point in time can be in the past or future. This feature is essential for processing claims that have been back dated and for implementing changes that are future dated.

Timelines are not the same as Rule Versions:

- Rule Versions track the history of changes to the definition of a rule.
- Timelines track when and where a Rule is used and do not specify a particular Rule Version.

The Rule Map always shows the Rule organization that is in effect at the current time as determined by the client PC system clock. The Rule Map displays Rule Inclusions depending on their status:

- Expired Rule Inclusions are displayed in grayed type.
- Unreleased Rule Inclusions are displayed in normal type.
- Released Rule Inclusions are displayed in bold type.

4.2 INCLUSION TIME SPANS

The Rule Block Editor provides a detailed view of the Rule Inclusions over time. This view is logically segmented into Time Spans.

- Each Time Span represents a period in which the Inclusions are static.
- The boundary between Time Spans represent the point in time where at least one Inclusion changes.
- Time spans are calculated in memory by the application and do not necessarily map one for one with records in the Rule-Rule Block table.

The Rule Block Editor displays current and historical views of the Rule Block.

4.2.1 CURRENT

The Current tab displays a Tree View control representing active Rule Inclusions. It also shows any future dated changes to the Rule Inclusions. The root node of the tree represents the Rule Block, with each child node representing a Time Span with a distinct state for the Rule Inclusions.

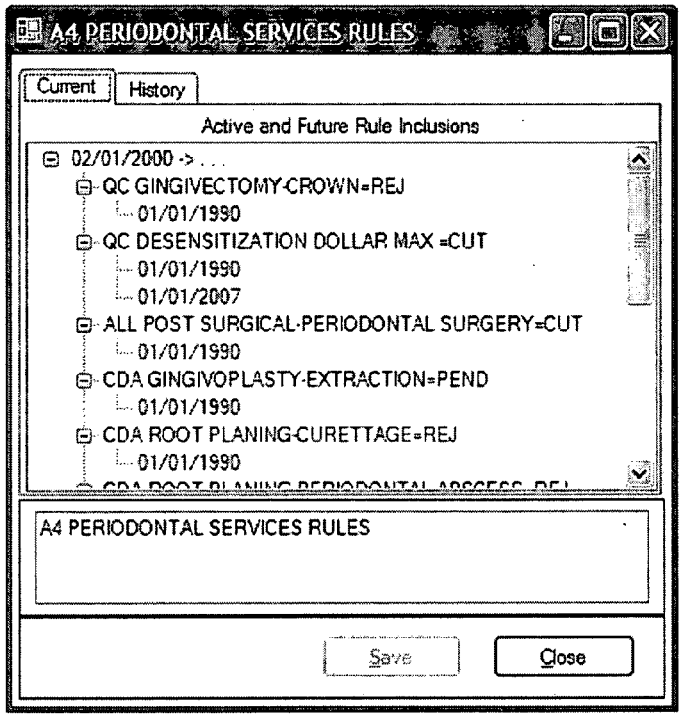

4.2.2 HISTORY

The second tab has a similar tree view showing the historical Rule Inclusions with a branch for each distinct time span in history that has a change. The historical Rule Inclusions are not editable if they have been released.

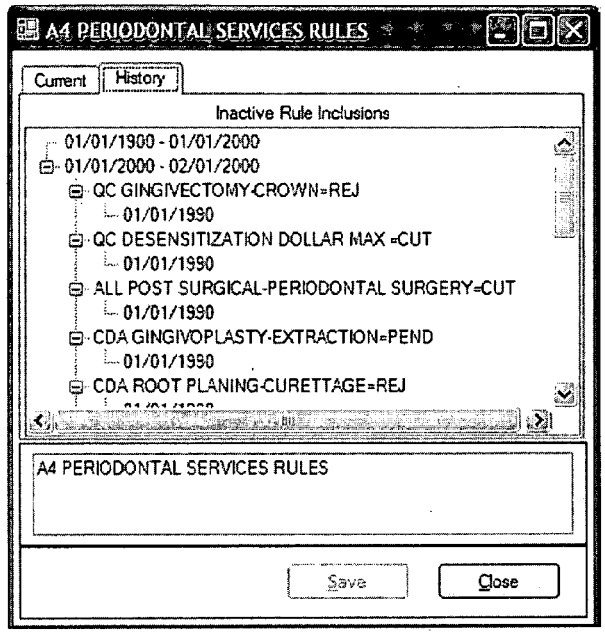

4.2.3 CONTINUOUS TIME SPANS

The time spans form a continuous timeline from the Effective Date of the very first Rule Inclusion to the Expiry Date of the very last Rule Inclusion. It is possible to have a time span where there are no Rule Inclusions. The diagram below illustrates the Time Spans for the example above.

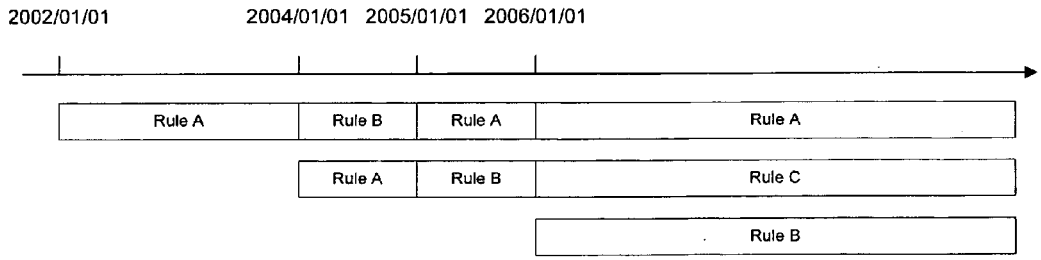

The corresponding table records are:

| Rule Name | Effective Date | Expiry Date | Order |
| --- | --- | --- | --- |

| Rule A | 2002/01/01 | 2004/01/01 | 1 |
| Rule A | 2004/01/01 | 2005/01/01 | 2 |
| Rule A | 2005/01/01 | Null | 1 |
| Rule B | 2004/01/01 | 2005/01/01 | 1 |
| Rule B | 2005/01/01 | 2006/01/01 | 2 |
| Rule B | 2006/01/01 | Null | 3 |
| Rule C | 2006/01/01 | Null | 2 |

4.3 SPLITTING TIME SPANS

Splitting a Time Span creates a new Time Span node in the tree view with a copy of the Rule Inclusions from the original Time Span.

- The Time Span to the left of the split retains the Release Date value.
- The Time Span to the right of the split has a null Release Date.
- If the Rule Inclusions are identical for a two adjacent Time Spans after a split they are merged during the save operation.

To split a time span:

1. Right-click on the relevant block to display the editing menu.
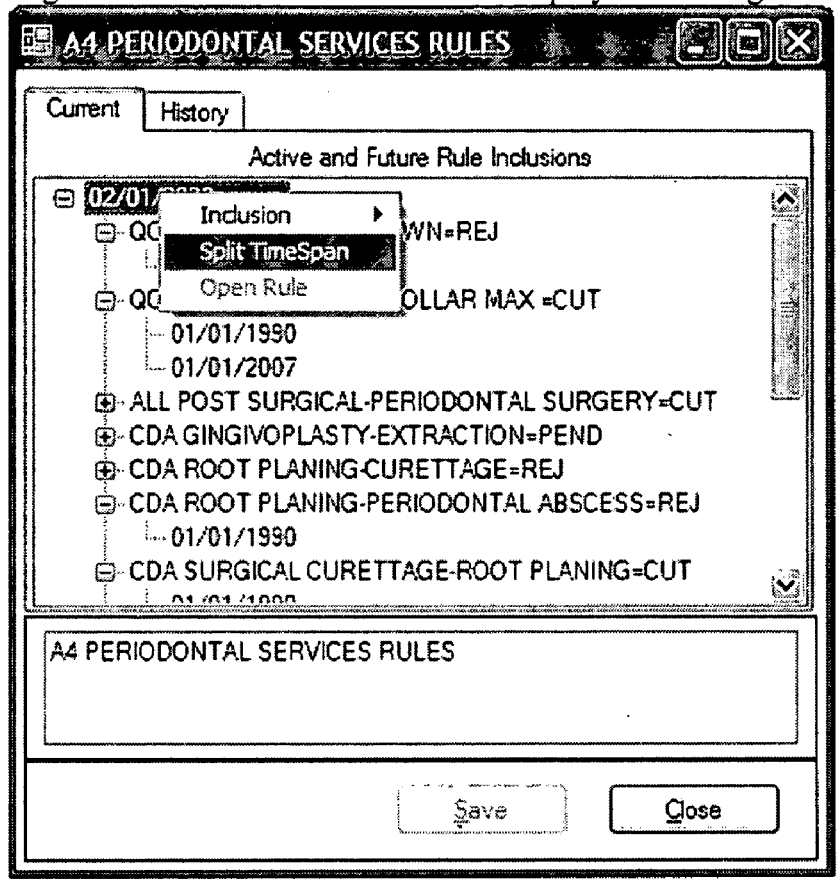
2. Select Split TimeSpan to display the Split Timespan window.

3. Select a Split Date.

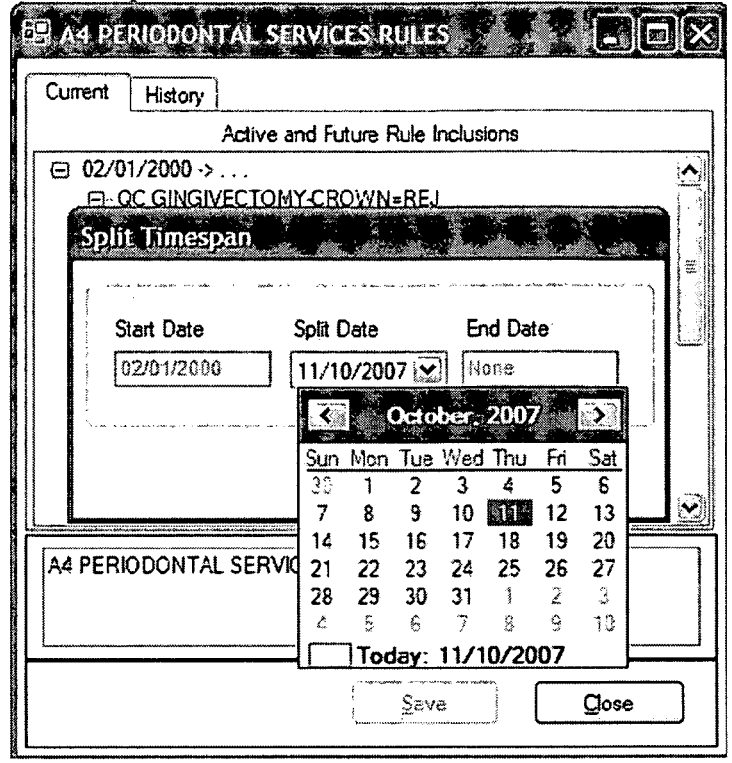

4. Click Ok to confirm the Split Date.
5. Click Save to save the modification.

Time Spans are recalculated and redisplayed after Expiring or Deleting a Rule Inclusion.

4.4 ADDING RULE INCLUSIONS

To add Rule Inclusions:

1. Right-click the appropriate node to display the edit options, and select Inclusion -> Add. Alternatively, press the INSERT key when a Time Span node is selected.

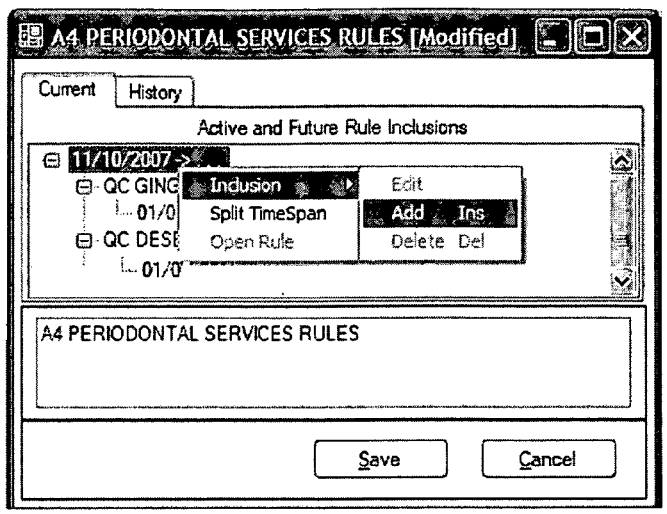
2. The Find window is display. Enter search parameters and click OK to find and select the Rule to be inserted.
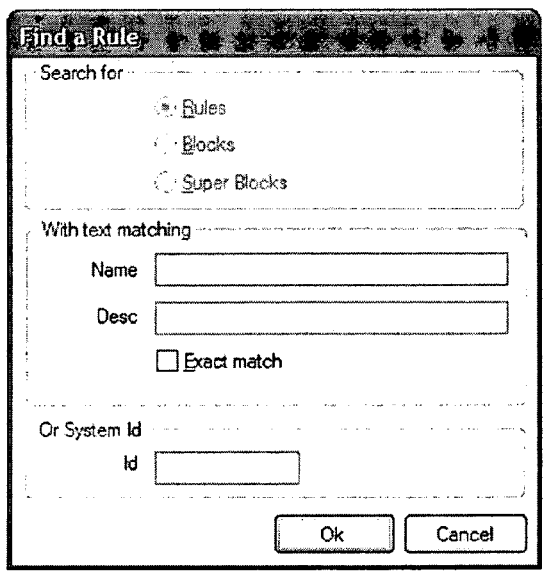
3. Click Save to save your changes.
By default, the new inclusion's effective and expiry dates line up with the Time Span.
- If the Rule Block was initially empty, the system prompts for an Effective Date and Expiry Date for the new inclusion.

- If necessary, select the new inclusion and display the properties form to adjust the Effective Date and Expiry Date. The Rule Block Editor will recalculate the Time Spans with the adjusted inclusion properties.

4.5 ORDERING INCLUSIONS

The order of Rule Inclusions in a Rule Block can be changed with the drag-and-drop functionality. By default, the Effective and Expiry Dates for the re-ordering matches that of the Time Span.

4.6 EXPIRING AND DELETING

The user can select a Rule Inclusion node and modify the Expiry Date of the Rule Inclusion. The user is prompted for a patch reason if the Rule Inclusion has been promoted as indicated by the presence of a release date. Promoted Rule Inclusions cannot be deleted.

When the user expires a Rule Inclusion from a Rule Block a prompt is given to enter the Expiry Date. The Expiry Date must be after the Effective Date and cannot overlap the Effective Date of a future dated Rule Inclusion.

4.7 SAVING CHANGES

All changes involving the Rule Inclusion timelines or Rule Inclusion ordering are done in memory. When the user commits the changes with the Save command Rule Inclusions are merged where possible before saving to the database. The Cancel command discards all the pending changes and reverts back to what is stored on the database.

4.8 RULE INCLUSION PATCHING

From time to time there may be situations requiring a change or fix to a released Time Span for a Rule Block. Patching is differentiated from time lined changes in that a new Time Span for the Rule Inclusions is not created. The change is applied directly to an existing Time Span.

- Patching is only applicable to a released Time Span of Rule Inclusions. A reason for applying the patch must be supplied and logged to the audit table. A copy of the original Rule version is logged into the audit table.
- The Patch command is available when the selected Time Span is marked as released. Changing the Effective Date is allowed but the new date must not overlap a previous Rule Inclusion for the same Rule. Time Spans must be recalculated and redisplayed after changing the Effective Date.

4.9 RULE VERSIONS

When multiple Rule Versions exist for a given Rule Inclusion the appropriate version date is shown as child nodes under the Rule Inclusion. The version dates shown always fall between the start and end of the time span dates. In the example below, Rule A4 has multiple versions with version dates of 2000/03/22 and 2007/04/08. For each time span the appropriate version dates are displayed as child nodes of the Rule A4 rule inclusion node.

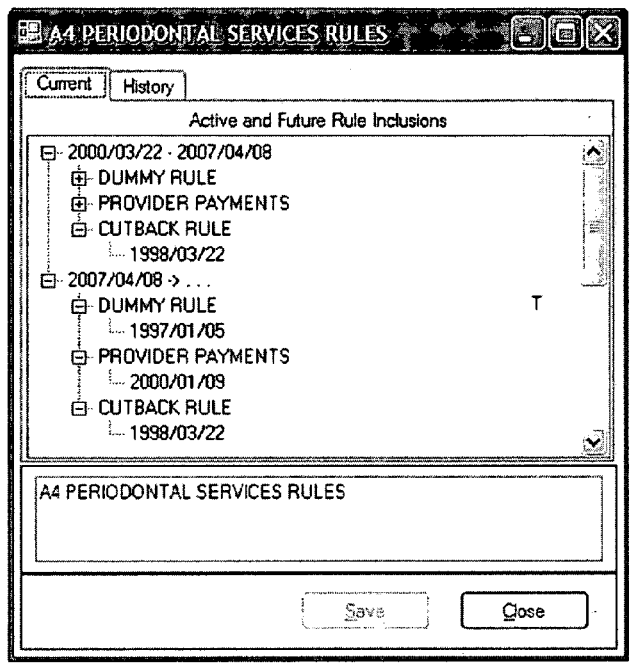

4.10 VIEWING/EDITING RULES

The user has the option to select any of the Rules represented by a Rule Inclusion for viewing in a Rule Editor. If there are multiple versions, and the user selects one of the Rule Version Date nodes, then that version is displayed in the Rule Editor. See 3.5 Cloning and 4.9 Rule Versions for implementation details of the Rule editing options.

5  RULE GRAMMAR

The structure of Rules is the simple IF {condition(s)} THEN {action(s)} statement where the conditions are expressions that result in a True or False answer and the actions are methods that are performed if the conditions are true.

The elements that comprise the conditions and actions are specific to the implementation and are described in the Business Object Model (BOM) file. The BOM file is an XML file that provides Rule Composer with information on:

- Business Objects such as a Claim
- Attributes associated with each Business Object such as a Recipient
- Methods associated with each Business Object such as calculations based on the Recipient's claim history
- Global functions such as those used to manipulate or compare data
- Actions such as Pay or Refuse
- Operators for comparisons and arithmetic Rule Composer provides the framework for building a rule structure based on the information in the BOM. Rule Composer knows nothing about what the BOM elements represent or what type of business requirements they are meant to satisfy. It merely enforces the grammar of the rule based on the BOM and provides a graphical tool for manipulating the elements so that the resulting rule is syntactically correct.

While Rule Composer will work with any correctly formatted BOM file, the design of the BOM is not arbitrary. The elements described within it must be understood by the rules processing engine that will ultimately be using the rules.

5.1 CONDITIONS

Conditions are expressions that result in a True or False answer. The expressions are comprised of the rule elements described in the BOM. Conditions can be as simple as (OBJ.A = 1) or as complicated as:

((OBJ1.A+OBJ1.B)=2)   OR   ((OBJ1.D=10)   AND   (OBJ2.E=OBJ2.F))   OR   (OBJ.FUNCTION(A,B)=25)

A rule can have multiple conditions joined together by logical operators and each condition can be nested with other conditions.

5.2 ACTIONS

Actions are the method elements of the BOM that are executed by the rules processing engine when all the conditions are true. Actions may manipulate values but do not return a value. Actions may or may not require parameters, as specified in the BOM.

5.3 BUSINESS OBJECTS

Business Objects are the objects to which information is attached. A Claim is an example of a Business Object. Attached to a Claim is information such as the identity of the Claim's recipient and the service for which the Claim is being made. Business Objects provide the context in which the rules will be evaluated.

Methods may also be attached to Business Objects. These methods perform calculations in the context of the Business Object or retrieves information about the Business Object that is not available as an Attribute. See the section below on Methods and Functions for additional information.

The Attributes and Methods attached to a Business Object are reference in a Rule using the *object.attribute* and *object.method* syntax respectively. The Rule Editor applies the correct syntax automatically when building rules.

5.4 ATTRIBUTES

Attributes are the pieces of information attached to a Business Object. Attributes have values that can be used for comparisons or calculations, depending on its data type. Read only attributes cannot be assigned new values.

An Enumeration Type may be assigned to an Attribute. You can select from a list of values associated with the Enumeration Type when creating an expression using the Attribute. Refer to the section on Enumerations for more information.

A Value Group Type may be also be assigned to an Attribute. You can select from a list of grouped values associated with the Value Group Type when using a method that accepts a list of values. Refer to the section on Value Groups for more information.

5.5 LITERAL VALUES

Literal Values are numbers and strings and can be used anywhere the literal value's Data Type is compatible. String literals are enclosed in double quotes.

5.6 DATA TYPES

A Data Type is associated with each element in the Business Object Model. Rule Composer prevents you from using Elements with incompatible data types in Methods and expressions. The screen shot below shows all the available data types for literal values.

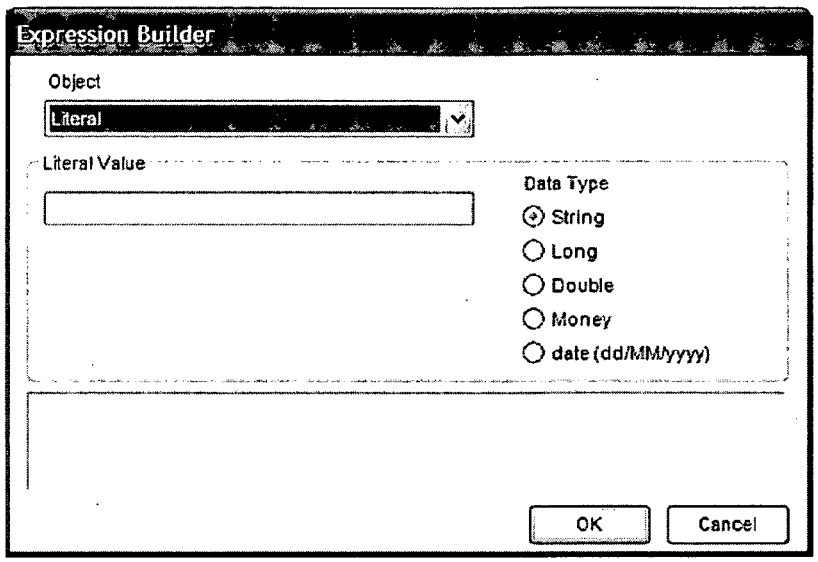

If the literal value is part of an expression, only the data types that are valid in that expression are available.

5.7 METHODS AND FUNCTIONS

Methods and Functions are used to return a calculated value, return a state or perform an action. Functions are Methods that are not attached to a Business Object and as such do not have a context other than the values passed in as parameters.

Parameters for Methods and Functions can be any element or expression that has a compatible Data Type. There are two special types of parameter:

- Array.
- Field.
  A Field parameter is a reference to an Attribute itself, not the value returned by the Attribute. Field parameters are used when multiple instances of a Business Object are used in the Method's underlying calculation. For instance, a Field parameter of Amount is used when calculating a total of the Claim Amount attribute in a Recipient's history.

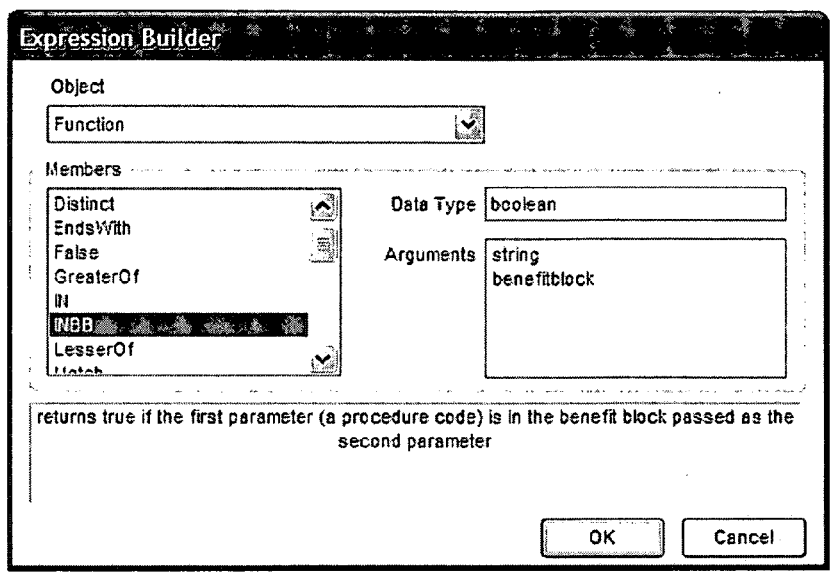

5.8 OPERATORS

Operators are used when comparing two values or joining two conditions. The logical operators AND, OR, AND NOT, OR NOT and NOT are built into Rule Composer as they are part of the rule structure. Other operators such as EQUALS and NOT EQUALS may or may not be defined in the Business Object Model (BOM). While these operators are part of building rules, they may have different labels and allowable data types for any given business environment.

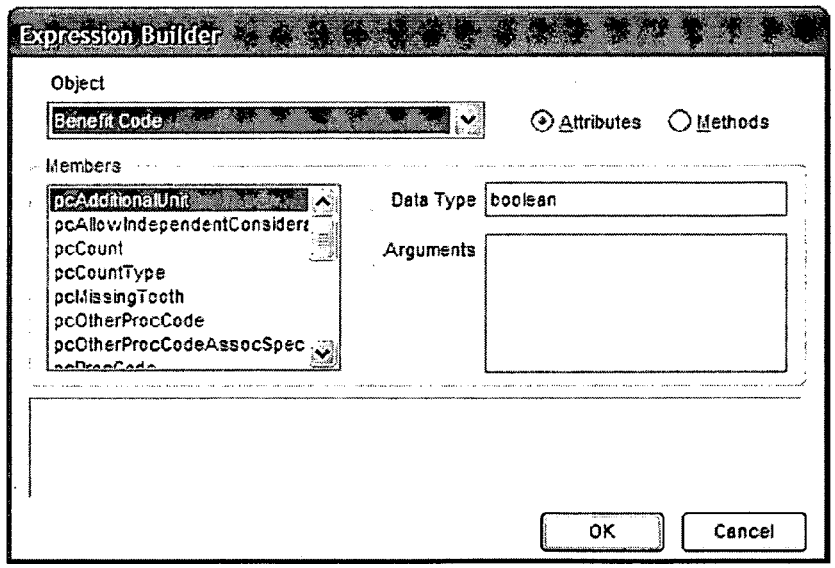

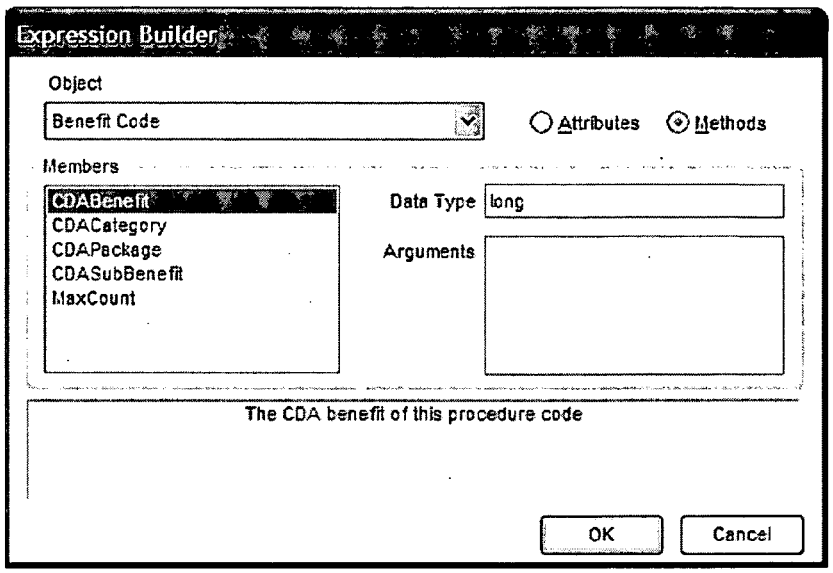

5.9 PARAMETERIZED VALUES

Once a Parameter Value is declared it can be used in an adjudication rule wherever any valid value for that Parameter can be used.

- Users enter a reference to the Parameter Value using the Expression Builder dialog box.

- If the location in the rule is suitable for a Parameter Value the Expression Builder dialog box will add the choice of Parameter Value to the Object list.

- If the user selects Parameter Value from the Object list a list of Parameter Value names is presented. Rule Composer will enforce the Data Type by filtering out the Parameter Values defined with incompatible Data Types for the current location in the rule. This type of data type filtering is already available in Rule Composer when entering constants, functions and object attributes.

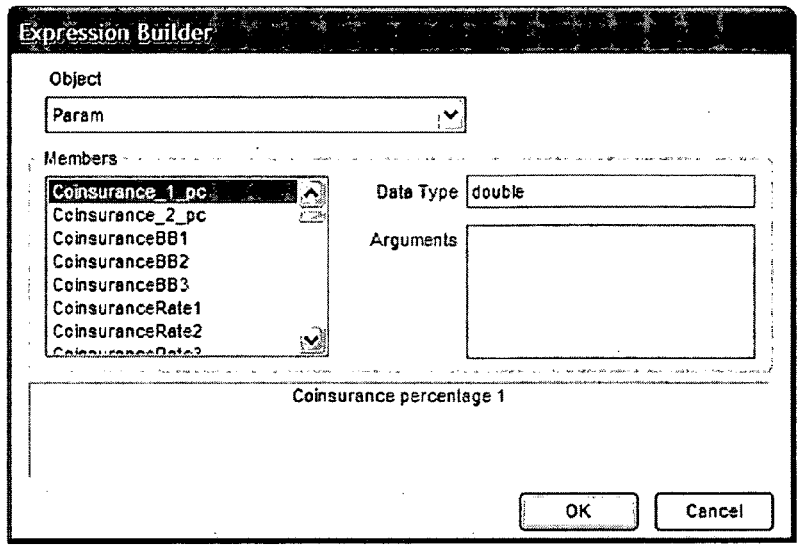

5.10 LIST VALUES

Value Groups are special elements that allow a set of values to be referenced concisely and conveniently in a Rule. Any Method that accepts a parameter array (list of values) will accept a Value Group reference providing the Attribute in the expression has a Value Group Type assigned to it.

A typical use of Value Groups is in a Method that determines whether an Attribute is equal to any value in a list of values. Rather than specifying the list explicitly a Value Group can be defined that contains the list of values. A reference to the Value Group can then be passed as a parameter to the Method rather than the list of values.

The Expression Editor will automatically present the assigned list of Value Groups whenever you build an expression using an Attribute with a Value Group Type.

The Value Groups and the value they contain are maintained with the Value Group Manager. Use the Tools->Value Groups menu item to access the Value Group Manager. See 7.2 List Value Manager for additional information.

5.11 ENUMERATIONS

Enumerations are a list of possible values. Attributes can be assigned an Enumeration Type, which will associate the Attribute with the list of possible values for that Enumeration Type. The Expression Editor will automatically present the assigned list of values whenever an expression uses the Attribute.

Enumeration Types and their associated values are maintained using the Enumeration Type Manager. Use the Tools->Enumerations menu item to access the Enumeration Type Manager. See 7.3 Enumeration Manager for additional information.

5.12 ERROR CODES

Error Codes are codes passed as parameters to Actions. The meaning of the Error Codes is specific to the implementation and are maintained using a Table View. Refer to the section below for details on using Table Views.

Error Codes are values belonging to the Error Code Enumeration Type. The Error Code Enumeration Type is an internal Enumeration Type that will not appear in the Enumeration Type Manager.

The list of Error Codes values can be modified using the Tools->Error Codes menu item. See 7.4 Claim Messages for additional information.

| Msg ID | LANG | SHORT_TEXT | LONG_TEXT |
|---|---|---|---|
| 00001 | en | MULTIPLE UNITS SAME DAY PRICED A | MULTIPLE UNITS SAME DAY PRICED A |
| 00001 | fr | todo: French[MULTIPLE UNITS SAME D | todo: French[MULTIPLE UNITS SAME D |
| 00002 | en | CLAIM REDUCED TO MAX COUNT AVAI | CLAIM REDUCED TO MAX COUNT AVAI |
| 00002 | fr | todo: French[CLAIM REDUCED TO MAX | todo: French[CLAIM REDUCED TO MAX |
| 00003 | en | CLAIM PENDED FOR REVIEW | CLAIM HAS BEEN PENDED FOR REVIE |
| 00003 | fr | todo: French[CLAIM PENDED FOR REVI | todo: French[CLAIM HAS BEEN PENDED |
| 00006 | en | GROUP ENROLMENT TYPE DOES NOT | GROUP ENROLMENT TYPE DOES NOT |
| 00006 | fr | todo: French[GROUP ENROLMENT TYP | todo: French[GROUP ENROLMENT TYP |
| 0001 | en | GRAMMAR TEST MESSAGE | GRAMMAR TEST MESSAGE |
| 0001 | fr | todo: French[GRAMMAR TEST MESSAG | todo: French[GRAMMAR TEST MESSAG |
| 00011 | en | CLAIM SUBMISSION PERIOD IS EXPIR | CLAIM SUBMISSION PERIOD IS EXPIR |

Filter... | Clear Filter | Add Row | Delete Row | Edit | Close

6 RULE EDITOR

The Rule Editor window provides a graphical interface to the XML rule, and makes viewing and manipulation of large complex rules possible for non-technical users.

- While any number of Rule Editors can be invoked, only one instance of the Rule Editor can be invoked for a given Rule.
- Each Rule Editor shows the Rule in the right pane of the window and the Dependency Map for the Rule in the left pane.
- The size of the two panes can be adjusted by dragging the dividing border.

Two views of the Rule are available – Text View and Tree View. Select View -> Rule Text and View -> Rule Tree to toggle between the two views. Rules are displayed in the Tree View by default.

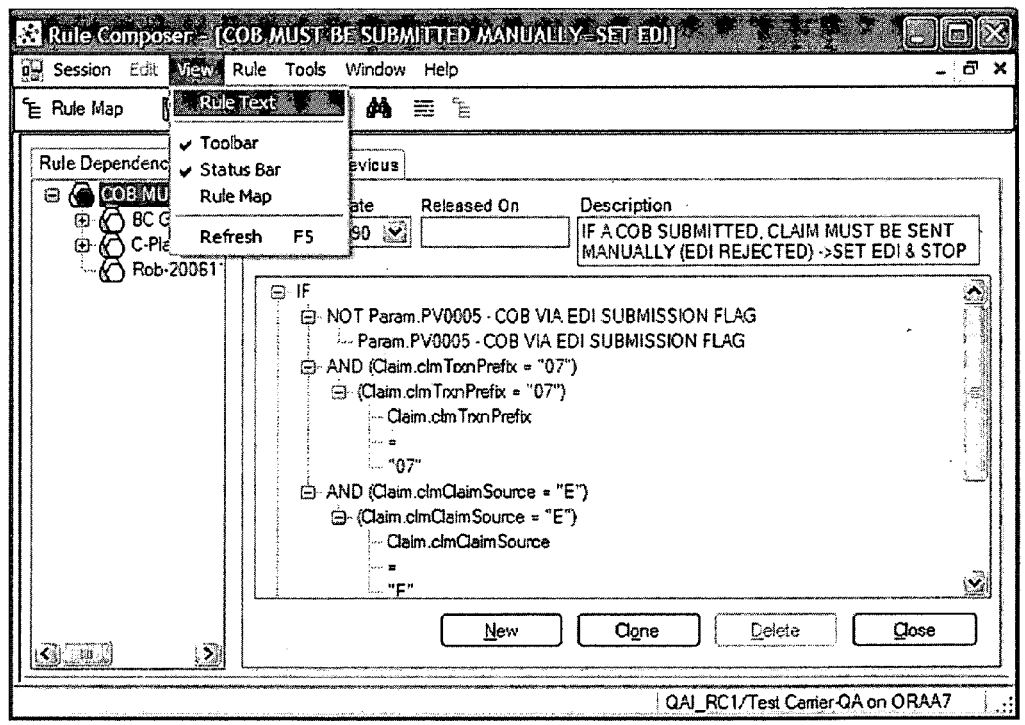

Whenever you switch between the Text View and Tree View, the Rule is compiled to check for errors. If there is an empty node in the Rule Tree you cannot switch to Text View as the Rule is in an incomplete state and valid XML cannot be generated. In this event a message box is displayed and the empty node is selected.

6.1 TEXT VIEW

The Text View shows the underlying XML format and is normally Read-Only. Modifications to the Rule should only be done in the Tree View. To enable editing in Text View press the Ctrl-F12 key combination.

The Text View is provided for users knowledgeable in editing XML documents. If there is an error in the XML you will not be able to switch back to Tree View until the error is corrected. You will not have access to the Expression Builder in Text View.

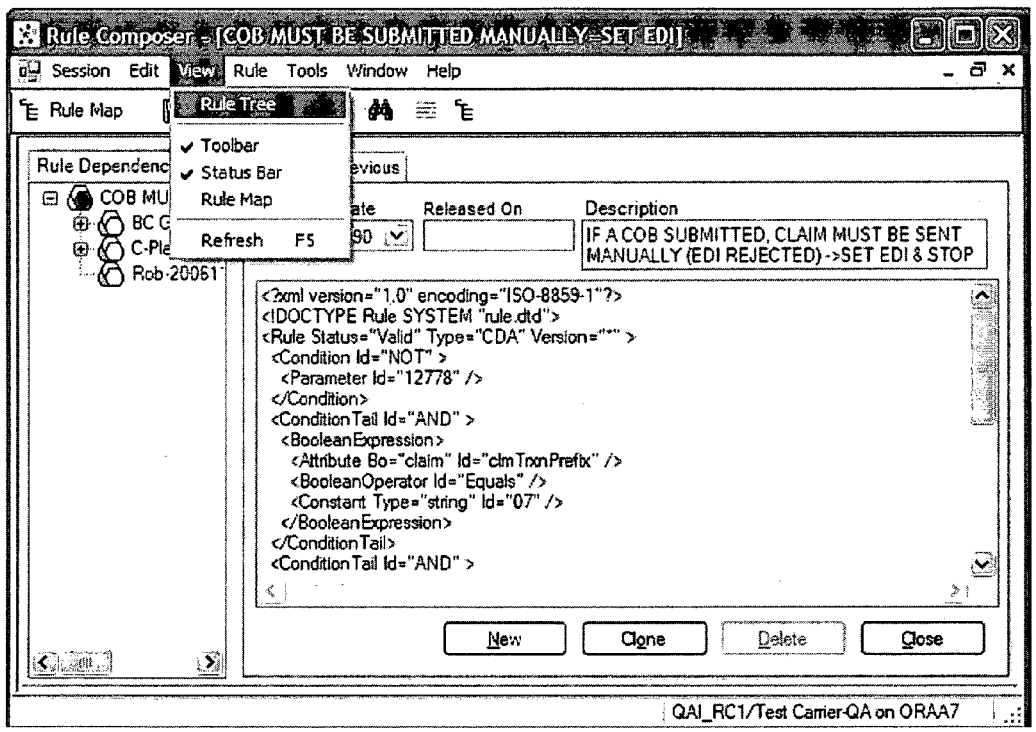

6.2 TREE VIEW

The Tree View simplifies rule editing by breaking down a rule into a hierarchical view of its grammar elements. This enables you to easily isolate and edit smaller portions of the rule rather than trying to work with the rule in its entirety. The nodes in the Tree View represent the conditions, expressions, compound expressions or actions of a rule.

Expressions are comprised of literals, functions, object values or object methods. Compound expressions are 2 or more expressions joined by operators. The Tree View displays the expression or compound expression of each Condition as separate branches under the *IF* node. Similarly, the expression or compound expression corresponding to each Action is displayed under the *THEN* node.

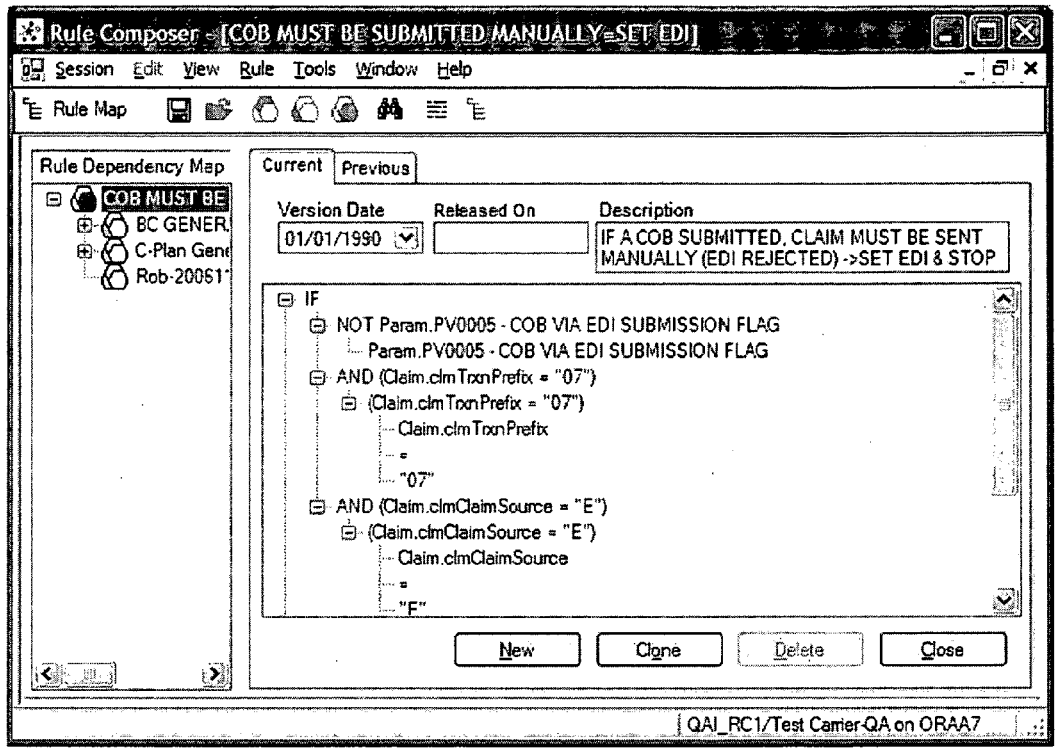

6.3 CREATING A NEW RULE

To create a new Rule:

1. Click to select the Rule Block to which the new Rule will be associated.
2. From the Rule menu, select New -> Rule.

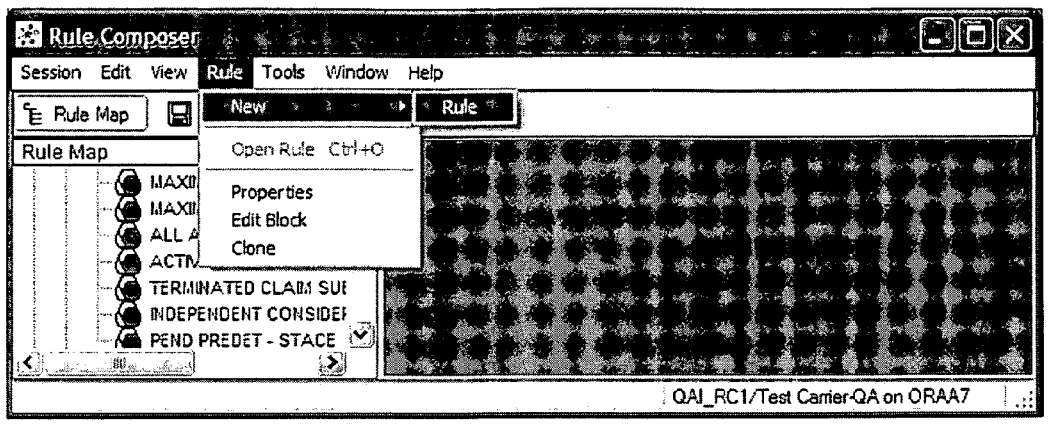

3. The New Rule window displays a template of an empty rule in Tree View. It consists of a single Condition node and a single Action node, which is the minimum requirement for a rule. The Condition node contains a single Expression node, which is the minimum requirement for a Condition. The nodes in the template do not have any values and cannot be saved as is.

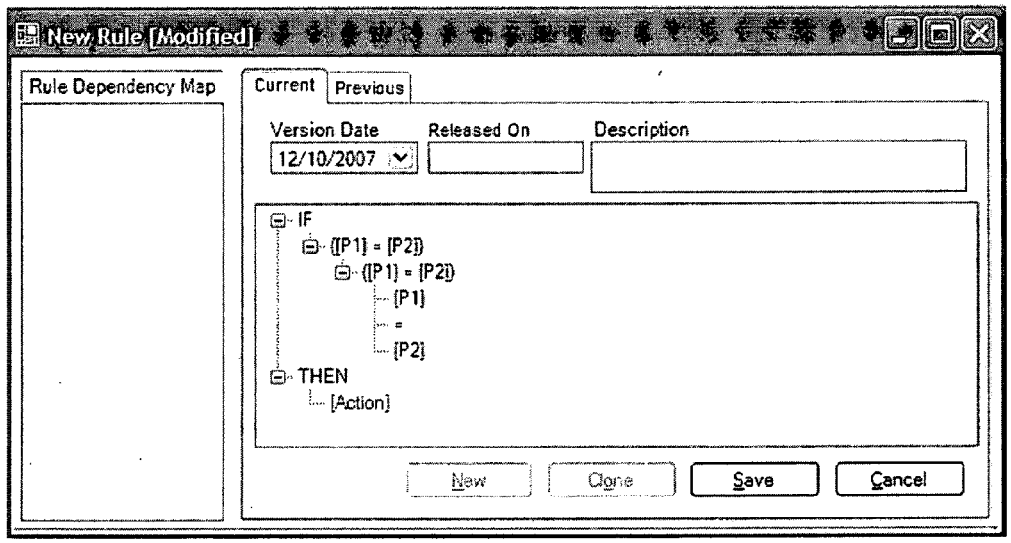

4. Add Conditions, Actions, and Expressions are required for this rule. See 6.4 Editing Rules for details on modifying rules.
5. Click Save to save the new rule.

6.4 EDITING RULES

To open a Rule in the Rule Editor:

1. From the Rule menu, select Open Rule (or click to select a Rule and right-click to select Open Rule).
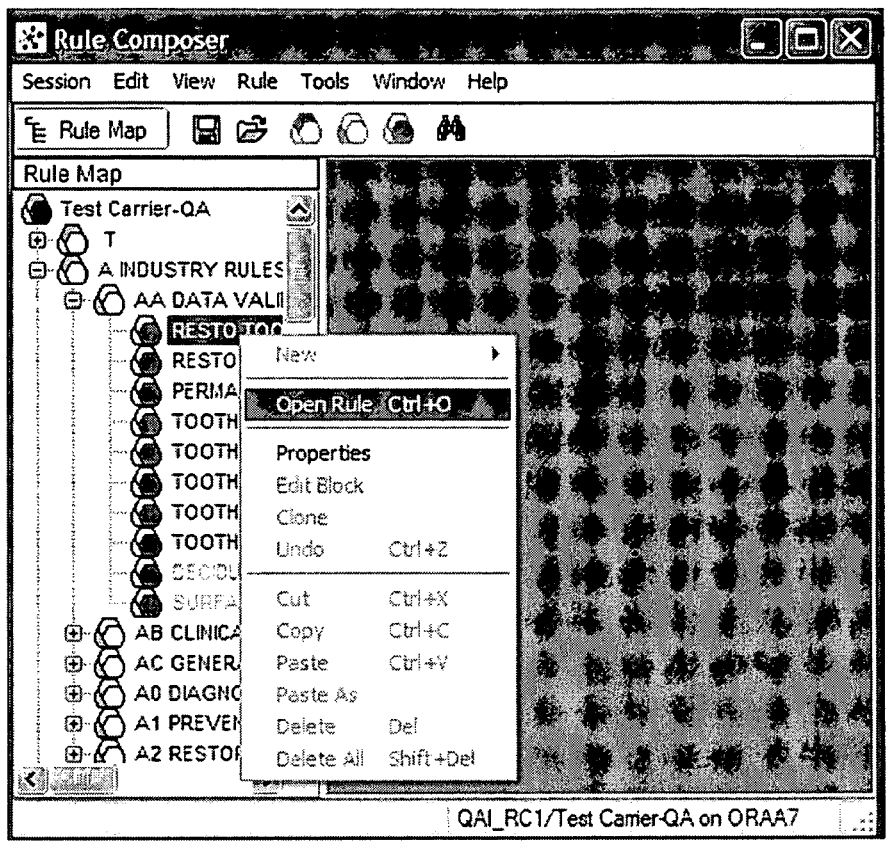
2. The Rule Editor window displays rule details.

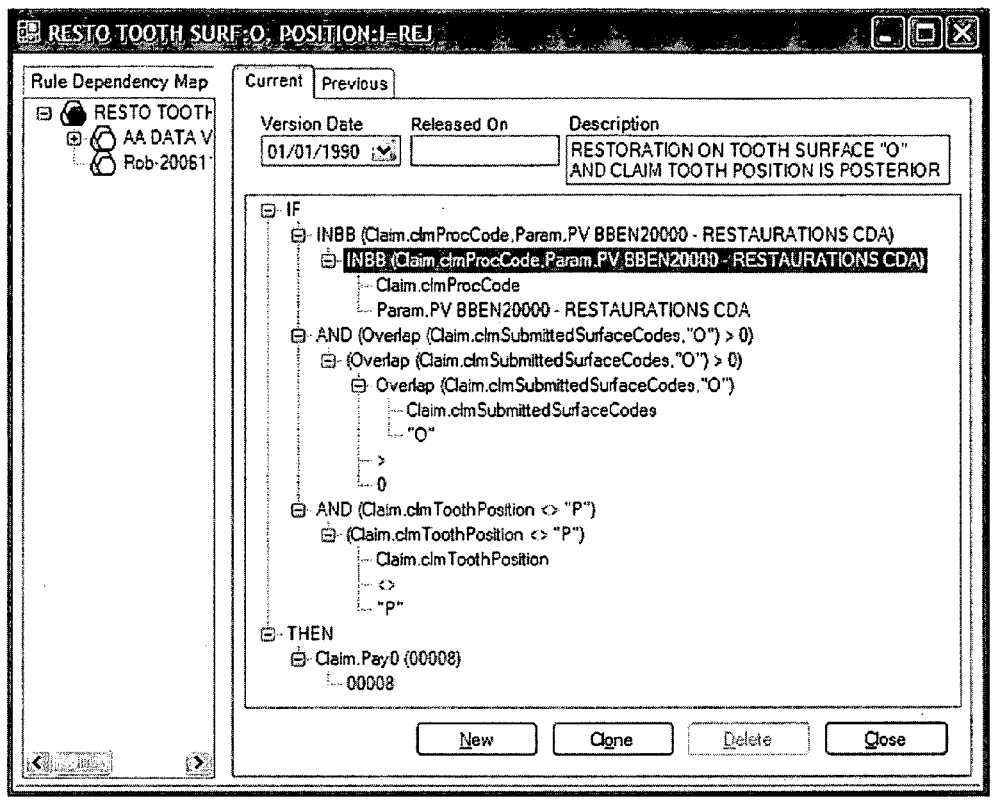
Rule nodes are displayed in hierarchical order:

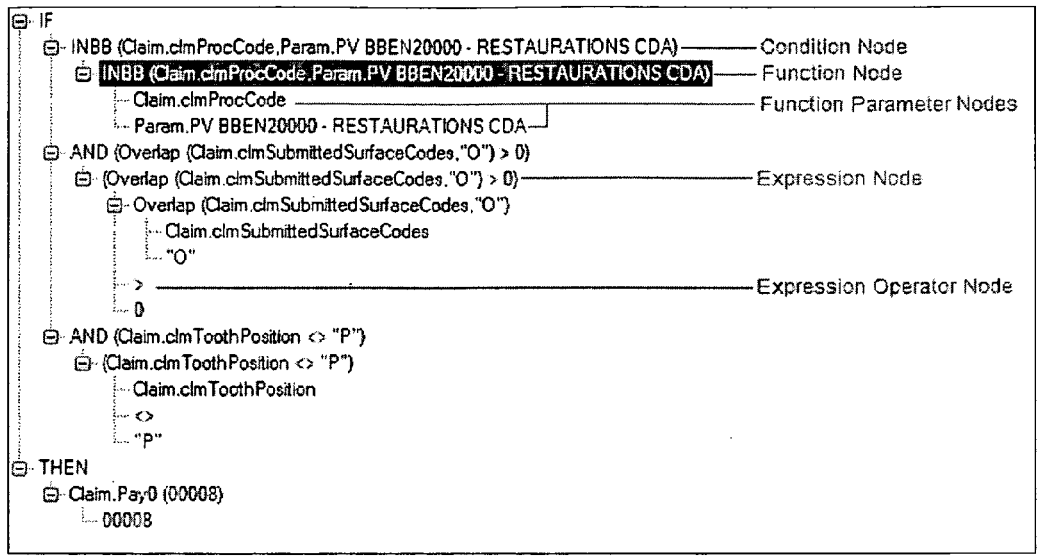

6.4.1 ADDING EXPRESSIONS

To add an expression to a Rule in Tree View:

1. Click to select the expression node where the compound expression will be located, and select New Expression from the Rule menu.

If the selected expression is empty, you must assign values to it before adding a new expression. See 6.4.2 Editing Expressions for details on assigning values in expressions.

2. Select whether the new expression is placed before or after the current expression.

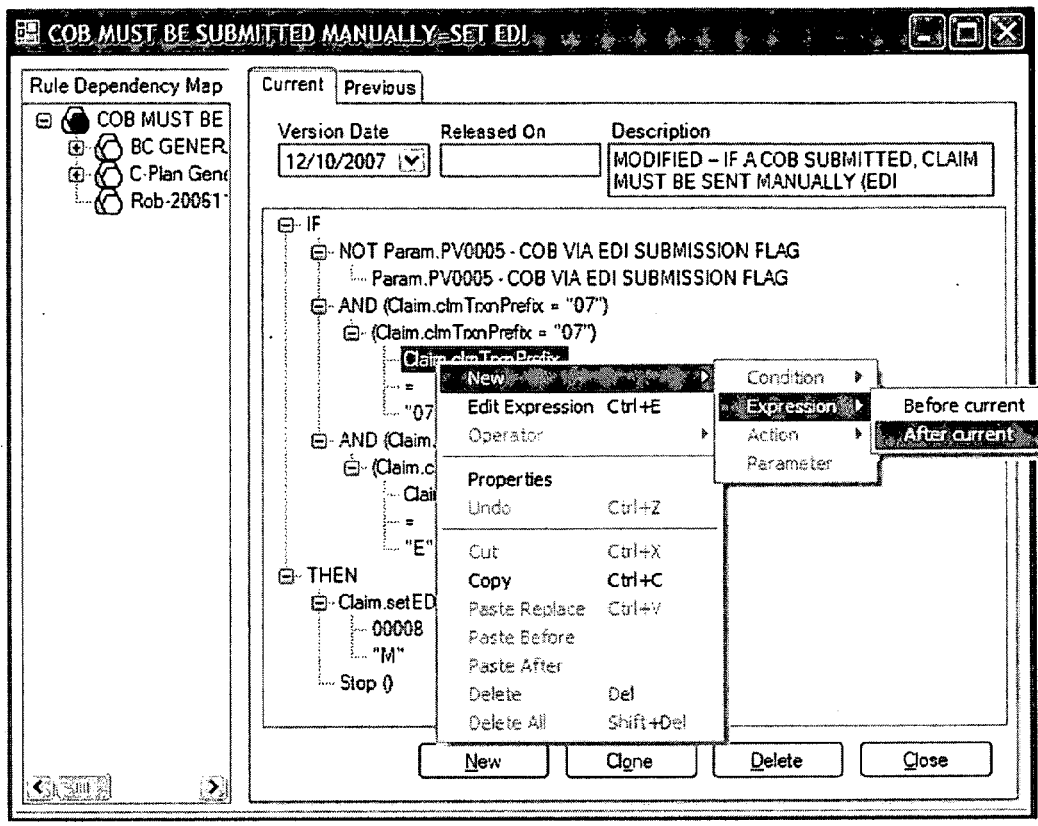
3. After making your choice, an empty expression node appears on the tree in the position you specified.

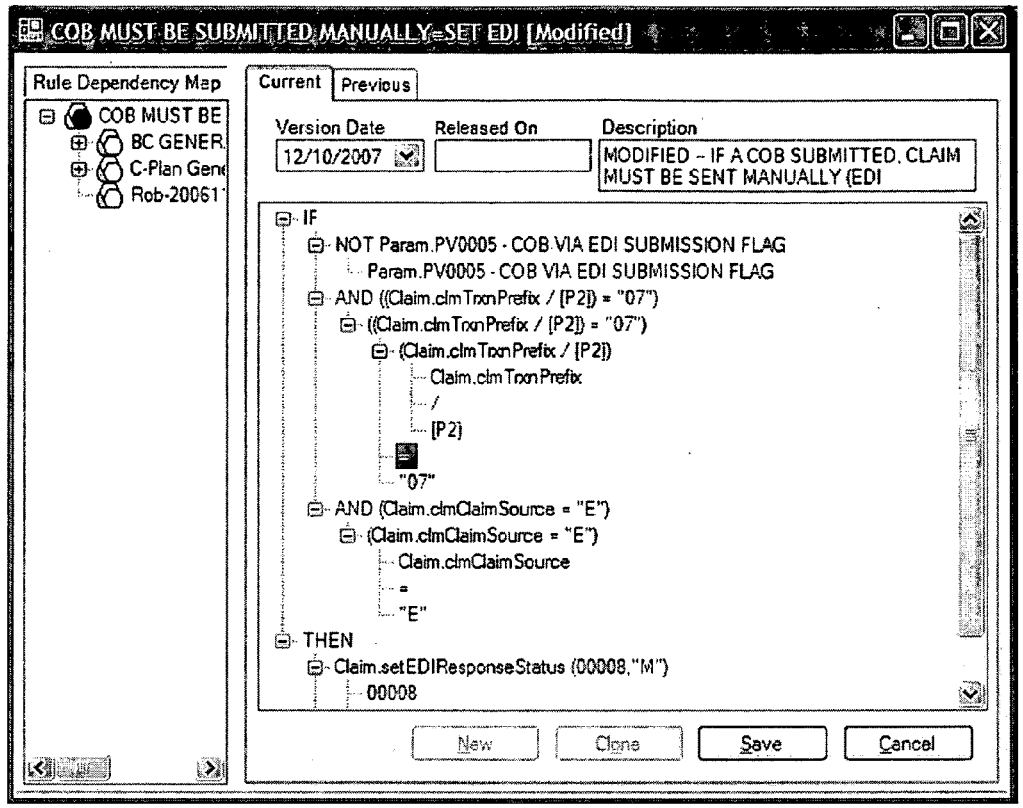
Note that there are three new nodes on the tree: An expression is comprised of two operands and an operator between them.
- The selected node becomes one of the operands, so a new node for the other operand and a new node for the related operator are required.
- The third new node is parent node representing the entire expression.

| Original Rule | Modified Rule |
|---|---|
| ⊟ IF<br>  ⊟ NOT Param.PV0005 - COB VIA EDI SUBMISSION FLAG<br>    ⌞ Param.PV0005 - COB VIA EDI SUBMISSION FLAG<br>  ⊟ AND (Claim.clmTrxnPrefix = "07")<br>    ⊟ (Claim.clmTrxnPrefix = "07")<br>      ⌞ Claim.clmTrxnPrefix<br>      ⌞ =<br>      ⌞ "07"<br>  ⊟ AND (Claim.clmClaimSource = "E")<br>    ⊟ (Claim.clmClaimSource = "E")<br>      ⌞ Claim.clmClaimSource<br>      ⌞ =<br>      ⌞ "E"<br>⊟ THEN<br>  ⊟ Claim.setEDIResponseStatus (00008,"M")<br>    ⌞ 00008<br>    ⌞ "M"<br>  ⌞ Stop () | ⊟ IF<br>  ⊟ NOT Param.PV0005 - COB VIA EDI SUBMISSION FLAG<br>    ⌞ Param.PV0005 - COB VIA EDI SUBMISSION FLAG<br>  ⊟ AND ((Claim.clmTrxnPrefix / [P2]) = "07")<br>    ⊟ ((Claim.clmTrxnPrefix / [P2]) = "07")<br>      ⊟ (Claim.clmTrxnPrefix / [P2])<br>        ⌞ Claim.clmTrxnPrefix<br>        ⌞ /<br>        ⌞ [P2]<br>      ⌞ =<br>      ⌞ "07"<br>  ⊟ AND (Claim.clmClaimSource = "E")<br>    ⊟ (Claim.clmClaimSource = "E")<br>      ⌞ Claim.clmClaimSource<br>      ⌞ =<br>      ⌞ "E"<br>⊟ THEN<br>  ⊟ Claim.setEDIResponseStatus (00008,"M")<br>    ⌞ 00008<br>    ⌞ "M"<br>  ⌞ Stop () |

6.4.2 EDITING EXPRESSIONS

Compound expression nodes cannot be edited. Compound expression nodes are modified indirectly by editing their constituent expression nodes and operator nodes.

To edit an expression using the Expression Builder:

1. Click to select the expression node and then select Edit Expression from the Rule menu.

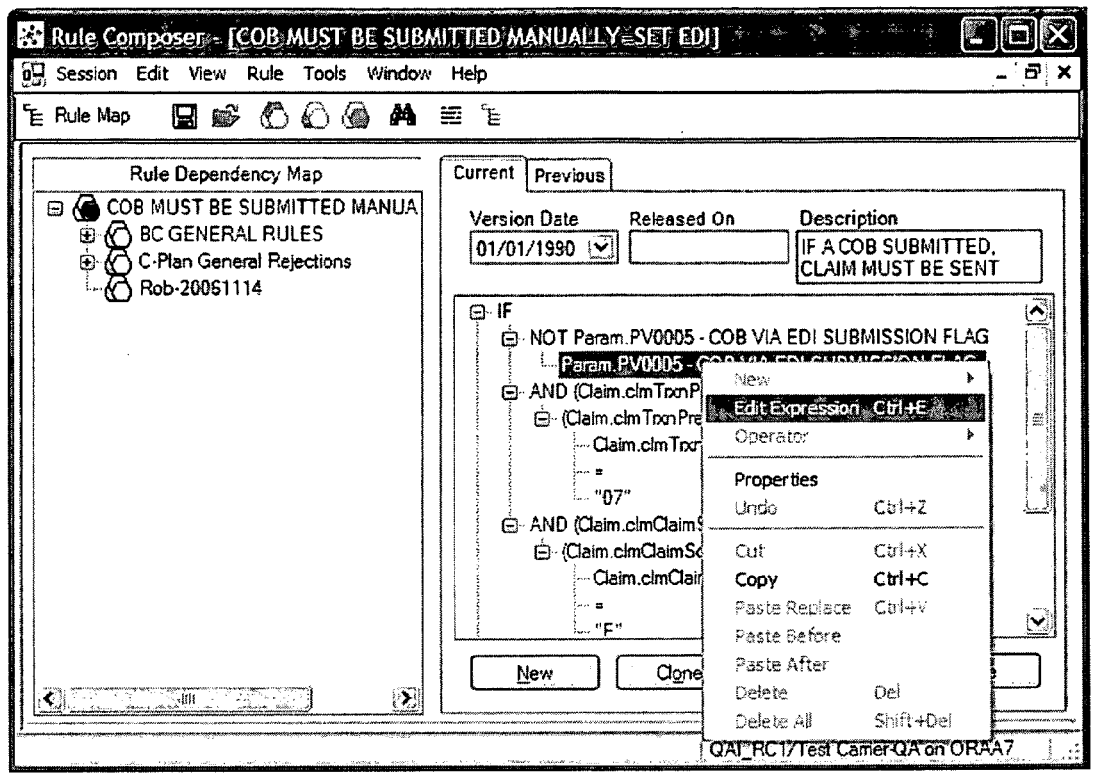
2. The Expression Builder dialog box is displayed. Enter a literal value or select from a list of available functions, object values, and object methods. It also displays the data types of any required parameters and the resulting data type.
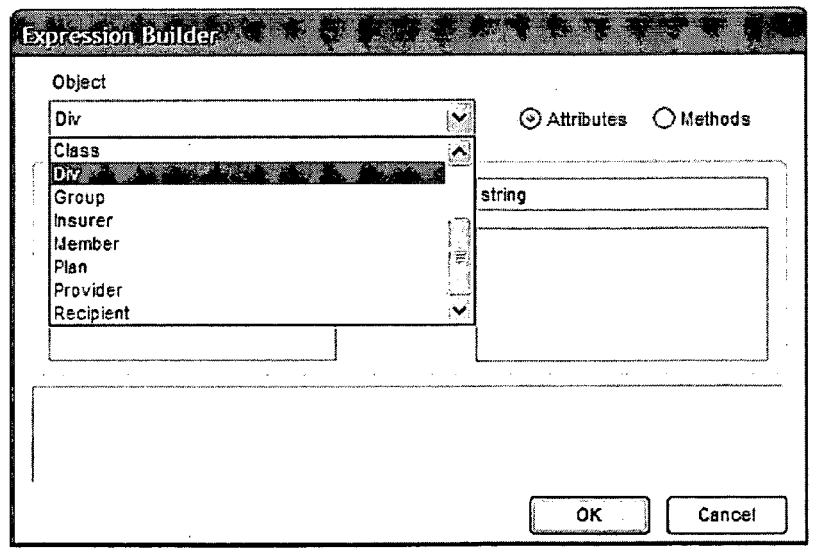

3. If you select a function or object method that requires parameters, an expression node for each parameter is automatically created on the Tree View. Values for parameter nodes are entered in the same way as for expression nodes.

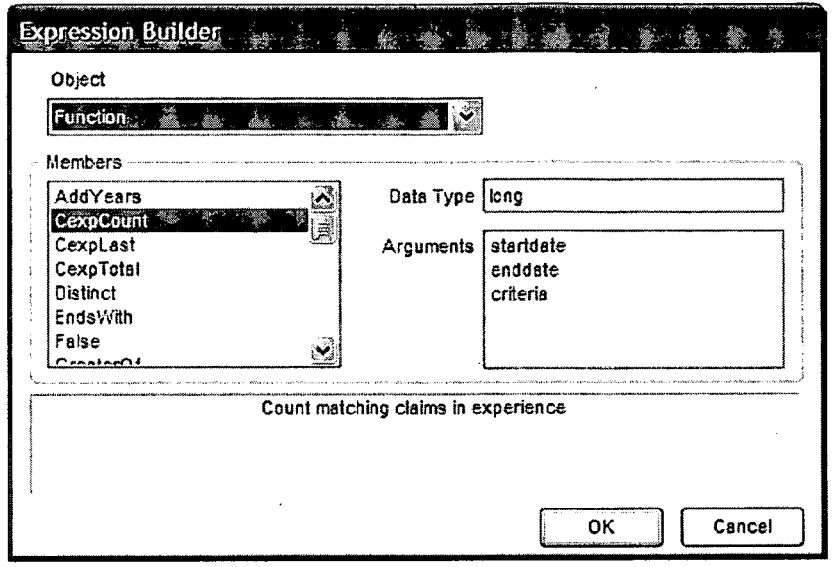

6.4.3 ADDING CONDITIONS

The procedure for adding Conditions to a rule is similar to adding expressions.

1. Click to select the expression node, and select New Condition from the Rule menu.
2. Select whether the new Condition is placed before or after the selected node.

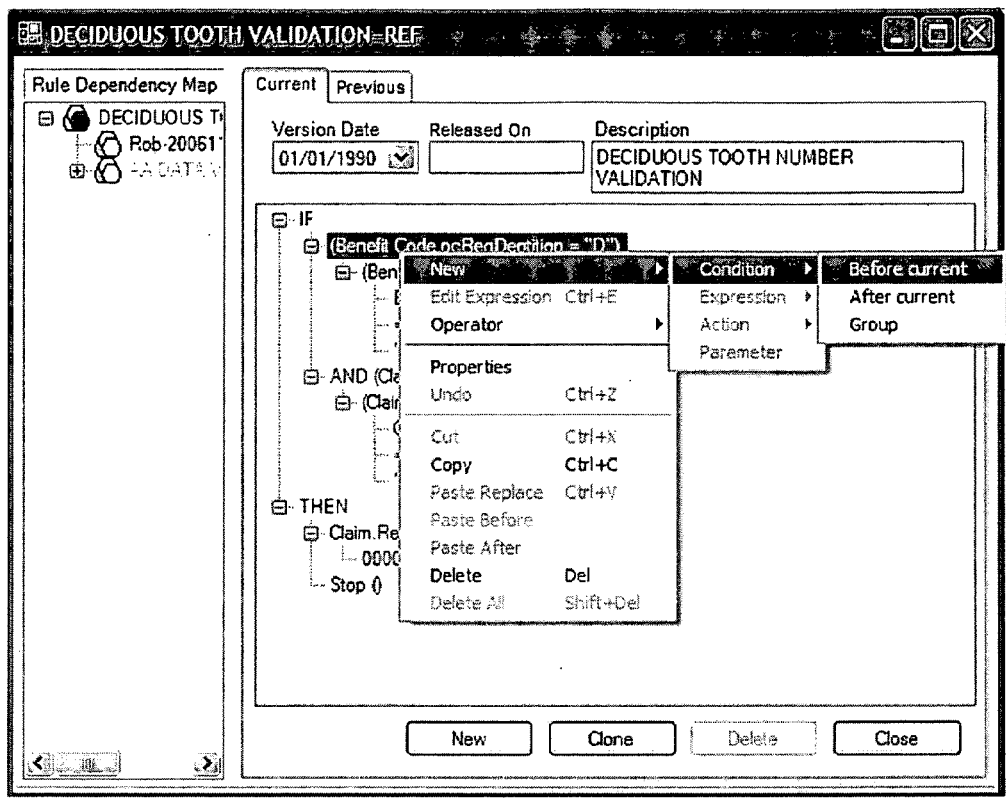
3. After making your choice, an empty Condition node branch appears on the tree in the position you specified. Adding a new Condition also adds an operator node that joins the new Condition with the selected condition.

| Original Rule | Modified Rule |
|---|---|
| ⊟ IF<br>  ⊟ (Benefit Code.pcReqDentition = "D")<br>    ⊟ (Benefit Code.pcReqDentition = "D")<br>      ├ Benefit Code.pcReqDentition<br>      ├ =<br>      └ "D"<br>  ⊟ AND (Claim.clmDentition <> "D")<br>    ⊟ (Claim.clmDentition <> "D")<br>      ├ Claim.clmDentition<br>      ├ <><br>      └ "D"<br>⊟ THEN<br>  ⊟ Claim.Refuse (00008)<br>    ├ 00008<br>    └ Stop () | ⊟ IF<br>  ⊟ ([P1] = [P2])<br>    ⊟ ([P1] = [P2])<br>      ├ [P1]<br>      ├ =<br>      └ [P2]<br>  ⊟ AND (Benefit Code.pcReqDentition = "D")<br>    ⊟ (Benefit Code.pcReqDentition = "D")<br>      ├ Benefit Code.pcReqDentition<br>      ├ =<br>      └ "D"<br>  ⊟ AND (Claim.clmDentition <> "D")<br>    ⊟ (Claim.clmDentition <> "D")<br>      ├ Claim.clmDentition<br>      ├ <><br>      └ "D"<br>⊟ THEN<br>  ⊟ Claim.Refuse (00008)<br>    ├ 00008<br>    └ Stop () |

6.4.4 ADDING ACTIONS

To add actions to a Rule:

1. Click to select the action node, and select New Action from the Rule menu.
2. Select whether the new action is placed before or after the selected node.

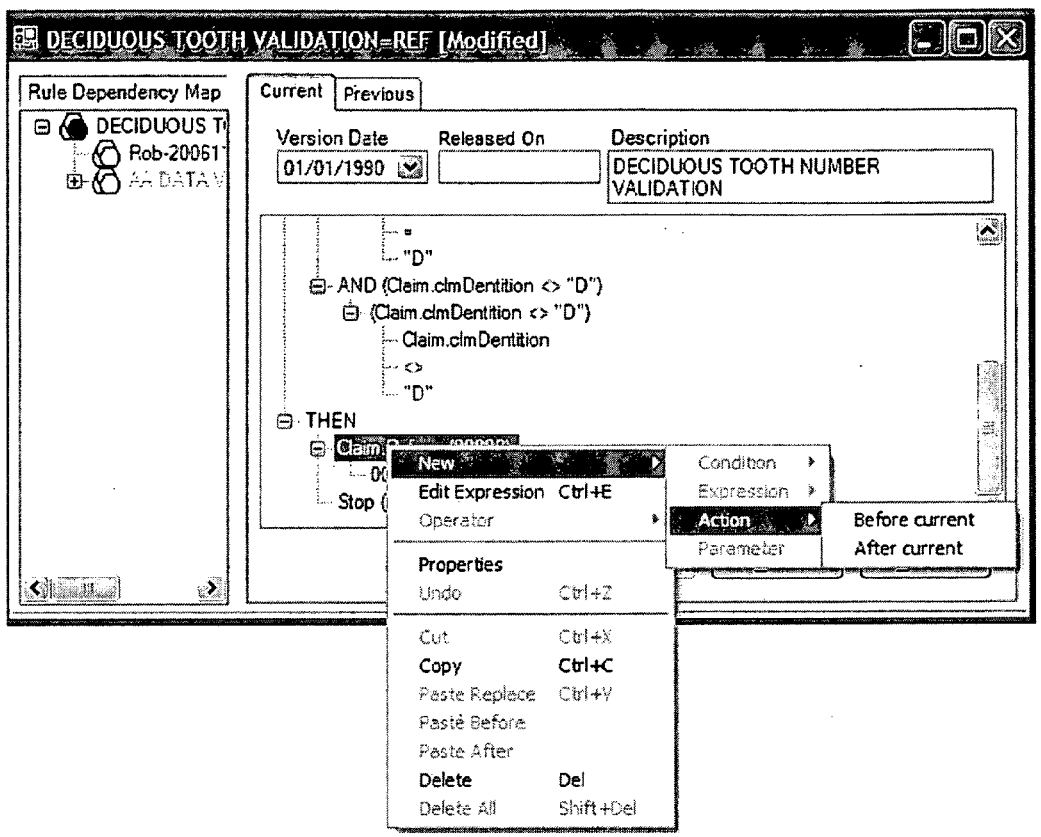
3. After making your choice, an empty Action node appears on the tree in the specified position. Unlike Conditions, operators are not required to join Actions.

| Original Rule | Modified Rule |
|---|---|
| ⊟ IF<br>  ⊟ (Benefit Code.pcReqDentition = "D")<br>    ⊟ (Benefit Code.pcReqDentition = "D")<br>      ⊢ Benefit Code.pcReqDentition<br>      ⊢ =<br>      ⊢ "D"<br>  ⊟ AND (Claim.clmDentition <> "D")<br>    ⊟ (Claim.clmDentition <> "D")<br>      ⊢ Claim.clmDentition<br>      ⊢ <><br>      ⊢ "D"<br>⊟ THEN<br>  ⊟ Claim.Refuse (00008)<br>    ⊢ 00008<br>  ⊢ Stop () | ⊟ IF<br>  ⊟ (Benefit Code.pcReqDentition = "D")<br>    ⊟ (Benefit Code.pcReqDentition = "D")<br>      ⊢ Benefit Code.pcReqDentition<br>      ⊢ =<br>      ⊢ "D"<br>  ⊟ AND (Claim.clmDentition <> "D")<br>    ⊟ (Claim.clmDentition <> "D")<br>      ⊢ Claim.clmDentition<br>      ⊢ <><br>      ⊢ "D"<br>⊟ THEN<br>  ⊟ Claim.Refuse (00008)<br>    ⊢ 00008<br>  ⊢ [Action]<br>  ⊢ Stop () |

6.4.5 CHANGING OPERATORS

Whenever you add a Condition or Expression, an operator node is created with the appropriate default operator.

To change an operator:

1. Select the operator node, and select Operator from the Rule menu.

2. A submenu of valid operators is displayed; click to select the operator. Only the operators that apply to the selected node are listed in popup menu. If a condition node is selected then only Boolean operators (NOT, AND, OR etc.) are available. If an operator node in a relational expression is selected then only relational operators are available. Arithmetic operators (+, -, * etc.) are available for any other operator node.

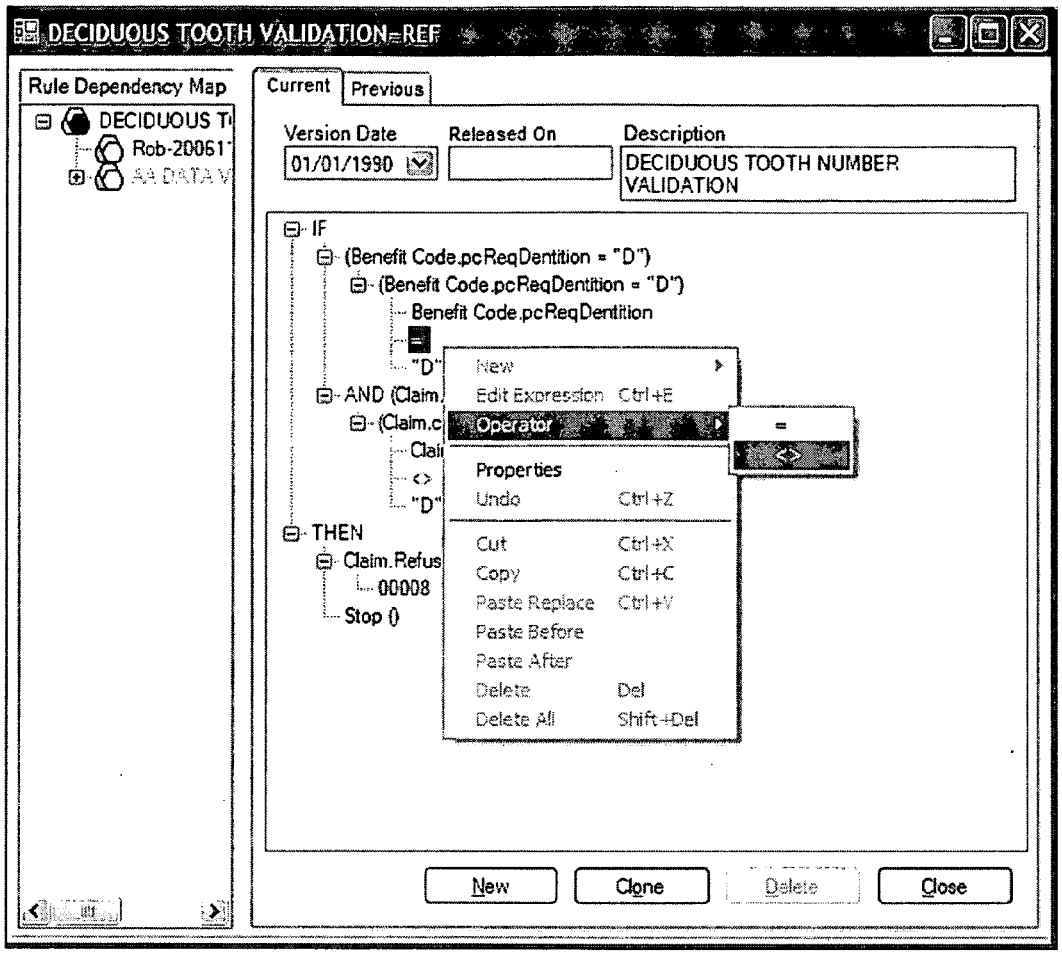

| Original Rule | Modified Rule |
|---|---|
| ⊖ IF<br>   ⊖ (Benefit Code.pcReqDentition = "D")<br>     ⊖ (Benefit Code.pcReqDentition = "D")<br>         — Benefit Code.pcReqDentition<br>         — =<br>         — "D"<br>   ⊖ AND (Claim.clmDentition <> "D")<br>     ⊖ (Claim.clmDentition <> "D")<br>         — Claim.clmDentition<br>         — <><br>         — "D"<br>⊖ THEN<br>   ⊖ Claim.Refuse (00008)<br>     — 00008<br>   — Stop () | ⊖ IF<br>   ⊖ (Benefit Code.pcReqDentition <> "D")<br>     ⊖ (Benefit Code.pcReqDentition <> "D")<br>         — Benefit Code.pcReqDentition<br>         — <><br>         — "D"<br>   ⊖ AND (Claim.clmDentition <> "D")<br>     ⊖ (Claim.clmDentition <> "D")<br>         — Claim.clmDentition<br>         — <><br>         — "D"<br>⊖ THEN<br>   ⊖ Claim.Refuse (00008)<br>     — 00008<br>   — Stop () |

6.4.6 WORKING WITH FUNCTIONS AND METHODS

Selecting a function or object method on the Expression Builder form creates a node for each of the required parameters.

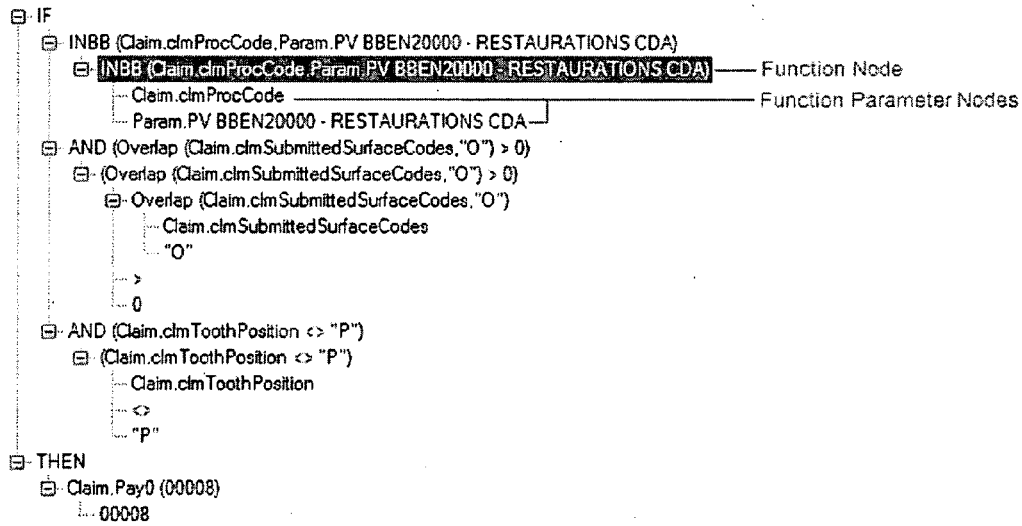

Values are assigned to parameter nodes is the same manner as any other expression node. However, parameter nodes behave differently from other expression nodes in that operators are not required between them and you cannot delete them.

6.4.7 PARAMETER ARRAYS

Methods that accept Parameter Arrays will accept one or more parameters in the parameter array position. The first member of the parameter array is automatically added when you select the Method.

To add parameters to a parameter array, select one of the existing parameter array nodes and select New from the Rule menu.

Note that some implementations (Business Object Models) may not have Methods that require Parameter Arrays.

6.4.8 DELETING NODES

The following nodes cannot be deleted:

- A Condition node if it is the only condition
- An Action node if it is the only Action
- The last parameter of a Parameter Array
- Parameter nodes To delete a node:

1. Click to select the node you want to delete.
2. Select Delete from the Edit Menu (or right-click and select Delete).

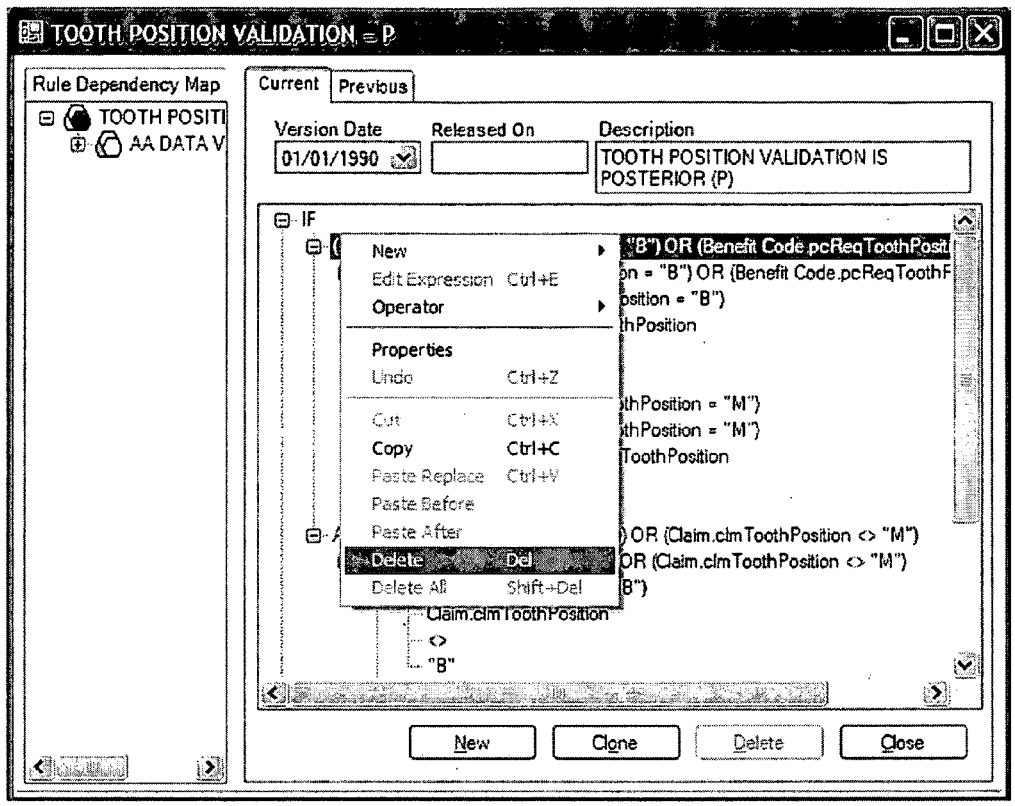

6.4.9 SAVING RULES

A Rule that has been modified will have the Save item enabled on the Rule menu.

- Selecting Save compiles the rule and, if there are no errors, saves the XML formatted rule to the database. If the Rule is new, the Properties window is displayed prompting you for a Name and Description before saving to the database.

- The Rule Editor will not save a Rule that has any Empty Nodes. Empty Nodes are nodes created by the Expression Builder as placeholders for Method Parameters and Expression Parameters. When an Empty Node is found during the Save operation a warning dialog box appears and the first Empty Node is selected.

- The Rule Editor will not save a Rule that has incompatible data types in any expression. An example of an incompatible data type in an expression is an expression that compares a String to a Number.

A copy of a Rule can be saved under a different name by selecting Rule->Save As. A dialog box appears asking you to select the location for the new Rule. Select a Rule Container and press the OK button. The Properties dialog box then appears prompting you for the new Name and Description.

6.5 THE DEPENDENCY MAP

Changes to the single instance of a Rule Object are automatically picked up by all references to that Rule Object. The Dependency Map section displays the Rule Hierarchy from the bottom up, so that all references to the current Rule Object are easily distinguished.

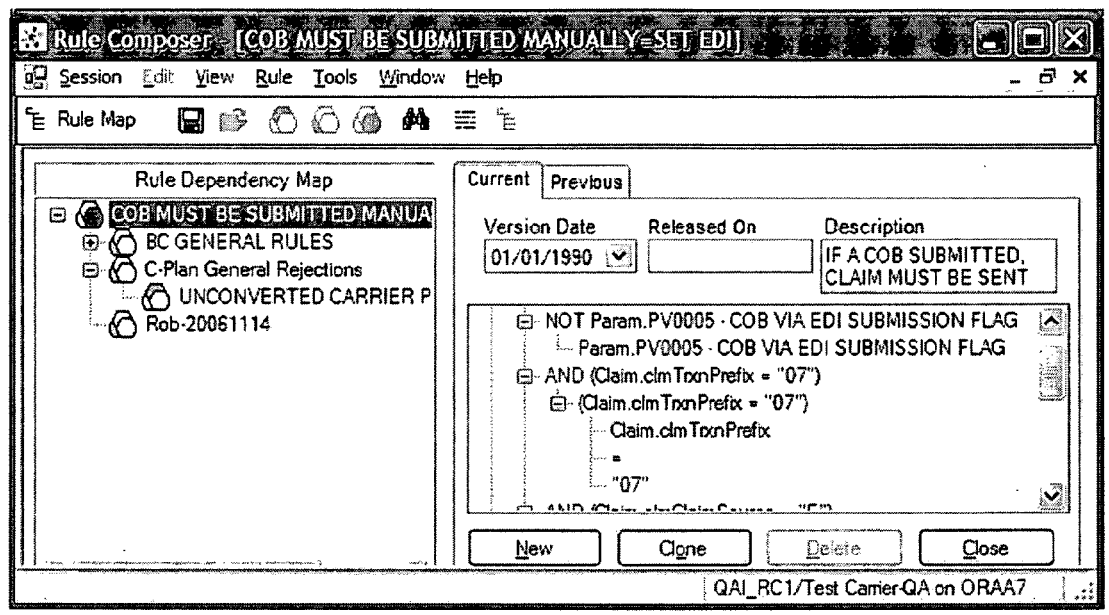

6.6 RULE VERSIONS

Rule Versions track the history of changes to the definition of a Rule. Changes to Rule definitions have a specific date at which they go into effect, allowing a chronological implementation of Rule changes.

- Rules that have been released into production should not be modified or deleted, as it would produce inconsistent results when back dated claims are processed.

- Modifying a Rule creates a new version with the old version implicitly expiring as the new version goes into effect.

- Only the latest version of a rule element can be used to create a new version. The user must specify an effective date for the new version that is after the effective date of the previous version.

- Once a Rule has been promoted to production the user must create a new version to make a change. Rule elements that have not been promoted to the production environment can be edited without creating a new version.

6.6.1 CREATING A NEW RULE VERSION

To create a new version of a Rule based on the current version:

1. Click New.

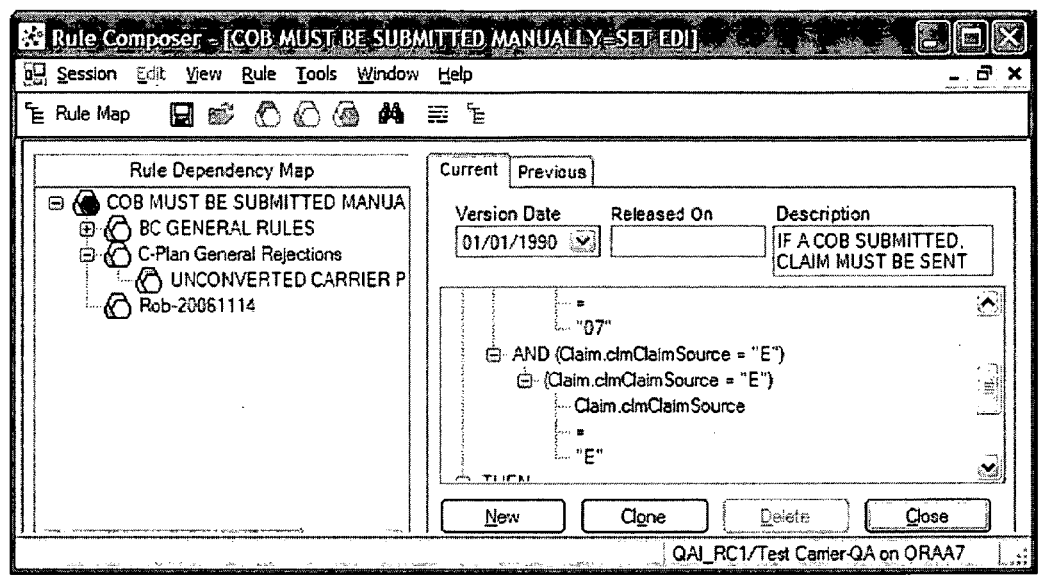

2. Modify the Version Date if required. The default Version Date for the new version is the system date or one day after the original version date, whichever is greater.

3. Enter a Description for the new version.

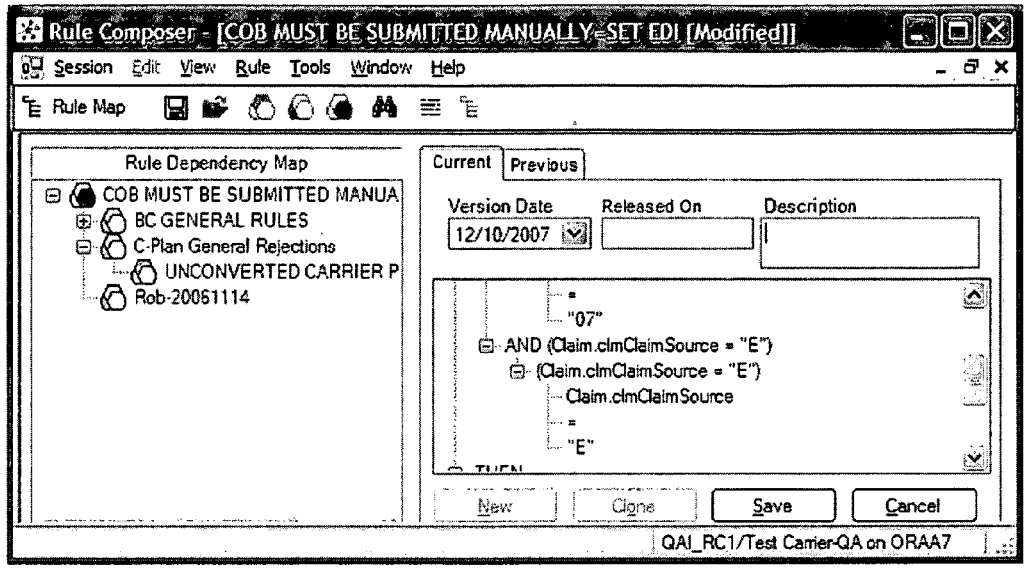
4. Click Save to save the new version.
   The original Rule version is moved to the Previous tab upon successful save.
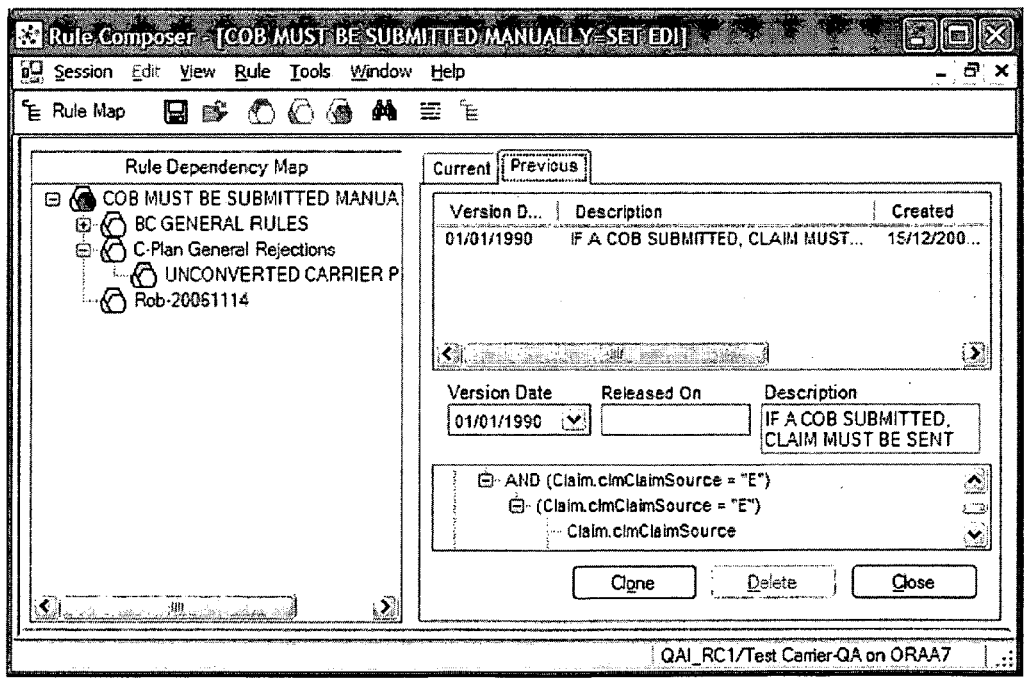

6.7 RULE PATCHING

From time to time there may be situations requiring a change or fix to a specific version of a Rule. Patching is differentiated from versioning in that a new version of the Rule is not created with the changes. The change is applied directly to the existing Rule Version.

The user is prompted for a reason for applying the patch. A copy of the original data and the patch reason is written to the audit table.

- Changing the Version Date is allowed but the new Version Date must be between the Version Dates of the preceding and following versions of the patched Rule if they exist.
- The Patch command button is visible on the Current tab if the current version has been released. After clicking on Patch the Rule Tree and Version Date are editable.
- The Patch command button is visible on the Versions tab if the selected version has been released. After clicking on Patch the Version list is locked and the Rule Tree and Version Date are editable.
- The initial save of a patch clears the Release Date after which subsequent changes are considered normal edits.

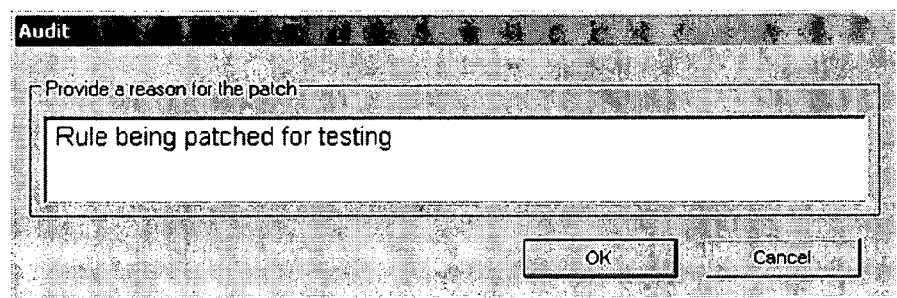

7 TOOLS

7.1 PARAMETERIZED VALUES

Parameterized Values are variables that can be used in Adjudication Rules. Their use allows the creation of generic rules that can be reused in different situations by assigning the appropriate value to the variable. The assigned value of any parameter used in a rule is determined when a claim is processed and the rule is encountered.

The values of parameters are stored in database tables and maintained independently from the adjudication rules that use them. Users who do not have adjudication rules expertise now have the ability to modify the behaviour of generic rules through simple table update screens. There is minimal risk in making this type of rule modification as the basic structure of the adjudication rule does not change.

Parameterized Values must be declared before they can be used in an adjudication rule.

| Code | Description | Type | Default Value | Released |
|---|---|---|---|---|
| 111ROB | TEST | Boolean | F | |
| 222ROB | TEST DO NOT USE | Boolean | T | |
| 234 | 234 | BenefitBlock | CDA 49220 ... | |
| AR1_BENEFIT_BLOCK | DESC OF AR1 BENEFIT BLOCK | BenefitBlock | EMPTY | |
| AR1_LIMIT | age limit for age limit rule 1. | Long | 12 | |
| AR2_BENEFIT_BLOCK | benefits for age limit rule 2. | BenefitBlock | #undefined# | |
| AR2_LIMIT | age limit for age limit rule 2. | Long | 12 | |
| BBB 5890 | BBB 5890 | BenefitBlock | CDA 49220 ... | |
| BCAT32300 | BCAT32300-PULPECTOMY CDA | BenefitBlock | #undefined# | |
| BLOCK2 5445 | BLOCK2 5445 | BenefitBlock | block2 5445 | |
| BSUB33000 | BSUB33000 - ROOT CANAL THERAPY C... | BenefitBlock | ALL DENTAL | |

Code: AR1_LIMIT    System Id: 1057

English Label: AR1_LIMIT

English Desc: AGE LIMIT FOR AGE LIMIT RULE 1.

French Label: F[AR1_LIMIT]

French Desc: F[AGE LIMIT FOR AGE LIMIT RULE 1.]

Data Type: Long

Format:

Limits:

Default Value: 12

Created: 29/11/2006 6:11   By: RBT

Updated:   By:

Released:   Used: 0

[Edit]  [Add]  [Delete]  [Close]

- Name
  The Name of the parameterized value is the label displayed in adjudication rules and on parameter assignment screens. The name is updatable since adjudication rules and value assignment references the internal ID.

- Description
  The description is used to clarify the purpose and use of the parameter. The description will be available to users when working with parameterized values. The description is updatable.

- Data Type
  The available data types are Long, Double, Boolean, String, Money and Benefit Block. The Benefit Block data type is used to specify a parameter that references a Benefit Block. Once a Parameter Value has been promoted into production the data type cannot change. Changing the Data Type during the declaration of a Parameter Value will clear the Format, Limits and Default Value. The Data Type is not updatable once the Parameter Value is promoted to production.

| Data Type | Format |
|---|---|
| Long | Specifies the maximum number of digits. Value is an integer greater than zero. The negative sign does not count towards the number of digits on negative numbers. |
| Double | Specifies the maximum number of digits before and after the decimal. Value is of the form m.n where m is an integer >= 0 and n is an integer > 0.<br>Example 5.3 means 12,345.678 fills the field completely. |

| Data Type | Format |
|---|---|
| Boolean | Not applicable. |
| String | Specifies the maximum number of characters. Value is an integer greater than zero. |
| Money | Specifies the maximum number of digits before and after the decimal. Value is of the form m.2 where m is an integer >= 0. |
| Benefit Block | Not applicable. |

- Format
  The Format specifies the size and/or precision of the values. Rule Composer will enforce the required Format specification according to the table below. Once a Parameterized Value is promoted into production the Format cannot change.

Rule Composer will verify the Format entered to ensure that it is appropriate for the chosen data type. Changing the Format during declaration of a Parameter Value will clear the Limits and Default Value fields if they do not conform to the new Format.

- Limits
  The Limits attribute specifies the restrictions placed on values for the parameter. The restrictions take the form of zero or more ranges and/or single values. A range is defined as m:n where m and n are the inclusive endpoints of a range of values. The m and n of a range and single values must conform to the specified Format. Multiple ranges and single values are separated by commas. String values are enclosed in double quotes.

Rule Composer will manage the addition of ranges and values to the Limits once the Data Type and Format have been specified. Ranges and single values are added to the Limits one at a time and accumulated as a list. The Default Value will be cleared if it does not conform to the new Limits specification.

Changing the Limits after a Parameter Value declaration has been promoted to production is allowed and is audited. The user must supply a reason for the change for the audit entry.

- Default Value
  All Parameter Values must have a default value entry that conforms to the Data Type, Format and Limits specifications. Changing the Default Value after a Parameter Value declaration has been promoted to production is allowed and is audited. The user must supply a reason for the change for the audit entry.

Parameters of type Benefit Block require the user to select a default value from a list of available Benefit Blocks. If the appropriate Benefit Block is not available it must be defined in Plan Manager before the Parameter can be declared in Rule Composer.

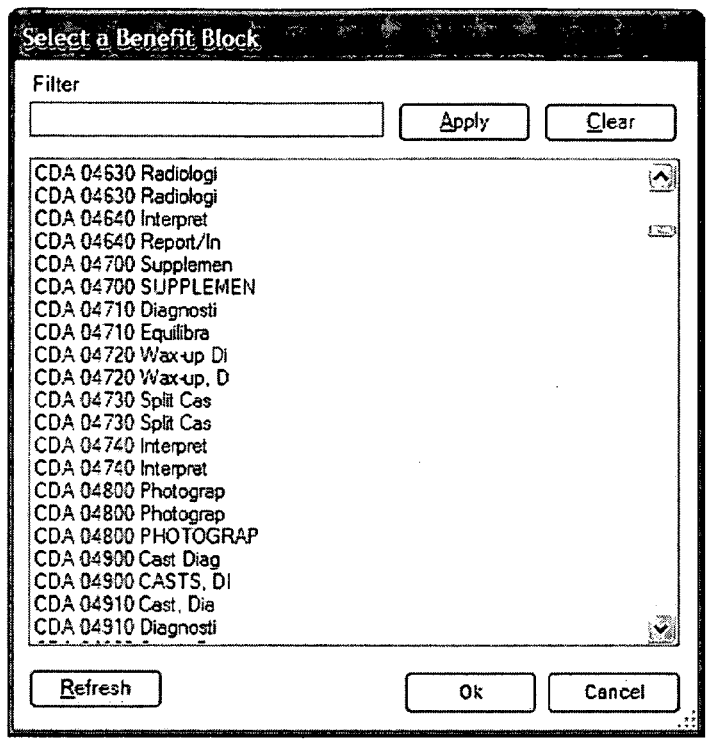
7.2 LIST VALUE MANAGER
The List Value is used to maintain the available Value Values and their contained values. The available Value Types are defined in the Business Object Model (BOM) and cannot be modified by Rule Composer.
To open the List Value:
1. Select List Value from the Tools menu.

| Name | Type | Description |
|---|---|---|
| TOOTHNUM | ToothNumber | TOOTH NUMBER |
| CLAIMLIST | Arch | LIST |
| QALIST | CDA_PC | LIST FOR QA |

Members:

```
11  18  27  36  45  54  71  83
12  21  28  37  46  55  72  84
13  22  31  38  47  61  73  85
14  23  32  41  48  62  74  99
15  24  33  42  51  63  75
16  25  34  43  52  64  81
17  26  35  44  53  65  82
```

2. The Value Group Manager displays a list of existing Value Groups that can be selected to display the contained values.

3. Click Edit to display the Properties dialog box. Value Group Names cannot be modified once the Value Group has been created. The assigned Value Group Type cannot be modified unless the Value Group contains no members.

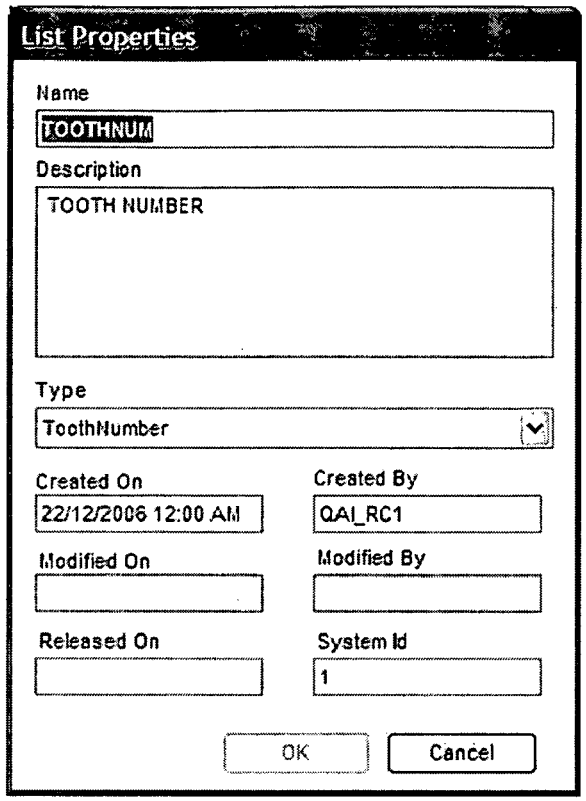

4. Click Add to add a new Value Group. The properties dialog box appears asking for the name, description and Value Group Type for the new Value Group.

5. Click Delete to delete a Value Group. A confirmation dialog box appears with a warning. Select OK to confirm the delete or Cancel to abort the delete operation.

6. Click Edit Members to modify the list of contained values.

If the Value Group belongs to a Value Group Type that is assigned an Enumeration Type, a list of available values is presented along side the list of current members. Otherwise, a text input box is displayed for entry of new values.

Once all changes have been made, click OK to save your changes.

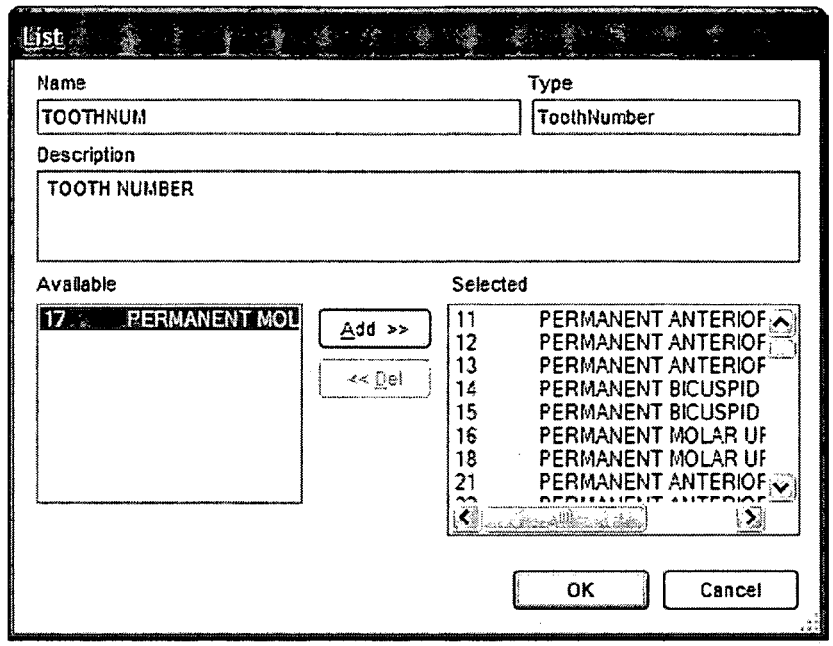
7. Click Refresh to update Lists display.
7.3 ENUMERATION MANAGER
The procedure for managing Enumerations is identical to that of managing Value Groups.
To open the Enumeration Manager, select Enumerations from the Tools menu.

7.4 CLAIM MESSAGES

Claim Messages are used in Rule Actions to attach a message to the claim. The Message Id and the associated messages in multiple languages are maintained using a Table View. The Message Id must be unique for a given carrier and language.

To open the Claim Messages manager, select Error Codes from the Tools menu.

| | Msg | LANG | SHORT_TEXT | LONG_TEXT |
|---|---|---|---|---|
| | 00013 | fr | todo: French[CLAIM PENDED FOR REVI | todo: French[CLAIM HAS BEEN PENDED |
| | 00014 | en | FREQUENCY REACHED AND/OR EXCE | FREQUENCY REACHED AND/OR EXCE |
| | 00014 | fr | todo: French[FREQUENCY REACHED A | todo: French[FREQUENCY REACHED A |
| | 00015 | en | DESENSITIZATION LIMITED TO S40 | DESENSITIZATION LIMITED TO S40 |
| | 00015 | fr | todo: French[DESENSITIZATION LIMITE | todo: French[DESENSITIZATION LIMITE |
| | 00016 | en | GROUP ENROLMENT TYPE DOES NOT | GROUP ENROLMENT TYPE DOES NOT |
| | 00016 | fr | todo: French[GROUP ENROLMENT TYP | todo: French[GROUP ENROLMENT TYP |
| | 00017 | en | SEALANT ONLY ON PERMANENT MOL | SEALANT IS ONLY ALLOWED ON PER |
| | 00017 | fr | todo: French[SEALANT ONLY ON PERM | todo: French[SEALANT IS ONLY ALLOW |
| | 00018 | en | DUMMY ERROR CODE FOR CONVERSI | DUMMY ERROR CODE FOR CONVERSI |
| | 00018 | fr | todo: French[DUMMY ERROR CODE FO | todo: French[DUMMY ERROR CODE FO |
| | 101 | en | ERROR 101 | ERROR MESSAGE 101 |
| | 101 | fr | todo: French[ERROR 101] | todo: French[ERROR MESSAGE 101] |
| | 102 | en | ERROR 102 | ERROR MESSAGE 102 |
| | 102 | fr | todo: French[ERROR 102] | todo: French[ERROR MESSAGE 102] |
| | 103 | en | PEND MSG | CLAIM PENDED |
| | 103 | fr | todo: French[PEND MSG] | todo: French[CLAIM PENDED] |
| | 99999 | en | PLACEHOLDER MESSAGE FOR CONV | PLACEHOLDER MESSAGE FOR CONV |
| | 99999 | fr | todo: French[PLACEHOLDER MESSAGE | todo: French[PLACEHOLDER MESSAGE |

7.5 USERS

Rule Composer Users are maintained using a Table View. Only users with the Admin role have access to the User table. To open the Users manager, select Users from the Tools menu.

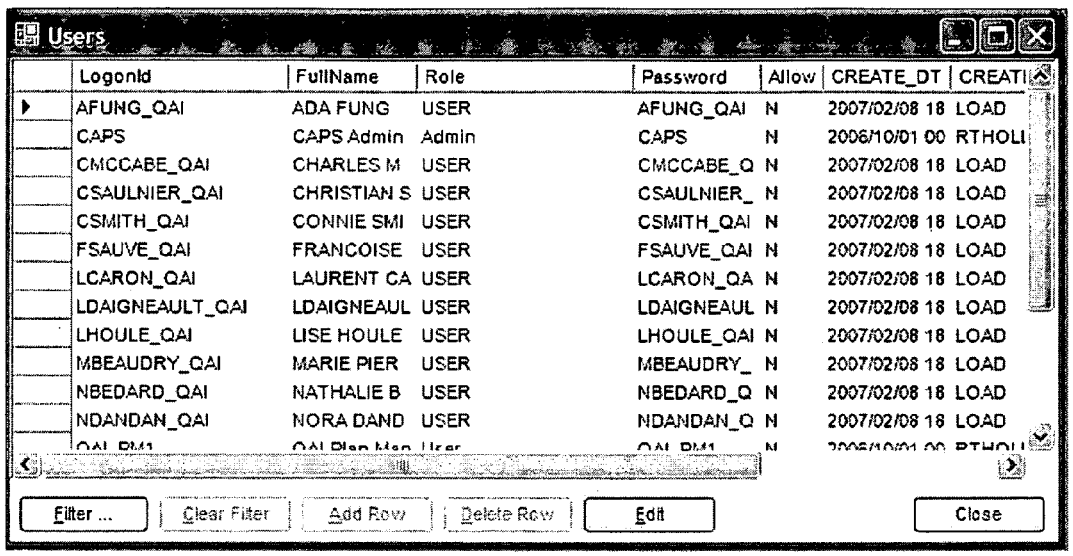
7.6 USING TABLE VIEWS
Table Views allow in-cell editing of database table values.
7.6.1 EDITING RECORDS
Table Views are initially displayed in the Browse (Read Only) Mode.
1. Click Edit to switch to Edit mode and enable in-cell editing of values.

| Claim Messages | | | | |
|---|---|---|---|---|
| Msg ID | LANG | COUN | SHORT_TEXT | LONG_TEXT |
| 00004 | en | ca | TEST | TEST |
| 00004 | fr | ca | todo: French[TEST] | todo: French[TEST] |
| 00005 | en | ca | TEST MESSAGE FOR RULE 27A | TEST MESSAGE FOR RULE 27A |
| 00005 | fr | ca | todo: French[TEST MESSAGE FOR RUL | todo: French[TEST MESSAGE FOR RUL |
| 00007 | en | ca | TEST MESSAGE FOR RULE 22 | TEST MESSAGE FOR RULE 22 |
| 00007 | fr | ca | todo: French[TEST MESSAGE FOR RUL | todo: French[TEST MESSAGE FOR RUL |
| 00008 | en | ca | ERROR MESSAGE FOR INTEGRATION | ERROR MESSAGE FOR INTEGRATION |
| 00008 | fr | ca | todo: French[ERROR MESSAGE FOR IN | todo: French[ERROR MESSAGE FOR IN |
| 00009 | en | ca | TEST MESSAGE FOR RULE 45 | TEST MESSAGE FOR RULE 45 |
| 00009 | fr | ca | todo: French[TEST MESSAGE FOR RUL | todo: French[TEST MESSAGE FOR RUL |

Filter ... | Clear Filter | Add Row | Delete Row | Edit | Close

2. The Add Row and Delete Row buttons are only enabled when the Table View is in Edit mode.

| Claim Messages | | | | |
|---|---|---|---|---|
| Msg ID | LANG | COUN | SHORT_TEXT | LONG_TEXT |
| 00004 | en | ca | TEST | TEST |
| 00004 | fr | ca | todo: French[TEST] | todo: French[TEST] |
| 00005 | en | ca | TEST MESSAGE FOR RULE 27A | TEST MESSAGE FOR RULE 27A |
| 00005 | fr | ca | todo: French[TEST MESSAGE FOR RUL | todo: French[TEST MESSAGE FOR RUL |
| 00007 | en | ca | TEST MESSAGE FOR RULE 22 | TEST MESSAGE FOR RULE 22 |
| 00007 | fr | ca | todo: French[TEST MESSAGE FOR RUL | todo: French[TEST MESSAGE FOR RUL |
| 00008 | en | ca | ERROR MESSAGE FOR INTEGRATION | ERROR MESSAGE FOR INTEGRATION |
| 00008 | fr | ca | todo: French[ERROR MESSAGE FOR IN | todo: French[ERROR MESSAGE FOR IN |
| 00009 | en | ca | TEST MESSAGE FOR RULE 45 | TEST MESSAGE FOR RULE 45 |
| 00009 | fr | ca | todo: French[TEST MESSAGE FOR RUL | todo: French[TEST MESSAGE FOR RUL |

Filter ... | Clear Filter | Add Row | Delete Row | Browse | Close

3. Table Views automatically save changes to the database but can be configured to ask for confirmation for each row saved. If your installation is configured for confirmations then you will see the following dialog box.

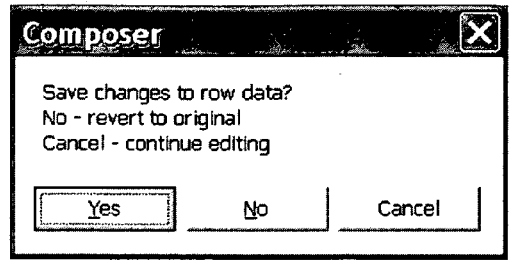

4. Select Yes to save the changes.
   Select No to discard all changes to the row and revert back to the last saved version.
   Select Cancel to abort the save operation but keep all current changes that are pending so that you can continue editing.

Save confirmation, when configured, is only applicable to modifying and inserting records. Deleting records always displays a confirmation dialog box that looks slightly different. Refer to the next section on Deleting records.

7.6.2 DELETING RECORDS

The Delete function is only active in Edit mode. To delete a record:

1. Select any field in the row that you want to delete.
2. Click on the Delete button.

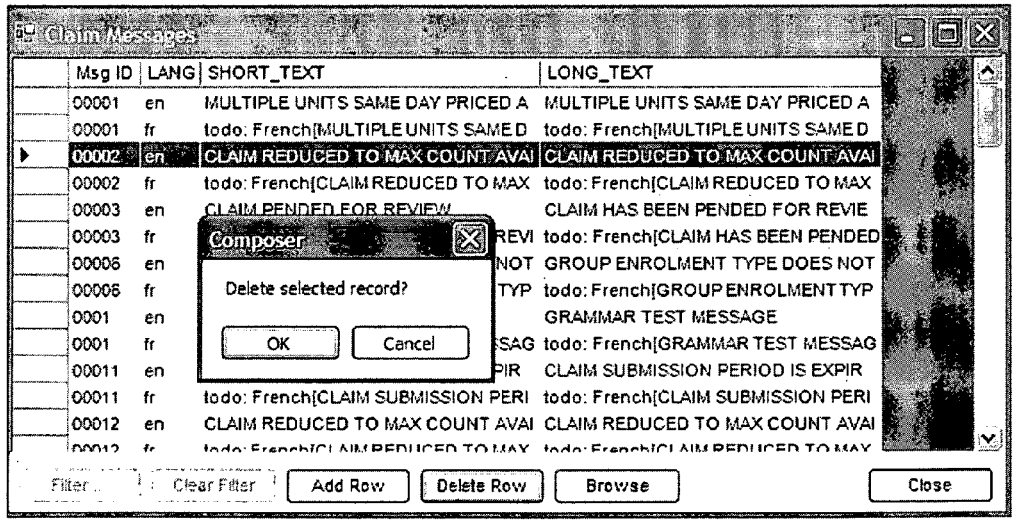

3. Click Ok to complete the delete.

7.6.3 SORTING RECORDS

You can sort columns by clicking on the column headings. Clicking again on a column will alternate between ascending and descending sort order. The example below shows the Table View sorted by the ErrorCode in descending order.

7.6.4 FILTERING RECORDS

You can apply a Filter to Table Views to display a subset of the table rows. The Filter function is only enabled when the Table View is in Browse Mode.

1. Click Filter to display the Filter dialog box.

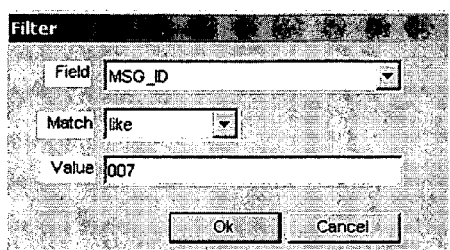

2. Enter the filter criteria and click on the Ok button to apply the filter. Click on the Clear Filter button to remove the filter and display all the table rows.

7.6.5 EXPORTING RECORDS

To export the data in a Table View to a CSV text file:

1. Select Export from the Data menu. The Data menu is only visible when a Table View is open in Browse Mode.

2. Use the Filter function in conjunction with the Export function to export select records.

3. A confirmation dialog box appears indicating the number of records to export.
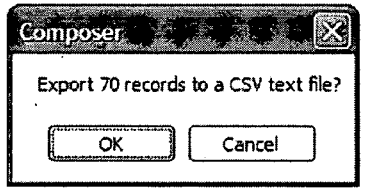
4. Select Ok to confirm the export. A file dialog box is displayed allowing you to specify the location and name of the export file. If necessary, navigate to the desired directory and edit the file name. The default file name is the name of the table.

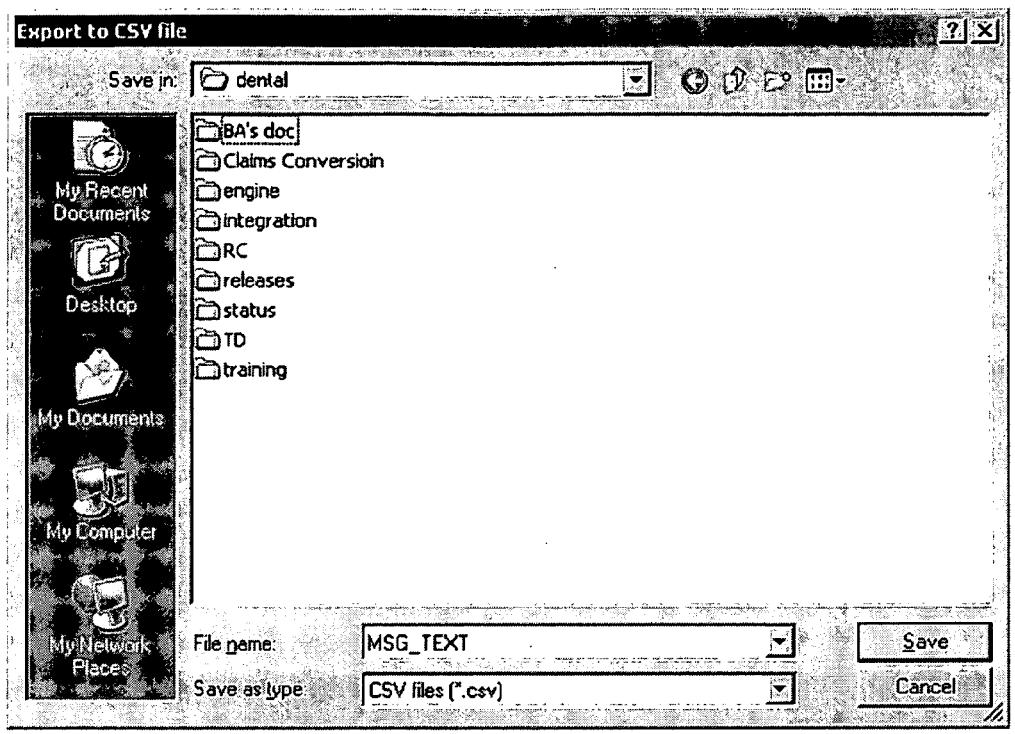
5. Click Save to complete the export.
7.7 EXTERNAL TOOLS
External Tools are executables that Rule Composer can run as an external process. There is no communication between the external process and Rule Composer.
Your installation of Rule Composer may be configured to run External Tools. If so, a list of these commands will appear in the Tools/External menu.

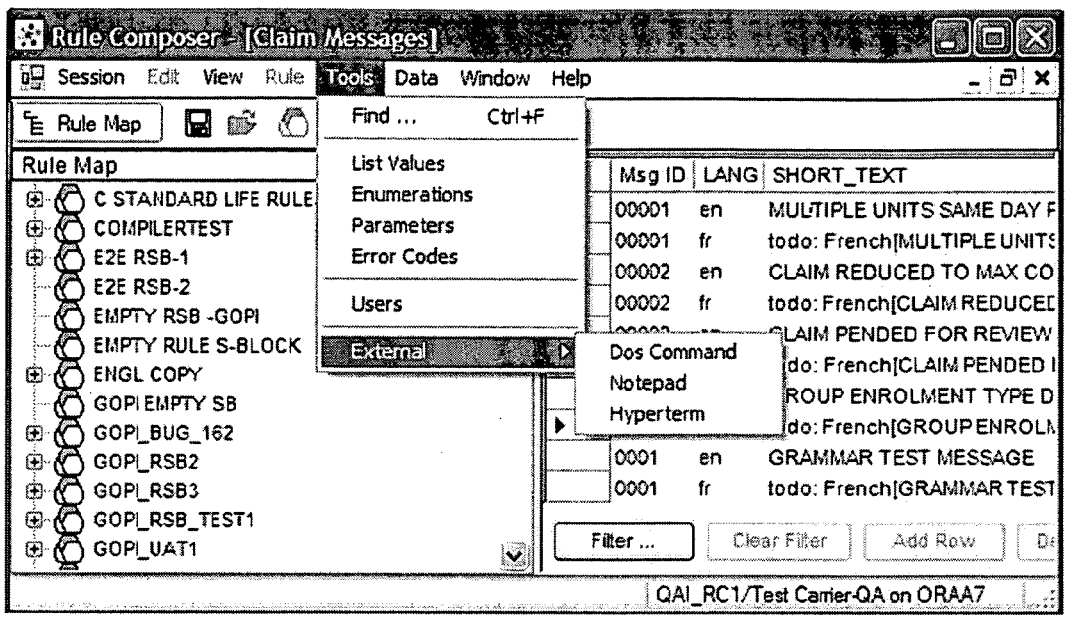

8 DEFINITIONS

| Enumeration | A List containing all the possible or allowable values. |
|---|---|
| Enumeration Value | A member of an Enumeration. |
| Expression Builder | A popup dialog box in Rule Composer that allows the user to choose the appropriate grammar element to use in the construction of a Rule. |
| Group | The term for List in previous version of Rule Composer. |
| Group Value | The term for List Value in previous versions of Rule Composer. |
| List | A logical grouping of literal values that can be referenced by a Rule. |
| List Value | A member of a List. |
| Rule | The If-Then construct of the adjudication logic. The term Rule can also refer to an arbitrary version or the complete set of versions, depending on the context. |
| Rule Block | A logical grouping of Rules. The grouping is defined by the Rule Inclusions. |
| Rule Container | A Rule Block or Rule Super Block. |
| Rule Dependency Map | The graphical representation of the Rule Containers that have a direct or indirect reference to a specific Rule presented using a TreeView control. |
| Rule Editor | A window in Rule Composer that facilitates the editing of a Rule and contains the Rule Dependency Map and the Rule Tree. |
| Rule History | The chronological sequence of Rule Versions having the same Rule name. |
| Rule Inclusion | A reference to a Rule from a Rule Block. The reference has an Effective Date and Expiry Date. The reference is by name and does not specify a version. |
| Rule Map | The graphical representation of the Rule Organization presented using a TreeView control. |
| Rule Object | A Rule or Rule Container. |
| Rule Organization | The arrangement of Rules and Rule Containers within the system. |
| Rule Super Block | A logical grouping of Rule Blocks. |
| Rule Tree | The graphical representation of a Rule presented using a TreeView control. |
| Rule Version | A specific instance of a Rule definition in the Rule History. |
| Rule Version Date | The date that a Rule Version goes into effect. This date has no relation to the Effective Date of a Rule Inclusion. |
| Time Line / Inclusion | The chronological sequence of Rule Inclusions for a specific Rule and Rule Block. |
| Time Span | A time segment within a Time Line within which the Rule Inclusions for a Rule Block are static. |

The invention claimed is:

1. A method for storing and accessing a hierarchy-based insurance plan in a computer memory as a deployed plan for use in processing an insurance claim as machine-to-machine interaction involving a claim processing server and a plurality of client devices, the method comprising the steps of:
configuring the computer memory of a server according to a data structure, the data structure provided as a set of rules for execution by a computer processor, the data structure including:
a set of benefit codes and logical relationships between the benefit codes to define a benefit hierarchy; and
a set of adjudication rules and logical relationships between the adjudication rules to define a rule hierarchy, the insurance plan including the benefit hierarchy and the rule hierarchy;
receiving the insurance claim by the server from a form interface client application provisioned on one of the plurality of client devices;
defining adjudication rules of the rule hierarchy adapted for processing the insurance claim, the insurance claim having claim content including a claim date;
configuring the computer memory as the data structure including:
at least two secondary rule containers for logically grouping the adjudication rules, an adjudication rule of the adjudication rules coupled to one of the at least two secondary rule containers by a first rule reference associated with the content of the respective secondary rule container, said adjudication rule coupled to another of the at least two secondary rule containers by a second rule reference associated with the content of the respective another rule container; and
a primary rule container, each of the at least two secondary rule containers coupled to the primary rule container by a corresponding container reference associated with the content of the respective primary rule container, the primary rule container having a list to define an execution order of corresponding container references;
wherein said adjudication rule, the containers, and the first rule reference, the second rule reference and the container references represent the set of adjudication rules defining the deployed plan, at least one of the container reference or the first rule reference or the second rule reference having an associated rule date being at least one of an effective date or an expiry date;
based on the insurance claim, further configuring the data structure by comparing the associated rule date with the claim date to determine which of the adjudication rules are included in the set of adjudication rules appropriate to the claim content of the insurance claim;
using the data structure including the set of adjudication rules to process the insurance claim with the adjudication rules by the execution order defined by the list of the primary rule container to determine a settlement of the insurance claim; and
based on the settlement, communicating an amount covering the insurance claim to the client application.

2. The method of claim 1 further comprising the step of adding parameter values to said adjudication rules.

3. The method of claim 1, wherein the rule containers and the adjudication rules are defined as rule objects.

4. The method of claim 3, wherein a modification to said adjudication rule is applied to each of the at least two secondary containers via the first rule reference and the second rule reference to said adjudication rule.

5. The method of claim 1 further comprising defining one or more benefit codes of the benefit hierarchy; defining at least two secondary benefit containers and coupling at least one of the one or more benefit codes to one of the at least two secondary benefit containers by a benefit reference associated with the content of the respective secondary benefit container; defining a primary benefit container and coupling each of the at least two secondary benefit containers to the primary benefit container by a benefit container reference associated with the content of the respective primary benefit container, such that the benefit codes, the benefit containers, and the benefit and container references define a benefit hierarchy for representing the benefit codes in the set of adjudication rules; and storing the benefit codes and benefit containers in the computer memory.

6. The method of claim 5, wherein the benefit containers and the benefit code are defined as benefit objects and wherein each of the benefit objects are instances of a defined benefit code or benefit container stored in the computer memory.

7. The method of claim 6, wherein the defined benefit code, the defined benefit container, the defined rule and the defined rule container are configured as reusable for creating said instances.

8. The method of claim 1, wherein exclusion or inclusion of the adjudication rules and the secondary containers is configured to occur through the comparison of the claim date with the associated rule date of the container references in order to determine if the respective secondary rule container is part of the set of adjudication rules for use in processing the insurance claim, such that the non-matching dates exclude the respective secondary rule container from being included in the execution order.

9. A data storage and access system for a computer memory, the system including a claim processing server for configuring a hierarchy-based insurance plan to define a deployed plan for use in processing an insurance claim as machine-to-machine interaction involving the server and a plurality of client devices, the insurance claim having claim content including a claim date, the server comprising:
the computer memory of the server as a data structure, the data structure provided as a set of rules for execution by a computer processor, the data structure including:
a set of benefit codes and logical relationships between the benefit codes to define a benefit hierarchy; and
a set of adjudication rules and logical relationships between the adjudication rules to define a rule hierarchy, the insurance plan including the benefit hierarchy and the rule hierarchy, the computer memory for storing an adjudication rule of the rule hierarchy; and
a computer processor for executing a set of instructions stored to:
receive the insurance claim from a form interface client application provisioned on one of the plurality of client devices;
define adjudication rules of the rule hierarchy including said adjudication rule, at least two secondary rule containers and a primary rule container;
configure the computer memory as the data structure, the data structure including:
said adjudication rule coupled to one of the at least two secondary rule containers by a first rule reference associated with the content of the respective secondary rule container, said adjudication rule coupled to another of the at least two secondary rule containers by a second rule reference associated with the content of the respective another secondary rule container, and each of the at least two secondary rule containers coupled to the primary rule container by a corresponding container reference associated with the content of the primary rule container, the primary rule container having a list to define an execution order of corresponding container references, such that said adjudication rule, the containers, and the first rule reference, the second rule reference, and the container references represent the set of adjudication rules defining the deployed plan, at least one of the container reference or the first rule reference or the second rule reference having an associated rule date being at least one of an effective date or an expiry date;

based on the insurance claim, further configure the data structure by comparing the associated rule date with the claim date to determine which of the adjudication rules are included in the set of adjudication rules appropriate to the claim content of the insurance claim;

use the data structure including the set of adjudication rules to process the insurance claim with the adjudication rules by the execution order defined by the ordering of the list of the primary rule container to determine a settlement of the insurance claim; and based on the settlement, communicate an amount covering the insurance claim to the client application.

10. The server of claim 9 wherein the computer processor is further programmed to execute instructions for adding parameter values to said adjudication rules.

11. The server of claim 9, wherein the rule containers and the adjudication rules are defined as rule objects.

12. The server claim 11, wherein a modification to said adjudication rule is applied to each of the at least two secondary containers via the first rule reference and the second rule reference to said adjudication rule.

13. The server of claim 9 wherein the computer processor is further programmed to execute instructions for: defining one or more benefit codes of the benefit hierarchy; defining at least two secondary benefit containers, defining a primary benefit container, such that the dependency module is further adapted for coupling at least one of the one or more benefit codes to one of the at least two secondary benefit containers by a benefit reference associated with the content of the respective secondary benefit container and coupling each of the at least two secondary benefit containers to the primary benefit container by a benefit container reference associated with the content of the respective primary benefit container, such that the benefit codes, the benefit containers, and the benefit and container references define a benefit hierarchy for representing the benefit codes in the set of adjudication rules; storing the primary benefit container, the benefit codes and benefit containers in the computer memory.

14. The server of claim 13, wherein the benefit containers and the benefit code are defined as benefit objects and wherein each of the benefit objects are instances of a defined benefit code or benefit container stored in the computer memory.

15. The server of claim 14, wherein the defined benefit code, the defined benefit container, the defined rule and the defined rule container are configured as reusable for creating said instances.

16. The server of claim 9, wherein exclusion or inclusion of the adjudication rules and the secondary containers is configured to occur through the comparison of the claim date with the associated rule date of the container references in order to determine if the respective secondary rule container is part of the set of adjudication rules for use in processing the insurance claim, such that the non-matching dates exclude the respective secondary rule container from being included in the execution order.

\* \* \* \* \*